United States Patent
Zhang et al.

(10) Patent No.: US 12,382,014 B2
(45) Date of Patent: Aug. 5, 2025

(54) INTER-PREDICTION ON NON-DYADIC BLOCKS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Zhipin Deng, Beijing (CN); Na Zhang, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 154 days.

(21) Appl. No.: 18/460,157

(22) Filed: Sep. 1, 2023

(65) Prior Publication Data
US 2023/0412793 A1 Dec. 21, 2023

Related U.S. Application Data

(63) Continuation of application No. PCT/CN2022/078606, filed on Mar. 1, 2022.

(30) Foreign Application Priority Data

Mar. 2, 2021 (WO) ................ PCT/CN2021/078607

(51) Int. Cl.
*H04N 19/00* (2014.01)
*H04N 19/103* (2014.01)
(Continued)

(52) U.S. Cl.
CPC ......... *H04N 19/103* (2014.11); *H04N 19/159* (2014.11); *H04N 19/176* (2014.11);
(Continued)

(58) Field of Classification Search
CPC ....................................................... H04N 19/00
See application file for complete search history.

(56) References Cited

U.S. PATENT DOCUMENTS

2015/0124867 A1  5/2015  Jaeger et al.
2024/0357082 A1* 10/2024  Chubach .............. H04N 19/105
2024/0357153 A1* 10/2024  Chen .................... H04N 19/139

FOREIGN PATENT DOCUMENTS

| CN | 101222641 A | 7/2008 |
| WO | 2019194497 A1 | 10/2019 |
| WO | 2020017904 A1 | 1/2020 |

OTHER PUBLICATIONS

Document: JVET-K0143, Zhang, N., et al., "CE9.4.3 : Template Matching based Adaptive Merge Candidate Reorder," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.
(Continued)

*Primary Examiner* — Maryam A Nasri
(74) *Attorney, Agent, or Firm* — Conley Rose, P.C.

(57) ABSTRACT

A mechanism for processing video data implemented by a video coding apparatus is disclosed. The mechanism determines whether a block is dyadic or non-dyadic. The mechanism also enables a coding tool associated with inter prediction when the block is determined to be dyadic. The mechanism also disables the coding tool when the block is determined to be non-dyadic. A conversion between a visual media data and a bitstream is performed by applying inter prediction to the block.

20 Claims, 27 Drawing Sheets

US 12,382,014 B2
Page 2

(51) Int. Cl.
     H04N 19/159     (2014.01)
     H04N 19/176     (2014.01)
     H04N 19/186     (2014.01)
     H04N 19/52     (2014.01)
     H04N 19/61     (2014.01)
     H04N 19/70     (2014.01)

(52) U.S. Cl.
     CPC ........... *H04N 19/186* (2014.11); *H04N 19/52* (2014.11); *H04N 19/61* (2014.11); *H04N 19/70* (2014.11)

(56) References Cited

OTHER PUBLICATIONS

Sullivan, G., et al., "Overview of the High Efficiency Video Coding (HEVC) Standard," IEEE Transactions on Circuits and Systems for Video Technology, vol. 22, No. 12, Dec. 2012, pp. 1649-1668.
Luthra, A., et al., "Overview of the H.264/AVC video coding standard", Proceedings of SPIE vol. 5203 Applications of Digital Image Processing XXVI, Nov. 19, 2003, 16 pages.
Document: JVET-G1001, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
JEM-7.0: Retrieved from the internet: https://jvet.hhi.fraunhofer.de/svn/svn_HMJEMSoftware/tags/HM-16.6-JEM-7.0, Dec. 4, 2023, 1 page.
Series H: Audiovisual and Multimedia Systems Infrastructure of audiovisual services—Coding of moving video High efficiency video coding, Recommendation ITU-T H.265, Aug. 2021, 716 pages.
Document: JVET-D0117, Li, X., et al., "Multi-Type-Tree", Joint Video Exploration Team (JVET) of ITU-T SG 16 WP 3 and ISO/IEC JTC 1/SC 29/WVG 11 4th Meeting: Chengdu, CN, Oct. 15-21, 2016, 3 pages.
Document: JVET-J1001, Bross, B., "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 43 pages.
Budagavi, M., et al., "Core Transform Design for the High Efficiency Video Coding (HEVC) Standard", IEEE Journal of Selected Topics in Signal Processing, vol. 7, No. 6, Dec. 2013, 13 pages.
Document: JVET-C0047, Chen, C., et al., "Generalized bi-prediction for inter coding," Joint Video Exploration Team (JVET) of ITU-T SG 16 WP 3 and ISO/IEC JTC 1/SC 29/WG 11 3rd Meeting: Geneva, CH, May 26-Jun. 1, 2016, 4 pages.
Document: JVET-K0248, Su, Y., et al., "CE4.4.1: Generalized bi-prediction for inter coding," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.
Document: JVET-L0646, Su, Y., et al., "CE4-related: Generalized bi-prediction improvements combined from JVET-L0197 and JVET-L0296," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Document: JVET-L0296, He, Y., et al., "CE4-related: Encoder speed-up and bug fix for generalized bi-prediction in BMS-2.1," Joint Video Experts Team (JVET) of ITU-T SG 16 WP 3 and ISO/IEC JTC 1/SC 29/WG 11 12th Meeting: Macao, CN, Oct. 3-12, 2018, 5 pages.
Document: JVET-M0063, Chujoh, T., et al., "Non-CE9: An improvement of BDOF," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-M0487, Xiu, X., et al., "CE9.1: Simplifications on bi-directional optical flow (BDOF)," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-L0256, Xiu, X., et al., "CE9-related: Complexity reduction and bit-width control for bi-directional optical flow (BIO)," Joint Video Experts Team (JVET) of ITU-T SG 16 WP 3 and ISO/IEC JTC 1/SC 29/WG 11 12th Meeting: Macao, CN, Oct. 3-12, 2018, 15 pages.
Document: JVET-L0190-v2, An, J., et al., "CE6-related: Simplification of Intra 4-Point Multiple Transforms Selection," Joint Video Experts Team (JVET) of ITU-T SG 16 WP 3 and ISO/IEC JTC 1/SC 29/WG 11 12th Meeting: Macao, CN, Oct. 3-12, 2018, 3 pages.
Document: JVET-L0190-v3, An, J., et al., "CE6-related: Simplification of Intra 4-Point Multiple Transforms Selection," Joint Video Experts Team (JVET) of ITU-T SG 16 WP 3 and ISO/IEC JTC 1/SC 29/WG 11 12th Meeting: Macao, CN, Oct. 3-12, 2018, 3 pages.
Document: JVET-L0191-v1, Laroche, G., et al., "CE3-5.1: On cross-component linear model simplification," Joint Video Experts Team (JVET) of ITU-T SG 16 WP 3 and ISO/IEC JTC 1/SC 29/WG 11 12th Meeting: Macao, CN, Oct. 3-12, 2018, 4 pages.
Document: JVET-L0191-v2, Laroche, G., et al., "CE3-5.1: On cross-component linear model simplification," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Document: JVET-L0191-v3, Laroche, G., et al., "CE3-5.1: On cross-component linear model simplification," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Document: JVET-L0192-v1, Gisquet, C., et al., "CE11: Higher precision modification for VVC deblocking filter (Test 2.1)," Joint Video Experts Team (JVET) of ITU-T SG 16 WP 3 and ISO/IEC JTC 1/SC 29/WG 11 12th Meeting: Macao, CN, Oct. 3-12, 2018, 7 pages.
Document: JVET-L0193-v1, Laroche, G., et al., "CE4-related: On Affine mode restriction," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Document: JVET-L0194-v1, Laroche, G., et al., "CE4-related: On Merge Index coding," Joint Video Experts Team (JVET) of ITU-T SG 16 WP 3 and ISO/IEC JTC 1/SC 29/WG 11 12th Meeting: Macao, CN, Oct. 3-12, 2018, 3 pages.
Document: JVET-L0195-v1, Jung, J., et al., "CE6-related: MTS for non-square CUs," Joint Video Experts Team (JVET) of ITU-T SG 16 WP 3 and ISO/IEC JTC 1/SC 29/WG 11 12th Meeting: Macao, CN, Oct. 3-12, 2018, 5 pages.
Document: JVET-L0195-v2, Jung, J., et al., "CE6-related: MTS for non-square CUs," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Document: JVET-L0195-v3, Jung, J., et al., "CE6-related: MTS for non-square CUs," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Document: JVET-L0196-v1, Luo, J., et al., "CE9.2.7: Complexity reduction on decoder-side motion vector refinement (DMVR)," Joint Video Experts Team (JVET) of ITU-T SG 16 WP 3 and ISO/IEC JTC 1/SC 29/WG 11 12th Meeting: Macao, CN, Oct. 3-12, 2018, 3 pages.
Document: JVET-L0196-v2, Luo, J., et al., "CE9.2.7: Complexity reduction on decoder-side motion vector refinement (DMVR)," Joint Video Experts Team (JVET) of ITU-T SG 16 WP 3 and ISO/IEC JTC 1/SC 29/WG 11 12th Meeting: Macao, CN, Oct. 3-12, 2018, 2 pages.
Document: JVET-L0197-v2, Su, Y., et al., "CE4-Related: Generalized bi-prediction improvements," Joint Video Experts Team (JVET) of ITU-T SG 16 WP 3 and ISO/IEC JTC 1/SC 29/WG 11 12th Meeting: Macao, CN, Oct. 3-12, 2018, 4 pages.
Document: JVET-L0197-v3, Su, Y., et al., "CE4-Related: Generalized bi-prediction improvements," Joint Video Experts Team (JVET) of ITU-T SG 16 WP 3 and ISO/IEC JTC 1/SC 29/WG 11 12th Meeting: Macao, CN, Oct. 3-12, 2018, 4 pages.
Document: JVET-L0197-v4, Su, Y., et al., "CE4-Related: Generalized bi-prediction improvements," Joint Video Experts Team (JVET) of ITU-T SG 16 WP 3 and ISO/IEC JTC 1/SC 29/WG 11 12th Meeting: Macao, CN, Oct. 3-12, 2018, 4 pages.

(56) References Cited

OTHER PUBLICATIONS

Document: JVET-L0198-v3, Wang, S., et al., "CE4-related: Simplification of ATMVP candidate derivation," Joint Video Experts Team (JVET) of ITU-T SG 16 WP 3 and ISO/IEC JTC 1/SC 29/WG 11 12th Meeting: Macao, CN, Oct. 3-12, 2018, 5 pages.
International Search Report from PCT Application No. PCT/CN2022/078606 dated May 25, 2022, 9 pages.

* cited by examiner

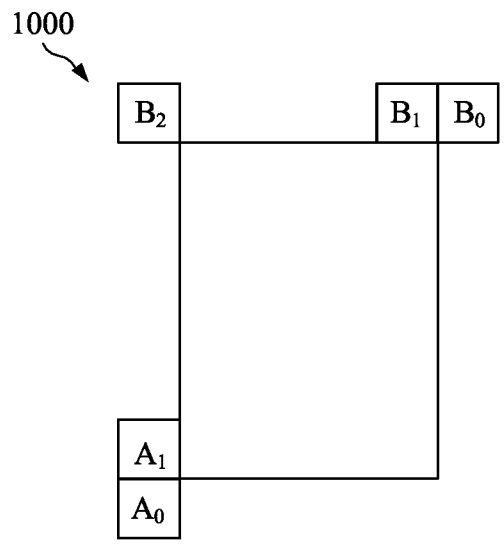
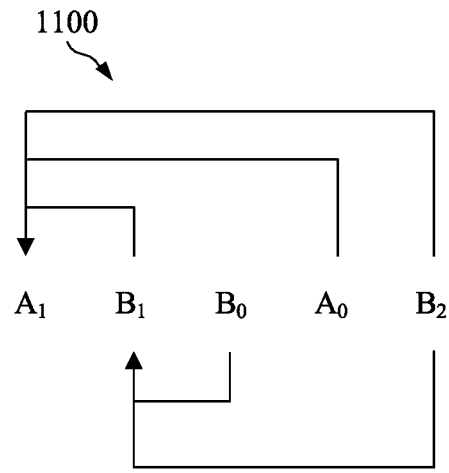
FIG. 10  FIG. 11
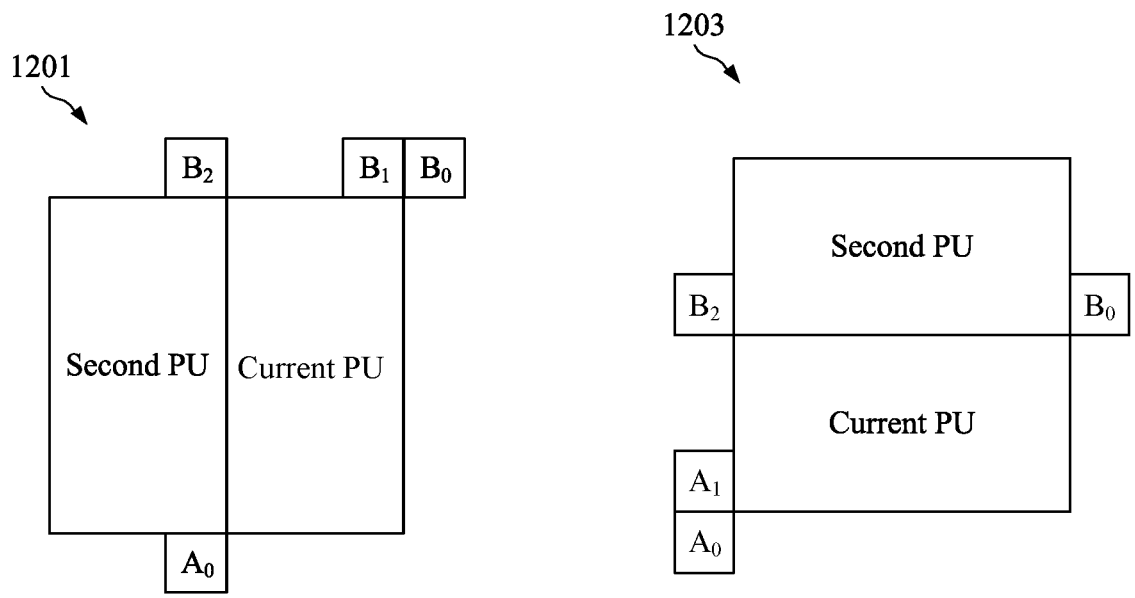
FIG. 12

Merge candidate list

| Merge_idx | L0 | L1 |
|---|---|---|
| 0 | mvL0_A, ref0 | |
| 1 | | mvL1_B, ref0 |
| 2 | | |
| 3 | | |
| 4 | | |

Merge candidate list w combined cadidates

| Merge_idx | L0 | L1 |
|---|---|---|
| 0 | mvL0_A, ref0 | |
| 1 | | mvL1_B, ref0 |
| 2 | mvL0_A, ref0 | mvL1_B, ref0 |
| 3 | | |
| 4 | | |

- Neighboring samples of current CU
- ⊘ Neighboring samples of reference block

INTER-PREDICTION ON NON-DYADIC BLOCKS

CROSS-REFERENCE TO RELATED APPLICATIONS

This application is a continuation of International Patent Application No. PCT/CN2022/078606, filed on Mar. 1, 2022 which claims the benefit of International Patent Application No. PCT/CN2021/078607, filed on Mar. 2, 2021. All the aforementioned patent applications are hereby incorporated by reference in their entireties.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data implemented by a video coding apparatus, comprising: determining, for a conversion between a video comprising a block and a bitstream of the video, whether a coding tool associated with inter prediction is enabled for the block based on whether the block is dyadic or non-dyadic; and performing the conversion based on the determining.

Optionally, in any of the preceding aspects, another implementation of the aspect provides that the coding tool associated with inter prediction is enabled in a case that the block is determined to be dyadic and is disabled in a case that the block is determined to be non-dyadic, where the coding tool is bi-directional inter prediction, weighted bidirectional inter prediction, affine prediction, decoder-side motion vector refinement (DMVR), decoder-side motion vector derivation (DMVD), multi-pass decoder-side motion vector refinement, triangular portioning mode (TPM), geometric partitioning mode (GPM), bi-directional optical flow (BDOF), prediction refinement with optical flow (PROF), sub-block transform (SBT), multiple transform selection (MTS), low-frequency non-separable transform (LFNST), adaptive motion vector resolution (AMVR), combined inter-intra prediction (CIIP), multi-hypothesis prediction, sub-block-based temporal motion vector prediction (TMVP), frame-rate up conversion (FRUC), bi-prediction with coding unit (CU)-level weights, overlapped block motion compensation (OBMC), local illumination compensation (LIC), template-matching based motion vector derivation, template matching based adaptive merge candidate reorder, sub-block based inter prediction, or combinations thereof.

Optionally, in any of the preceding aspects, another implementation of the aspect provides that usage of one the coding tool associated with inter prediction for the block in the bitstream is based on whether the block is dyadic or non-dyadic, and wherein the block is non-dyadic when a dimension of a side of the block is not expressed as a power of two.

Optionally, in any of the preceding aspects, another implementation of the aspect provides that usage of one or more coding tools for the block is indicated in the bitstream based on a dimension of the block.

Optionally, in any of the preceding aspects, another implementation of the aspect provides that the block includes a number of samples, and usage of the one or more coding tools for the block is indicated in the bitstream based on whether the one or more coding tools are enabled for a dyadic block with a number of samples less than or equal to the number of samples in the block.

Optionally, in any of the preceding aspects, another implementation of the aspect provides that the block is non-dyadic when a dimension of a side of the block cannot be expressed as a power of two.

Optionally, in any of the preceding aspects, another implementation of the aspect provides performing sub-block based inter prediction on the block based on whether the block is non-dyadic.

Optionally, in any of the preceding aspects, another implementation of the aspect provides splitting the block into sub-blocks based on whether the block is non-dyadic.

Optionally, in any of the preceding aspects, another implementation of the aspect provides splitting the block into sub-blocks based on whether the block is a chroma block.

Optionally, in any of the preceding aspects, another implementation of the aspect provides that the block is split into M2×N2 sub-blocks when the block is non-dyadic, and wherein the block is split into M1×N1 sub-blocks when the block is dyadic, wherein M1, M2, N1, and N2 are integer values, and wherein M1 is not equal to M2 or N1 is not equal to N2.

Optionally, in any of the preceding aspects, another implementation of the aspect provides that the block is split into 2×2 sub-blocks when a dimension of the block is not in a form of 4N where N is an integer.

Optionally, in any of the preceding aspects, another implementation of the aspect provides that the block is split into 4×2 sub-blocks when a dimension of the block is not in a form of 4N where N is an integer.

Optionally, in any of the preceding aspects, another implementation of the aspect provides that the block is split into 2×4 sub-blocks when a dimension of the block is not in a form of 4N where N is an integer.

Optionally, in any of the preceding aspects, another implementation of the aspect provides that the block has a width (W) and a height (H), and wherein the block is split into one or more subblocks with dimensions M1×N1 when $$\left\lfloor \frac{W}{M1} \right\rfloor \times \left\lfloor \frac{H}{N1} \right\rfloor,$$

where M1 and N1 are integers.

Optionally, in any of the preceding aspects, another implementation of the aspect provides that the block has a width (W) and a height (H), and wherein the block is split into one or more subblocks with dimensions M2×N1 when W%M1 is not equal to zero and $$\left\lfloor \frac{H}{N1} \right\rfloor,$$

where M2, M1, and N1 are integers and % is a modulo operator.

Optionally, in any of the preceding aspects, another implementation of the aspect provides that the block has a width (W) and a height (H), and wherein the block is split into one or more subblocks with dimensions M1×N2 when H%N1 is not equal to zero and $$\left\lfloor \frac{W}{M1} \right\rfloor,$$

where N2, N1, and M1 are integers and % is a modulo operator.

Optionally, in any of the preceding aspects, another implementation of the aspect provides that the block has a width (W) and a height (H), and wherein the block is split into one or more subblocks with dimensions M2×N2 when H%N1 is not equal to zero and W%M1 is not equal to zero, where N2, N1, M2, and M1 are integers and % is a modulo operator.

Optionally, in any of the preceding aspects, another implementation of the aspect provides performing decoder side motion refinement on the block based on whether the block is non-dyadic.

Optionally, in any of the preceding aspects, another implementation of the aspect provides that a number of templates are a power of two when performing local illumination compensation (LIC) on the block.

Optionally, in any of the preceding aspects, another implementation of the aspect provides that N samples from a left neighboring column are used for LIC when the left neighboring column is available, wherein N samples from a top neighboring row are used for LIC when the top neighboring row is available, and wherein N is an integer.

Optionally, in any of the preceding aspects, another implementation of the aspect provides that samples used for LIC are located at (x−1, y+f2(0)), (x−1, y+f2(1)), . . . , (x−1, y+f2(N−1)) in the left neighboring column and at (x+f1(0), y−1), (x+f1(1), y−1), . . . , (x+f1(N−1), y−1) in the above neighboring row, where x and y are coordinates, f1(K)=((K*W)>>dimShift), f2(K)=((K*H)>>dimShift), K is an integer value, W is a width of the CU, H is a height of the CU, >> indicates a right bitshift, and dimShift is an integer variable used in the LIC parameter derivation process.

Optionally, in any of the preceding aspects, another implementation of the aspect provides applying sub-block transforms to the block, and wherein the sub-block transforms are sized based on whether the block is non-dyadic.

Optionally, in any of the preceding aspects, another implementation of the aspect provides applying affine inter prediction to the block, and wherein a four parameter affine model or a six parameter affine model is selected based whether a width (W) of the block is a non-dyadic value or whether a height (H) of the block is a non-dyadic value.

Optionally, in any of the preceding aspects, another implementation of the aspect provides that the block is associated with a control point motion vector (CPMV), and wherein a position of the CPMV in the block is selected based on whether the block is non-dyadic.

Optionally, in any of the preceding aspects, another implementation of the aspect provides that a rule requires a distance between two CPMVs in the block to be a dyadic value when the block is non-dyadic.

Optionally, in any of the preceding aspects, another implementation of the aspect provides that the block has a width (w), wherein a position of a first CPMV ($mv_0$) is (x0, y0) and a position of a second CPMV ($mv_1$) is (x0+ww, y0) when w is a non-dyadic number, and wherein (x0, y0) is a top-left position of the block, and ww=1<<$\lfloor \log_2 w \rfloor$ where << is a left bitshift operation.

Optionally, in any of the preceding aspects, another implementation of the aspect provides that the block has a height (h), wherein a position of a first CPMV ($mv_0$) is (x0, y0) and a position of a second CPMV ($mv_1$) is (x0, y0+hh) when h is a non-dyadic number, and wherein (x0, y0) is a top-left position of the block, and hh=1<<$\lfloor \log_2 h \rfloor$ where << is a left bitshift operation.

A second aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A third aspect relates to an apparatus for processing video data comprising: a processor; and a non-transitory memory with instructions thereon, wherein the instructions upon execution by the processor, cause the processor to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 10 is a schematic diagram illustrating example positions of spatial merge candidates used in merge mode.

FIG. 11 is a schematic diagram illustrating example candidate pairs considered for a redundancy check of spatial merge candidates used in merge mode.

FIG. 12 is a schematic diagram illustrating example positions for a second prediction unit (PU) used when deriving spatial merge candidates for a current PU when employing merge mode.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

This document is related to image/video coding, and more particularly to residual coding on some special kinds of blocks. The disclosed mechanisms may be applied to the video coding standards such as High Efficiency Video Coding (HEVC) and/or Versatile Video Coding (VVC). Such mechanisms may also be applicable to other video coding standards and/or video codecs.

Video coding standards have evolved primarily through the development of the International Telecommunication Union (ITU) Telecommunication Standardization Sector (ITU-T) and International Organization for Standardization (ISO)/International Electrotechnical Commission (IEC) standards. The ITU-T produced a H.261 standard and a H.263 standard, ISO/IEC produced Motion Picture Experts Group (MPEG) phase one (MPEG-1) and MPEG phase four (MPEG-4) Visual standards, and the two organizations jointly produced the H.262/MPEG phase two (MPEG-2) Video standard, the H.264/MPEG-4 Advanced Video Coding (AVC) standard, and the H.265/High Efficiency Video Coding (HEVC) standard. Since H.262, the video coding standards are based on a hybrid video coding structure that utilizes a temporal prediction plus a transform coding.

Figure 1:
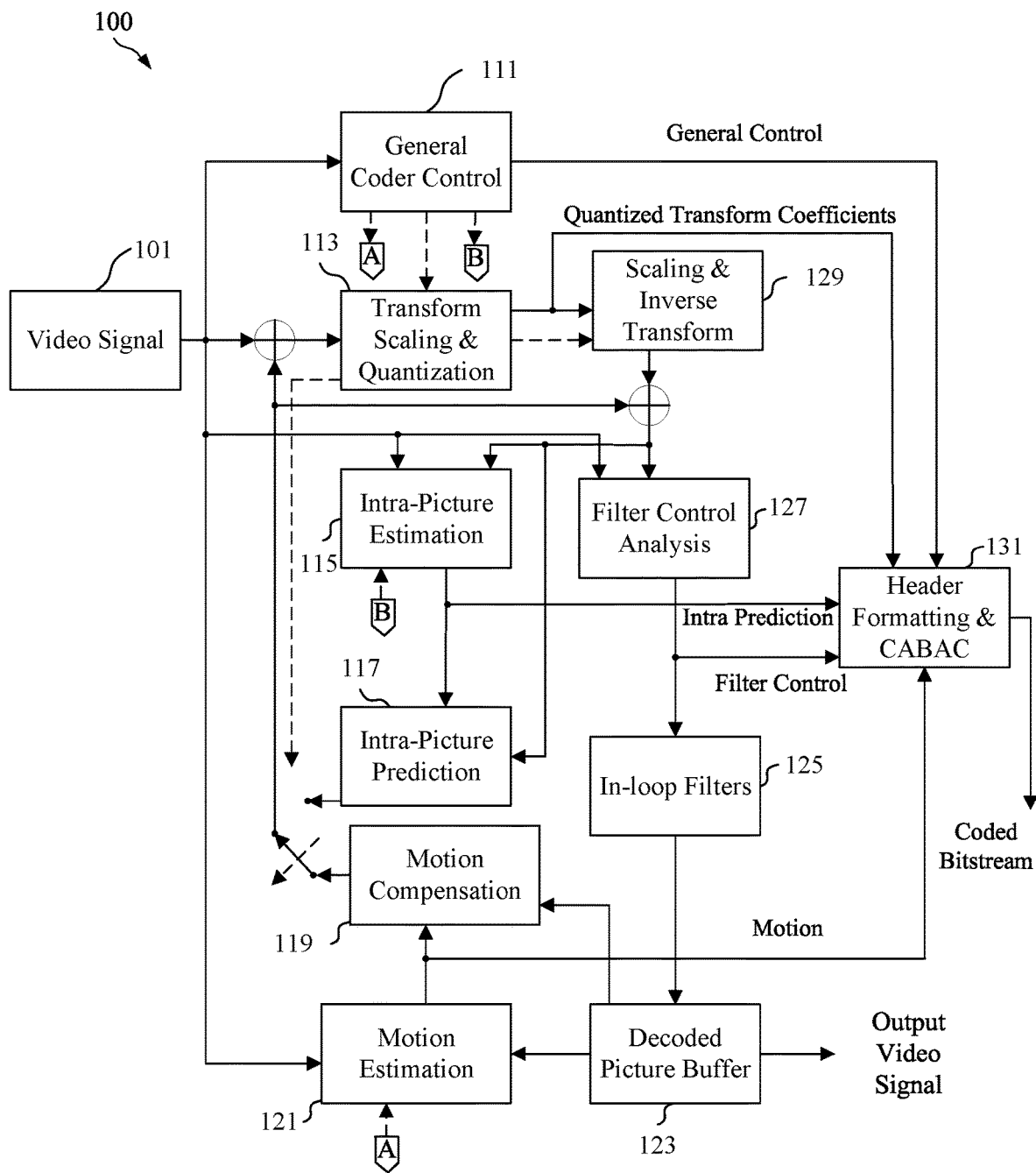
FIG. 1 is a schematic diagram of an example coding and decoding (codec) for video coding.

FIG. 1 is a schematic diagram of an example coding and decoding (codec) for video coding, for example according to HEVC. For example, codec 100 provides functionality to support converting a video file into a bitstream by encoding and/or decoding pictures. Codec 100 is generalized to depict components employed in both an encoder and a decoder. Codec 100 receives a stream of pictures as a video signal 101 and partitions the pictures. Codec 100 then compresses the pictures in the video signal 101 into a coded bitstream when acting as an encoder. When acting as a decoder, codec 100 generates an output video signal from the bitstream. The codec 100 includes a general coder control component 111, a transform scaling and quantization component 113, an intra-picture estimation component 115, an intra-picture prediction component 117, a motion compensation component 119, a motion estimation component 121, a scaling and inverse transform component 129, a filter control analysis component 127, an in-loop filters component 125, a decoded picture buffer component 123, and a header formatting and context adaptive binary arithmetic coding (CABAC) component 131. Such components are coupled as shown. In FIG. 1, black lines indicate movement of data to be encoded/decoded while dashed lines indicate movement of control data that controls the operation of other components. The components of codec 100 may all be present in the encoder. The decoder may include a subset of the components of codec 100. For example, the decoder may include the intra-picture prediction component 117, the motion compensation component 119, the scaling and inverse transform component 129, the in-loop filters component 125, and the decoded picture buffer component 123. These components are now described.

The video signal 101 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The video signal 101 is forwarded to the general coder control component 111, the transform scaling and quantization component 113, the intra-picture estimation component 115, the filter control analysis component 127, and the motion estimation component 121 for compression.

The general coder control component 111 is configured to make decisions related to coding of the images of the video sequence into the bitstream according to application constraints. For example, the general coder control component 111 manages optimization of bitrate/bitstream size versus reconstruction quality. Such decisions may be made based on storage space/bandwidth availability and image resolution requests. The general coder control component 111 also manages buffer utilization in light of transmission speed to mitigate buffer underrun and overrun issues. To manage these issues, the general coder control component 111 manages partitioning, prediction, and filtering by the other components. For example, the general coder control component 111 may increase compression complexity to increase resolution and increase bandwidth usage or decrease compression complexity to decrease resolution and bandwidth usage. Hence, the general coder control component 111 controls the other components of codec 100 to balance video signal reconstruction quality with bit rate concerns. The general coder control component 111 creates control data, which controls the operation of the other components. The control data is also forwarded to the header formatting and CABAC component 131 to be encoded in the bitstream to signal parameters for decoding at the decoder.

The video signal 101 is also sent to the motion estimation component 121 and the motion compensation component 119 for inter prediction. A video unit (e.g., a picture, a slice, a CTU, etc.) of the video signal 101 may be divided into multiple blocks. Motion estimation component 121 and the motion compensation component 119 perform inter predictive coding of the received video block relative to one or more blocks in one or more reference pictures to provide temporal prediction. Codec 100 may perform multiple coding passes, e.g., to select an appropriate coding mode for each block of video data.

Motion estimation component 121 and motion compensation component 119 may be highly integrated, but are illustrated separately for conceptual purposes. Motion estimation, performed by motion estimation component 121, is the process of generating motion vectors, which estimate motion for video blocks. A motion vector, for example, may indicate the displacement of a coded object in a current block relative to a reference block. A reference block is a block that is found to closely match the block to be coded, in terms of pixel difference. Such pixel differences may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into coding blocks (CBs) for inclusion in CUs. A CU can be encoded as a prediction unit (PU) containing prediction data and/or a transform unit (TU) containing transformed residual data for the CU. The motion estimation component 121 generates motion vectors, PUs, and TUs by using a rate-distortion analysis as part of a rate distortion optimization process. For example, the motion estimation component 121 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec 100 may calculate values for sub-integer pixel positions of reference pictures stored in decoded picture buffer component 123. For example, a video codec, such as codec 100, may interpolate values of one-quarter pixel positions, one-eighth pixel positions, or other fractional pixel positions of the reference picture. Therefore, motion estimation component 121 may perform a motion search relative to the full pixel positions and fractional pixel positions and output a motion vector with fractional pixel precision. The motion estimation component 121 calculates a motion vector for a PU of a video block in an inter-coded slice by comparing the position of the PU to the position of a reference block of a reference picture. Motion estimation component 121 outputs the calculated motion vector as motion data to header formatting and CABAC component 131 for encoding and to the motion compensation component 119.

Motion compensation, performed by motion compensation component 119, may involve fetching or generating a reference block based on the motion vector determined by motion estimation component 121. Motion estimation component 121 and motion compensation component 119 may be functionally integrated, in some examples. Upon receiving the motion vector for the PU of the current video block, motion compensation component 119 may locate the reference block to which the motion vector points. A residual video block is then formed by subtracting pixel values of the reference block from the pixel values of the current block being coded, forming pixel difference values. In general, motion estimation component 121 performs motion estimation relative to luma components, and motion compensation component 119 uses motion vectors calculated based on the luma components for both chroma components and luma components. The reference block and residual block are forwarded to transform scaling and quantization component 113.

The video signal 101 is also sent to intra-picture estimation component 115 and intra-picture prediction component 117. As with motion estimation component 121 and motion compensation component 119, intra-picture estimation component 115 and intra-picture prediction component 117 may be highly integrated, but are illustrated separately for conceptual purposes. The intra-picture estimation component 115 and intra-picture prediction component 117 intra-predict a current block relative to blocks in a current picture, as an alternative to the inter prediction performed by motion estimation component 121 and motion compensation component 119 between pictures, as described above. In particular, the intra-picture estimation component 115 determines an intra-prediction mode to use to encode a current block. In some examples, intra-picture estimation component 115 selects an appropriate intra-prediction mode to encode a current block from multiple tested intra-prediction modes. The selected intra-prediction modes are then forwarded to the header formatting and CABAC component 131 for encoding.

For example, the intra-picture estimation component 115 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 115 calculates ratios from the distortions and rates for the various encoded blocks to determine which intra-prediction mode exhibits the best rate-distortion value for the block. In addition, intra-picture estimation component 115 may be configured to code depth blocks of a depth map using a depth modeling mode (DMM) based on rate-distortion optimization (RDO).

The intra-picture prediction component 117 may generate a residual block from the reference block based on the selected intra-prediction modes determined by intra-picture estimation component 115 when implemented on an encoder or read the residual block from the bitstream when implemented on a decoder. The residual block includes the difference in values between the reference block and the original block, represented as a matrix. The residual block is then forwarded to the transform scaling and quantization component 113. The intra-picture estimation component 115 and the intra-picture prediction component 117 may operate on both luma and chroma components.

The transform scaling and quantization component 113 is configured to further compress the residual block. The transform scaling and quantization component 113 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 113 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 113 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 113 may then perform a scan of the matrix including the quantized transform coefficients. The quantized transform coefficients are forwarded to the header formatting and CABAC component 131 to be encoded in the bitstream.

The scaling and inverse transform component 129 applies a reverse operation of the transform scaling and quantization component 113 to support motion estimation. The scaling and inverse transform component 129 applies inverse scaling, transformation, and/or quantization to reconstruct the residual block in the pixel domain, e.g., for later use as a reference block for another current block. The motion estimation component 121 and/or motion compensation component 119 may calculate a further reference block by adding the residual block back to a previous reference block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 127 and the in-loop filters component 125 apply the filters to the residual blocks and/or to reconstructed picture blocks. For example, the transformed residual block from the scaling and inverse transform component 129 may be combined with a corresponding reference block from intra-picture prediction component 117 and/or motion compensation component 119 to reconstruct the original image block. The filters may then be applied to the reconstructed image block. In some examples, the filters may instead be applied to the residual blocks. As with other components in FIG. 1, the filter control analysis component 127 and the in-loop filters component 125 are highly integrated and may be implemented together, but are depicted separately for conceptual purposes. Filters applied to the reconstructed reference blocks are applied to particular spatial regions and include multiple parameters to adjust how such filters are applied. The filter control analysis component 127 analyzes the reconstructed reference blocks to determine where such filters should be applied and sets corresponding parameters. Such data is forwarded to the header formatting and CABAC component 131 as filter control data for encoding. The in-loop filters component 125 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 123 for later use in motion estimation as discussed above. When operating as a decoder, the decoded picture buffer component 123 stores and forwards the reconstructed and filtered blocks toward a display as part of an output video signal. The decoded picture buffer component 123 may be any memory device capable of storing prediction blocks, residual blocks, and/or reconstructed image blocks.

The header formatting and CABAC component 131 receives the data from the various components of codec 100 and encodes such data into a coded bitstream for transmission toward a decoder. Specifically, the header formatting and CABAC component 131 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 101. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 2:
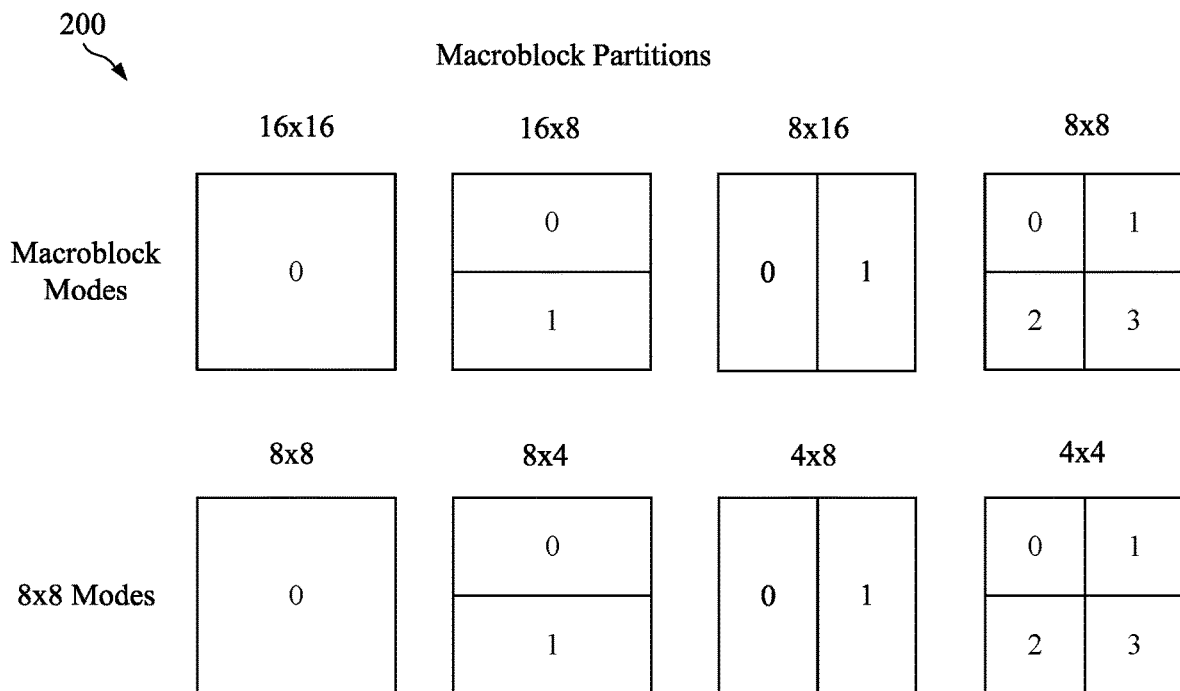
FIG. 2 is a schematic diagram of example macroblock partitions.

In order to encode and/or decode a picture as described above, the picture is first partitioned. FIG. 2 is a schematic diagram of example macroblock partitions 200, which can be created by a partition tree structure pursuant to H.264/AVC. The core of the coding layer in such standards is the macroblock, containing a 16×16 block of luma samples and, in the case of 4:2:0 color sampling, two corresponding 8×8 blocks of chroma samples. An intra-coded block uses spatial prediction to exploit spatial correlation among pixels. Two partitions are defined for an intra-coded block, namely a 16×16 sub-block and 4×4 sub-block. An inter-coded block uses temporal prediction, instead of spatial prediction, by estimating motion among pictures. Motion can be estimated independently for either a 16×16 macroblock or any sub-macroblock partitions. An inter-coded block can be partitioned into a 16×8 sub-block, an 8×16 sub-block, an 8×8 sub-block, an 8×4 sub-block, a 4×8 sub-block, and/or a 4×4 sub-block. All such values are measured in a number of samples. A Sample is a luma (light) value or chroma (color) value at a pixel.

Figure 3:
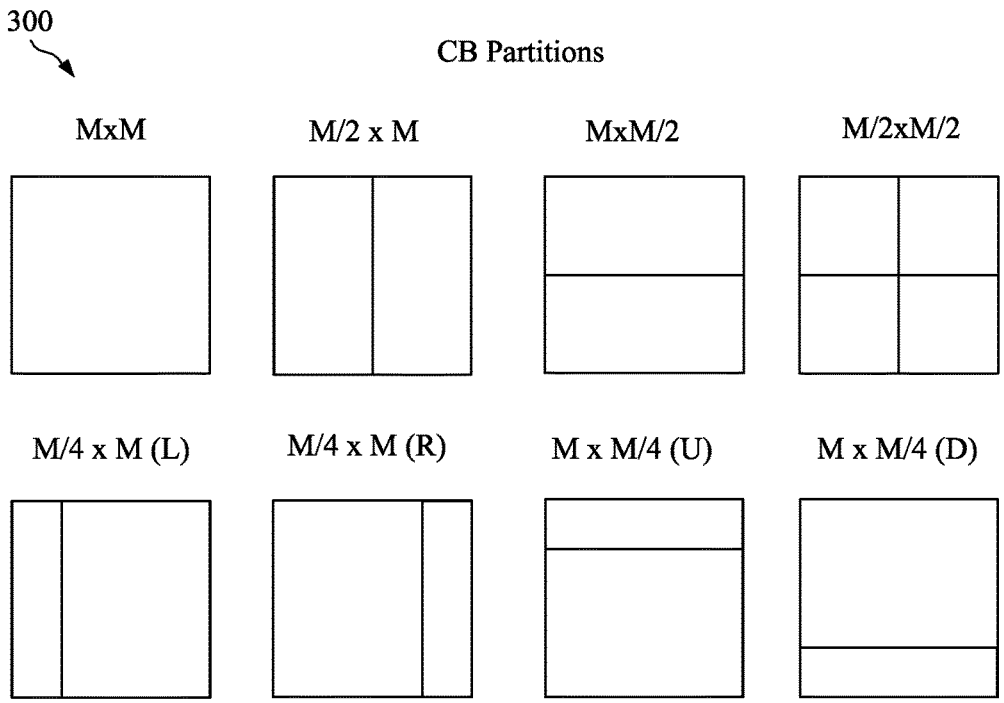
FIG. 3 is a schematic diagram of example modes for partitioning coding blocks, for example according to High Efficiency Video Coding (HEVC).

FIG. 3 is a schematic diagram of example modes 300 for partitioning coding blocks, for example according to HEVC. In HEVC, a picture is partitioned into CTUs. A CTU is split into CUs by using a quadtree structure denoted as a coding tree to adapt to various local characteristics. The decision whether to code a picture area using inter-picture (temporal) or intra-picture (spatial) prediction is made at the CU level. Each CU can be further split into one, two, or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One feature of the HEVC structure is that HEVC has multiple partition conceptions including CU, PU, and TU.

Various features involved in hybrid video coding using HEVC are highlighted as follows. HEVC includes the CTU, which is analogous to the macroblock in AVC. The CTU has a size selected by the encoder and can be larger than a macroblock. The CTU includes a luma coding tree block (CTB), corresponding chroma CTBs, and syntax elements. The size of a luma CTB, denoted as L×L, can be chosen as L=16, 32, or 64 samples with the larger sizes resulting in better compression. HEVC then supports a partitioning of the CTBs into smaller blocks using a tree structure and quadtree-like signaling.

The quadtree syntax of the CTU specifies the size and positions of corresponding luma and chroma CBs. The root of the quadtree is associated with the CTU. Hence, the size of the luma CTB is the largest supported size for a luma CB. The splitting of a CTU into luma and chroma CBs is signaled jointly. One luma CB and two chroma CBs, together with associated syntax, form a coding unit (CU). A CTB may contain only one CU or may be split to form multiple CUs. Each CU has an associated partitioning into prediction units (PUs) and a tree of transform units (TUs). The decision of whether to code a picture area using inter picture or intra picture prediction is made at the CU level. A PU partitioning structure has a root at the CU level. Depending on the basic prediction-type decision, the luma and chroma CBs can then be further split in size and predicted from luma and chroma prediction blocks (PBs) according to modes 300. HEVC supports variable PB sizes from 64×64 down to 4×4 samples. As shown, modes 300 can split a CB of size M pixels by M pixels into an M×M block, a M/2×M block, a M×M/2 block, a M/2×M/2 block, a M/4×M (left) block, a M/4×M (right) block, a M×M/4 (up) block, and/or a M×M/4 (down) block. It should be noted that the modes 300 for splitting CBs into PBs are subject to size constraints. Further, only M×M and M/2×M/2 are supported for intra picture predicted CBs.

Figure 4:
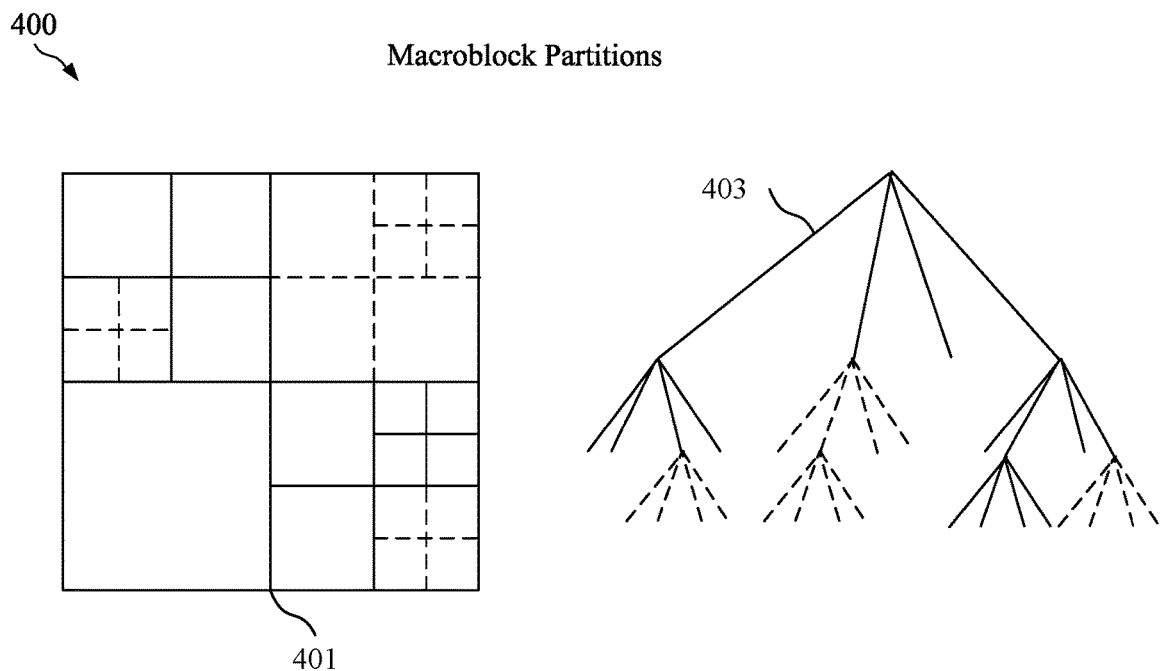
FIG. 4 is a schematic diagram of example method for partitioning a picture for coding residual.

FIG. 4 is a schematic diagram of example method 400 for partitioning a picture for coding residual, for example according to HEVC. As noted above, blocks are coded by reference to reference blocks. A difference between values of a current block and the reference blocks is known as the residual. Method 400 is employed to compress the residual. For example, the prediction residual is coded using block transforms. Method 400 employs a TU tree structure 403 to partition a CTB 401 and included CBs for application of transform blocks (TBs). Method 400 illustrates the subdivision of a CTB 401 into CBs and TBs. Solid lines indicate CB boundaries and dotted lines indicate TB boundaries. The TU tree structure 403 is an example quadtree that partitions the CTB 401. A transform, such as discrete cosine transform (DCT), is applied to each TB. The transform converts the residual into transform coefficients that can be represented using less data than the uncompressed residual. The TU tree structure 403 has a root at the CU level. The luma CB residual area may be identical to the luma TB area or may be further split into smaller luma TBs. The same applies to the chroma TBs. Integer basis transform functions similar to those of a DCT are defined for the square TB sizes 4×4, 8×8, 16×16, and 32×32. For the 4×4 transform of luma intra picture prediction residuals, an integer transform derived from a form of DST is alternatively specified.

A quadtree plus binary tree block structure with larger CTUs in Joint Exploration Model (JEM) is discussed below. Joint Video Exploration Team (JVET) was founded by Video Coding Experts group (VCEG) and MPEG to explore video coding technologies beyond HEVC. JVET has adopted many improvements included such improvements into a reference software named Joint Exploration Model (JEM).

Figure 5:
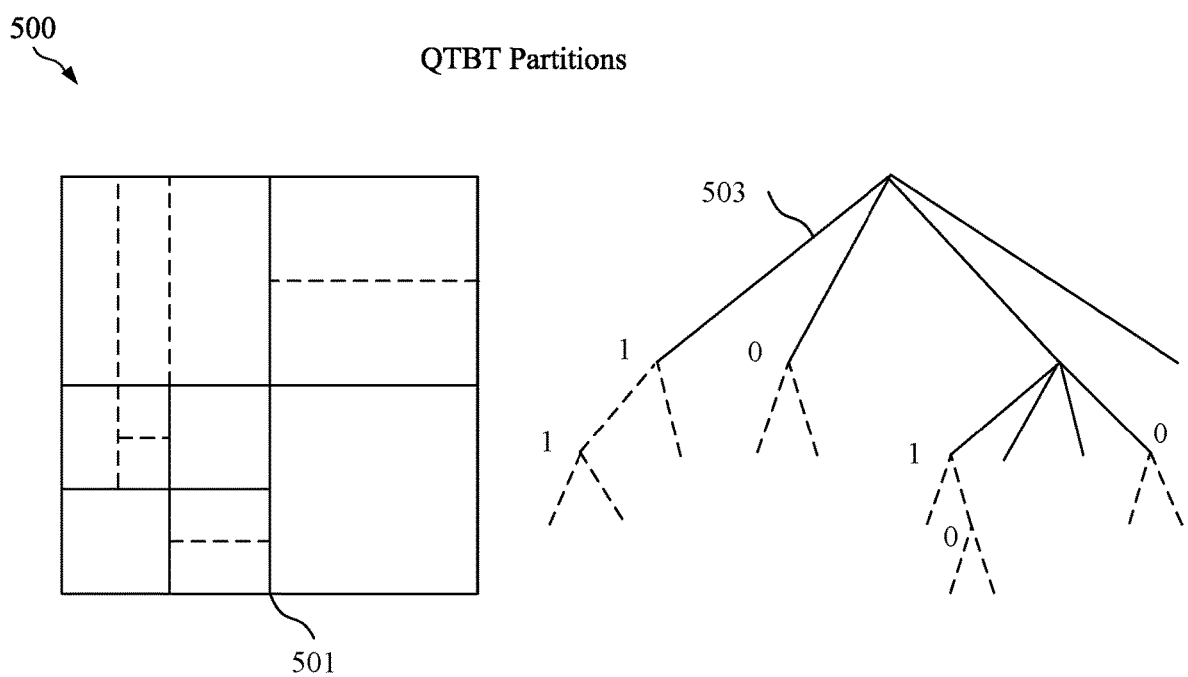
FIG. 5 is a schematic diagram of example method for partitioning a picture, for example according to a quad tree binary tree (QTBT) structure.

FIG. 5 is a schematic diagram of example method 500 for partitioning a picture, for example according to a quad tree binary tree (QTBT) structure 501. A tree representation 503 of the QTBT structure 501 is also shown. Unlike the partitioning structures in HEVC, the QTBT structure 501 removes the concepts of multiple partition types. For example, the QTBT structure 501 removes the separation of the CU, PU, and TU concepts, and supports more flexibility for CU partition shapes. In the QTBT structure 501, a CU can have either a square or rectangular shape. In method 500, a CTU is first partitioned by a quadtree structure. The quadtree leaf nodes are further partitioned by a binary tree structure. Symmetric horizontal splitting and symmetric vertical splitting are two splitting types used in the binary tree. The binary tree leaf nodes are called CUs, and that segmentation is used for prediction and transform processing without further partitioning. This causes the CU, PU, and TU to have the same block size in the QTBT structure 501. In the JEM, a CU sometimes includes CBs of different color components. For example, one CU may contain one luma CB and two chroma CBs in the case of unidirectional inter prediction (P) and bidirectional inter prediction (B) slices of the 4:2:0 chroma format. Further, the CU sometimes includes a CB of a single component. For example, one CU may contain only one luma CB or just two chroma CBs in the case of intra prediction (I) slices.

The following parameters are defined for the QTBT partitioning scheme. The CTU size is the root node size of a quadtree, which is the same concept as in HEVC. Minimum quad tree size (MinQTSize) is the minimum allowed quadtree leaf node size. Maximum binary tree size (MaxBTSize) is the maximum allowed binary tree root node size. Maximum binary tree depth (MaxBTDepth) is the maximum allowed binary tree depth. Minimum binary tree size (MinBTSize) is the minimum allowed binary tree leaf node size.

In one example of the QTBT structure 501, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (the MinQTSize) to 128×128 (the CTU size). If the leaf quadtree node is 128×128, the node is not to be further split by the binary tree since the size exceeds the MaxBTSize (e.g., 64×64). Otherwise, the leaf quadtree node can be further partitioned by the binary tree. Therefore, the quadtree leaf node is also the root node for the binary tree and has the binary tree depth as 0. When the binary tree depth reaches MaxBTDepth (e.g., 4), no further splitting is considered. When the binary tree node has width equal to MinBTSize (e.g., 4), no further horizontal splitting is considered. Similarly, when the binary tree node has a height equal to MinBTSize, no further vertical splitting is considered. The leaf nodes of the binary tree are further processed by prediction and transform processing without any further partitioning. In the JEM, the maximum CTU size is 256×256 luma samples.

Method 500 illustrates an example of block partitioning by using the QTBT structure 501, and tree representation 503 illustrates the corresponding tree representation. The solid lines indicate quadtree splitting and dotted lines indicate binary tree splitting. In each splitting (e.g., non-leaf) node of the binary tree, one flag is signaled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure 501. For example, in P and B slices the luma and chroma CTBs in one CTU share the same QTBT structure 501. However, in I slices the luma CTB is partitioned into CUs by a QTBT structure 501, and the chroma CTBs are partitioned into chroma CUs by another QTBT structure 501. Accordingly, a CU in an I slice can include a coding block of the luma component or coding blocks of two chroma components. Further, a CU in a P or B slice includes coding blocks of all three color components. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Figure 6:
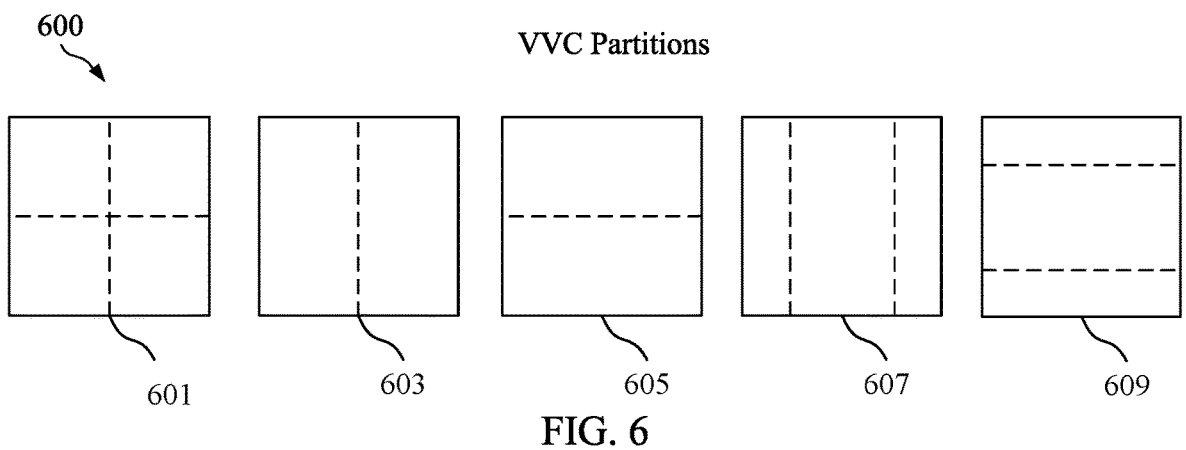
FIG. 6 is a schematic diagram of example partitioning structures used in Versatile Video Coding (VVC).

Triple-tree partitioning for VVC is now discussed. FIG. 6 is a schematic diagram 600 of example partitioning structures used in VVC. As shown, split types other than quad-tree and binary-tree are supported in VVC. For example, schematic diagram 600 includes a quad tree partition 601, a vertical binary tree partition 603, a horizontal binary tree partition 605, a vertical triple tree partition 607, and a horizontal triple tree partition 609. This approach introduces two triple tree (TT) partitions in addition to the quad tree and binary trees.

In an example implementation, two levels of trees are employed including a region tree (a quad-tree) and a prediction tree (binary-tree or triple-tree). A CTU is first partitioned by a region tree (RT). A RT leaf may be further split with prediction tree (PT). A PT leaf may also be further split with PT until a max PT depth is reached. A PT leaf is a basic coding unit. The PT may also be called a CU for convenience. In an example implementation, a CU cannot be further split. Prediction and transform are both applied on CU in the same way as JEM. The whole partition structure is named multiple-type-tree.

Figure 7:
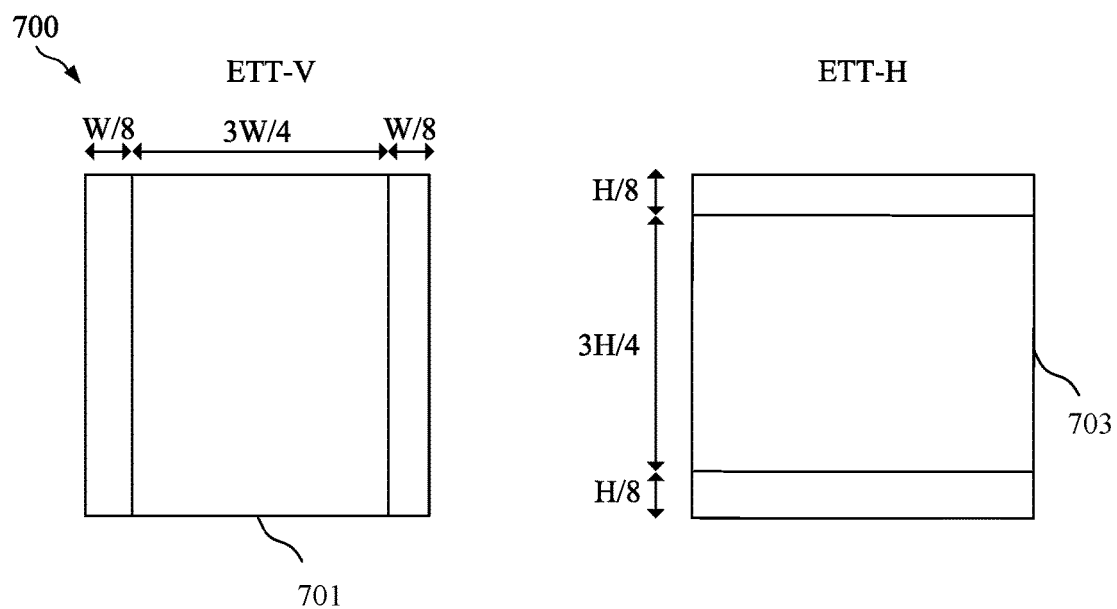
FIG. 7 is a schematic diagram of example Extended Ternary-Tree (ETT) partitioning structures.

FIG. 7 is a schematic diagram 700 of example ETT partitioning structures, including an ETT-V split 701 and an ETT-H split 703. When employing ETT, a block with dimensions width times height (W×H) is split into three partitions with dimensions W1×H1, W2×H2, and W3×H3. W1, W2, W3, H1, H2, H3 are all integers. In an example, and at least one of the parameters is not in the form of power of 2. W1, W2, and W3 are widths of resulting sub-blocks. H1, H2, and H3 are heights of resulting sub-blocks. In one example, W2 cannot be in a form of W2=2N2 with any positive integer N2. In another example, H2 cannot be in a form of $H2=2^{N2}$ with any positive integer N2. In one example, at least one of the parameters is in the form of power of 2. In one example, W1 is in a form of $W1=2^{N1}$ with a positive integer N1. In another example, H1 is in a form of $H1=2^{N1}$ with a positive integer N1.

In one example, ETT only splits one partition in a vertical direction, for example where W1=a1*W, W2=a2*W, and W3=a3*W, where a1+a2+a3=1, and where H1=H2=H3=H. This kind of ETT is vertical split and may be referred to as ETT-V. In one example, ETT-V split 701 can be used where W1=W/8, W2=3*W/4, W3=W/8, and H1=H2=H3=H. In one example, ETT only splits one partition in horizontal direction, for example where H1=a1*H, H2=a2*H, and H3=a3*H, where a1+a2+a3=1, and where W1=W2=W3=W. This kind of ETT is a horizontal split and may be referred to as ETT-H. In one example, ETT-H split 703 can be used where H1=H/8, H2=3*H/4, H3=H/8, and W1=W2=W3=W.

Figure 8:
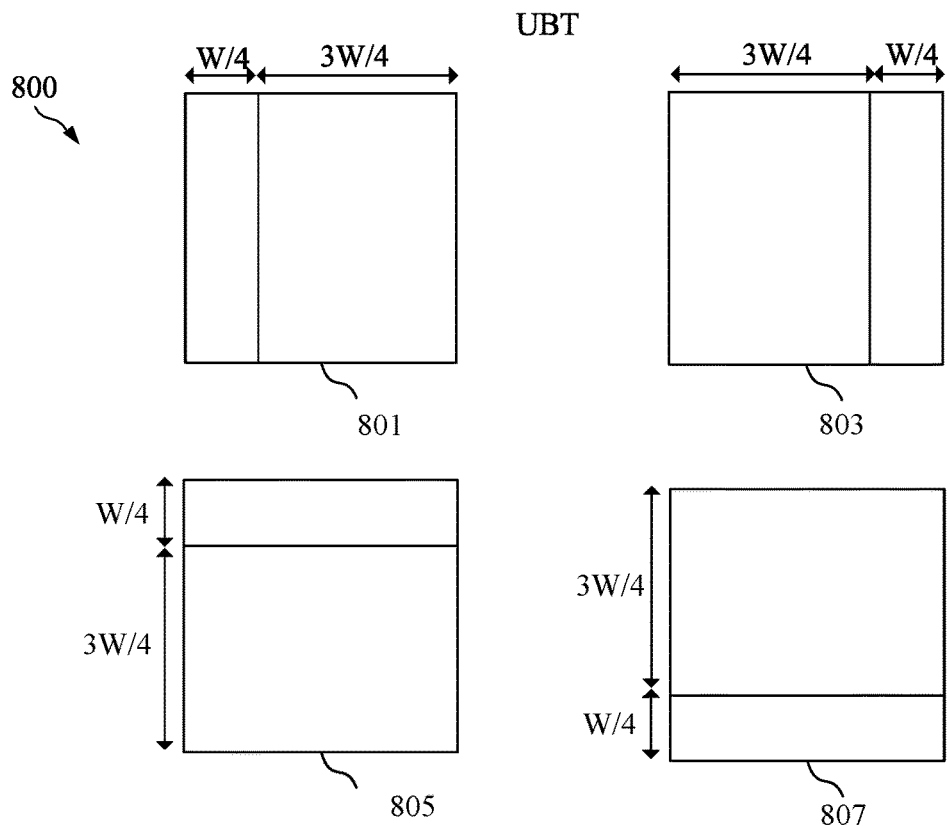
FIG. 8 is a schematic diagram of example ¼ Unsymmetric Binary Tree (UBT) partitioning structures.

FIG. 8 is a schematic diagram 800 of example ¼ UBT partitioning structures, which includes vertical UBT (UBT-V) partitions and horizontal UBT (UBT-H) partitions. A block of dimensions W×H can be split into two sub-blocks dimensions W1×H1 and W2×H2, where one of the sub-blocks is a dyadic block and the other is a non-dyadic block. Such a split is named as Unsymmetric Binary Tree (UBT) split. In one example, W1=a×W, W2=(1−a)×W, and H1=H2=H. In such a case, the partition may be called a vertical UBT (UBT-V). In one example, a may be smaller than ½, such as ¼, ⅛, ¹⁄₁₆, ¹⁄₃₂, ¹⁄₆₄, etc. In such a case, the partition may be called a Type 0 UBT-V, an example of which is shown as split 801. In one example, a may be larger than ½, such as ¾, ⅞, ¹⁵⁄₁₆, ³¹⁄₃₂, ⁶³⁄₆₄, etc. In such a case, the partition is called a Type 1 UBT-V, an example of which is shown as split 803. In one example, H1=a×H, H2=(1−a)×H, W1=W2=W. In such a case, the partition may be called a horizontal UBT (UBT-H). In one example, a may be smaller than ½, such as ¼, ⅛, ¹⁄₁₆, ¹⁄₃₂, ¹⁄₆₄, etc. In such a case, the partition is called a Type 0 UBT-H, an example of which is shown as split 805. In one example, a may be larger than ½, such as ¾, ⅞, ¹⁵⁄₁₆, ³¹⁄₃₂, ⁶³⁄₆₄, etc. In such a case, the partition may be called a Type 1 UBT-H, an example of which is shown as split 807.

Inter prediction is now discussed, for example as used in HEVC. Inter prediction is the process of coding a block in current picture based on a reference block in a different picture called a reference picture. Inter prediction relies on the fact that the same objects tend to appear in multiple pictures in most video streams. Inter prediction matches a current block with a group of samples to a reference block in another picture with similar samples (e.g., generally depicting the same object at a different time in a video sequence). Instead of encoding each of the samples, the current block is encoded as a motion vector (MV) pointing to the reference block. Any difference between the current block and the reference block is encoded as residual. Accordingly, the current block is coded by reference to the reference block. At the decoder side, the current block can be decoded using only the MV and the residual so long as the reference block has already been decoded. Blocks coded according to inter prediction are significantly more compressed than blocks coded according to intra prediction. Inter prediction can be performed as unidirectional inter prediction or bidirectional inter prediction. Unidirectional inter prediction uses a MV pointing to a single block in a single reference picture and bidirectional inter prediction uses two MVs pointing to two different reference blocks in two different reference pictures. A slice of a picture coded according to unidirectional inter prediction is known as a P slice and a slice of a picture coded according to bidirectional inter prediction is known as a B slice. The portion of the current block that can be predicted from the reference block is known as a prediction unit (PU). Accordingly, a PU plus the corresponding residual results in the actual sample values in a CU of a coded block.

Each inter predicted PU has motion parameters for one or two reference picture lists. Motion parameters include a motion vector and a reference picture index. Usage of one of the two reference picture lists may also be signaled using inter prediction identification (ID) code (inter_pred_idc). Motion vectors may be explicitly coded as deltas (differences) relative to predictors. The following described various mechanisms for encoding the motion parameters.

When a CU is coded with skip mode, one PU is associated with the CU, and there are no significant residual coefficients, no coded motion vector delta or reference picture index is used. A merge mode can also be specified whereby the motion parameters for the current PU are obtained from neighboring PUs, including spatial and temporal candidates. The parameters can then be signaled by employing an index that corresponds to a selected candidate or candidates. Merge mode can be applied to any inter predicted PU, and is not limited to skip mode. The alternative to merge mode is the explicit transmission of motion parameters. In this case, a motion vector (coded as a motion vector difference compared to a motion vector predictor), a corresponding reference picture index for each reference picture list, and reference picture list usage are signaled explicitly for each PU. This signaling mode is referred to as AMVP.

When signaling indicates that one of the two reference picture lists is to be used, the PU is produced from one block of samples. This is referred to as uni-prediction. Uni-prediction is available both for P-slices and B-slices. When signaling indicates that both of the reference picture lists are to be used, the PU is produced from two blocks of samples. This is referred to as 'bi-prediction'. Bi-prediction is available for B-slices only.

The following text provides the details on the inter prediction modes in HEVC. Merge mode is now discussed. Merge mode generates a list of candidate MVs. The encoder selects a candidate MV as the MV for a block. The encoder then signals an index corresponding to the selected candidate. This allows the MV to be signaled as a single index value. The decoder generates the candidate list in the same manner as the encoder and uses the signaled index to determine the indicated MV.

Figure 9:
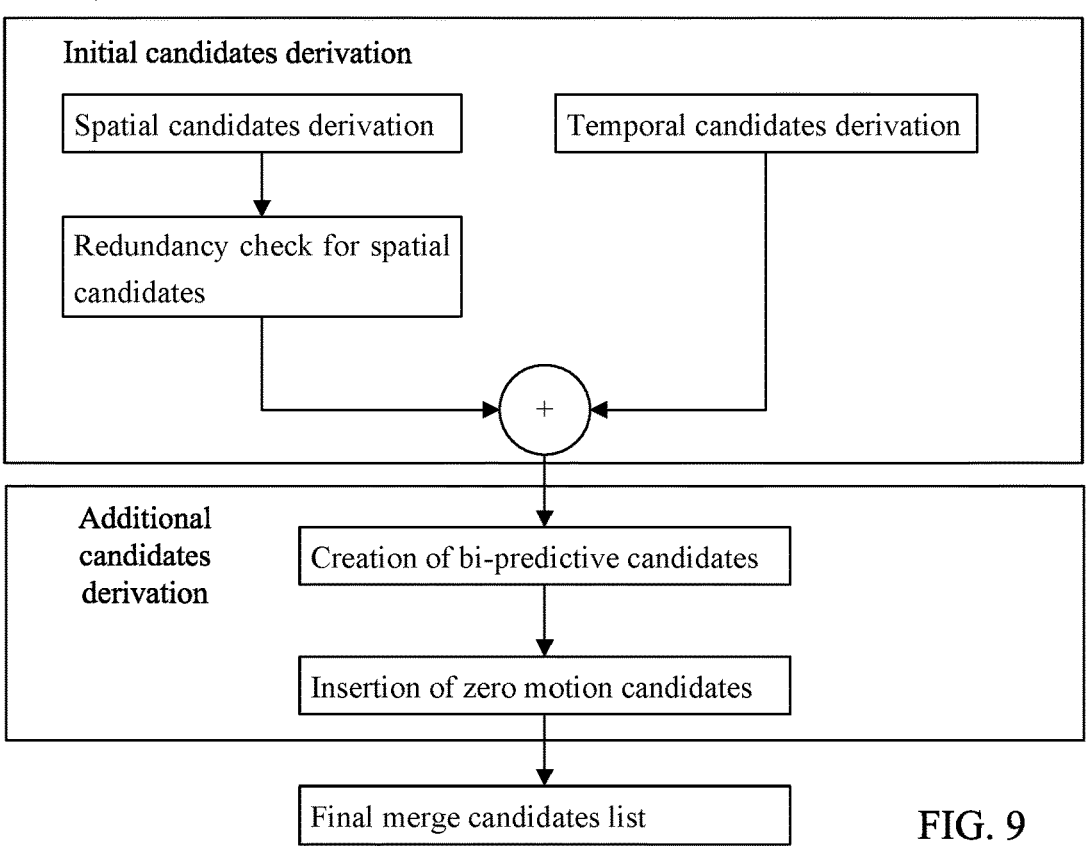
FIG. 9 is a schematic diagram of an example process for deriving a candidate list in merge mode as used for video coding according to inter prediction.

FIG. 9 is a schematic diagram of an example process 900 for deriving a candidate list in merge mode as used for video coding according to inter prediction. Accordingly, derivation of candidates for merge mode is now discussed. When a PU is predicted using merge mode, an index pointing to an entry in the merge candidates list is parsed from the bitstream and used to retrieve the motion information. The construction of this list can be summarized according to the following sequence of steps as shown in process 900. Step 1 includes initial candidates derivation. Step 1.1 includes spatial candidates derivation. Step 1.2 includes a redundancy check for spatial candidates. Step 1.3 includes temporal candidates derivation. Step 2 includes additional candidates insertion. Step 2.1 includes creation of bi-predictive candidates. Step 2.2 includes insertion of zero motion candidates, which results in a final merge candidates list as shown in process 900.

For spatial merge candidate derivation, a maximum of four merge candidates are selected among candidates that are located in five different positions. For temporal merge candidate derivation, a maximum of one merge candidate is selected among two candidates. Since a constant number of candidates for each PU is assumed at the decoder, additional candidates are generated when the number of candidates obtained from step 1 does not reach the maximum number of merge candidate (MaxNumMergeCand), which is signaled in slice header. Since the number of candidates is constant, an index of best merge candidate is encoded using truncated unary binarization. If the size of CU is equal to 8, all the PUs of the current CU share a single merge candidate list, which is identical to the merge candidate list of the 2N×2N prediction unit.

FIG. 10 is a schematic diagram illustrating example positions 1000 of spatial merge candidates used in merge mode, which are used for spatial candidates derivation. In the derivation of spatial merge candidates, a maximum of four merge candidates are selected among candidates located in the positions 1000. The order of derivation is $A_1$, $B_1$, $B_0$, $A_0$, and $B_2$. Position $B_2$ is considered only when any PU of position $A_1$, $B_1$, $B_0$, and $A_0$ is not available (e.g. because the position is part of another slice or tile) or is intra coded. After the candidate at position $A_1$ is added, the addition of the remaining candidates is subject to a redundancy check, which ensures that candidates with same motion information are excluded from the list so that coding efficiency is improved.

FIG. 11 is a schematic diagram illustrating example candidate pairs 1100 considered for a redundancy check of spatial merge candidates used in merge mode. To reduce computational complexity, not all possible candidate pairs 1100 are considered in the mentioned redundancy check. Instead, only the pairs 1100 linked with an arrow are considered. A candidate is only added to the list when the corresponding candidate used for redundancy check does not include the same motion information.

FIG. 12 is a schematic diagram illustrating example positions for a second PU used when deriving spatial merge candidates for a current PU when employing merge mode. The positions include a partition 1201 of N×2N and a partition 1203 of 2N×N. Another source of duplicate motion information is the second PU associated with partitions different from 2N×2N. When the current PU is partitioned as N×2N as shown in partition 1201, the candidate at position $A_1$ as illustrated in FIG. 10 is not considered for list construction. Adding the candidate at position $A_1$ leads to two prediction units having the same motion information, which is redundant. Similarly, position B1 as illustrated in FIG. 10 is not considered when the current PU is partitioned as 2N×N as shown in partition 1203.

Figures 13, 14:
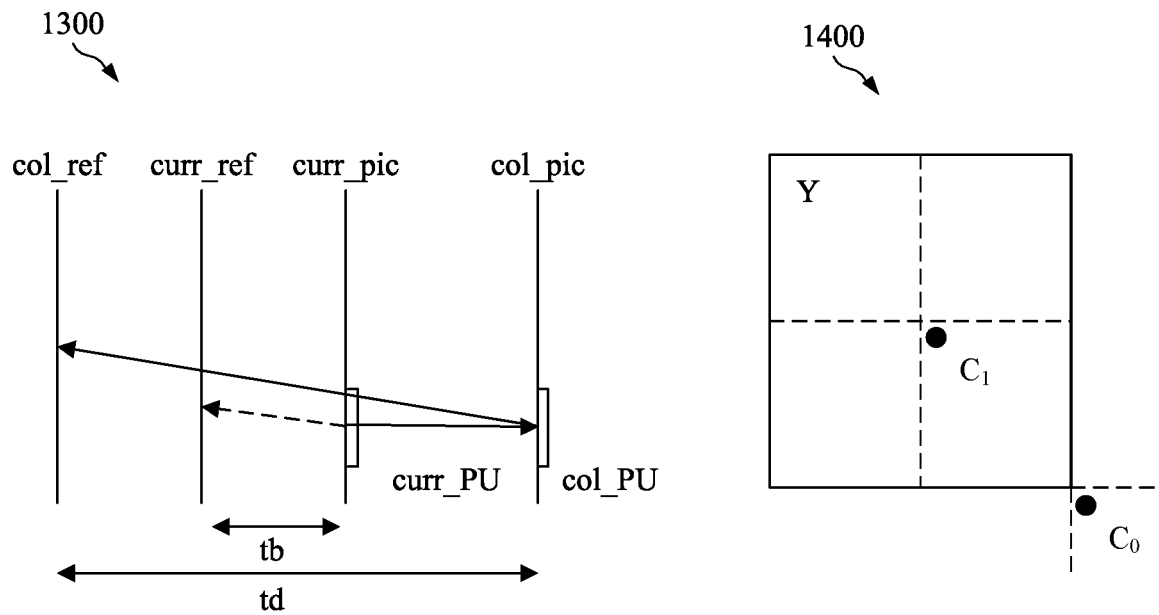
FIG. 13 is a schematic diagram illustrating motion vector scaling for a temporal merge candidate when employing merge mode.
FIG. 14 is a schematic diagram illustrating candidate positions for a temporal merge candidate when employing merge mode.

FIG. 13 is a schematic diagram illustrating motion vector scaling 1300 for a temporal merge candidate when employing merge mode. Temporal candidate derivation in merge mode is now discussed. In this step, only one candidate is added to the merge candidate list. In the derivation of this temporal merge candidate, a scaled motion vector is derived based on a co-located PU in a picture which has the smallest picture order count (POC) difference with a current picture within a given reference picture list. The reference picture list to be used for derivation of the co-located PU is explicitly signaled in the slice header. The scaled motion vector for the temporal merge candidate is obtained as shown by the dotted line in FIG. 13. The temporal merge candidate is scaled from the motion vector of the co-located PU using the POC distances tb and td. tb is defined to be the POC difference between the reference picture of the current picture and the current picture. td is defined to be the POC difference between the reference picture of the co-located picture and the co-located picture. The reference picture index of temporal merge candidate is set equal to zero. For a B-slice, two motion vectors are obtained and combined to make the bi-predictive merge candidate. One motion vector is for reference picture list 0 and the other is for reference picture list 1.

FIG. 14 is a schematic diagram 1400 illustrating candidate positions for a temporal merge candidate when employing merge mode. In the co-located PU, denoted as Y, in the reference frame, the position for the temporal candidate is selected between candidates $C_0$ and $C_1$, as depicted in diagram 1400. If the PU at position $C_0$ is not available, is intra coded, or is outside of the current CTU row, position $C_1$ is used. Otherwise, position $C_0$ is used in the derivation of the temporal merge candidate.

Figure 15:
FIG. 15 is a schematic diagram illustrating an example of a combined bi-predictive merge candidate list.

FIG. 15 is a schematic diagram 1500 illustrating an example of a combined bi-predictive merge candidate list. Additional candidate insertion is now discussed. Besides spatial and temporal merge candidates, combined bi-predictive merge candidates and a zero merge candidate can also be employed. Combined bi-predictive merge candidates are generated by utilizing spatial and temporal merge candidates. A combined bi-predictive merge candidate is only used for B slices. The combined bi-predictive candidates are generated by combining the first reference picture list motion parameters of an initial candidate with second reference picture list motion parameters of another. If these two tuples provide different motion hypotheses, they form a new bi-predictive candidate. As an example, diagram 1500 depicts the case when two candidates in the original merge candidate lists list zero (L0) and list one (L1), which include mvL0 and refIdxL0 or mvL1 and refIdxL1, are used to create a combined bi-predictive merge candidate list with combined candidates. There are numerous rules regarding the combinations which are considered to generate these additional merge candidates.

Zero motion candidates are inserted to fill the remaining entries in the merge candidates list, and therefore hit the MaxNumMergeCand capacity. These candidates have zero spatial displacement and a reference picture index which starts from zero and increases every time a new zero motion candidate is added to the list. The number of reference frames used by these candidates is one and two for unidirectional and bidirectional prediction, respectively. Finally, no redundancy check is performed on these candidates.

Motion estimation regions for parallel processing is now discussed. To speed up the encoding process, motion estimation can be performed in parallel whereby the motion vectors for all prediction units inside a specified region are derived simultaneously. The derivation of merge candidates from a spatial neighborhood may interfere with parallel processing. This is because one prediction unit cannot derive the motion parameters from an adjacent PU until the adjacent PU's associated motion estimation is completed. To mitigate the trade-off between coding efficiency and processing latency, HEVC defines the motion estimation region (MER) whose size is signaled in the picture parameter set using the log 2_parallel_merge_level_minus2 syntax element. When a MER is defined, merge candidates falling in the same region are marked as unavailable and therefore not considered in the list construction.

Figure 16:
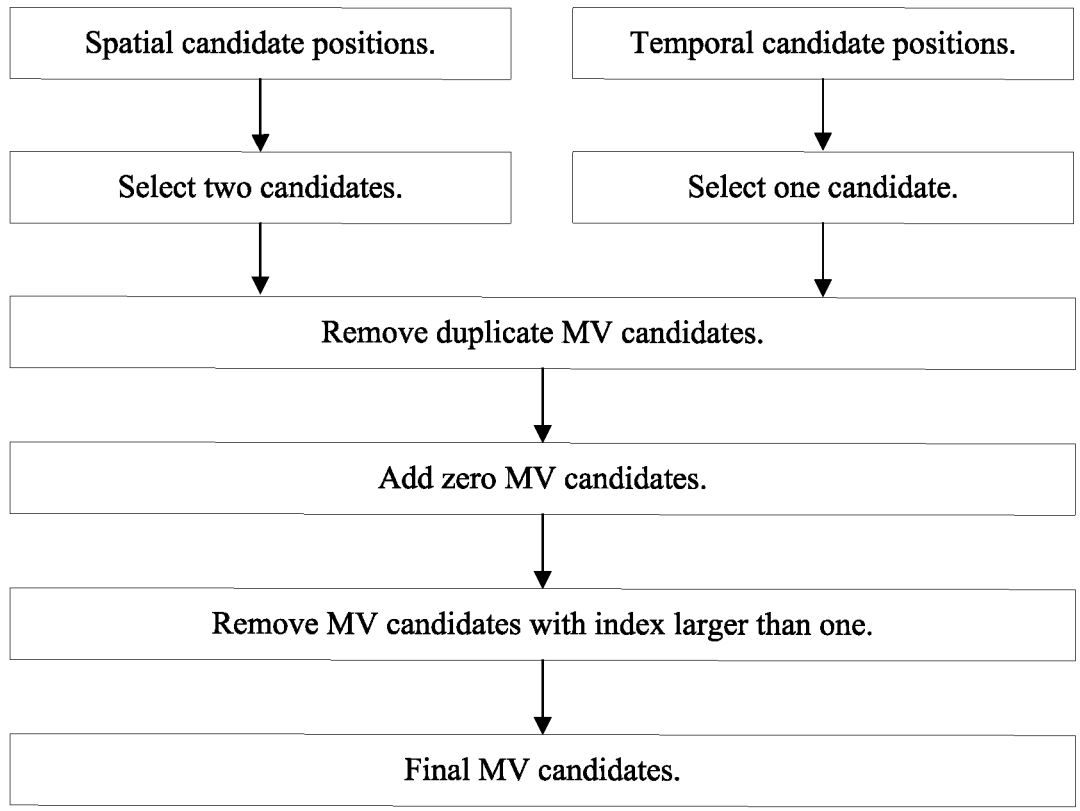
FIG. 16 is a flow chart illustrating a method of deriving motion vector prediction candidates in advanced motion vector prediction (AMVP).

FIG. 16 is a flow chart illustrating a method 1600 of deriving motion vector prediction candidates in AMVP. AMVP exploits the spatio-temporal correlation of motion vector with neighboring PUs, which is used for explicit transmission of motion parameters. For each reference picture list, a motion vector candidate list is constructed by checking availability of left and above temporally neighboring PU positions. Redundant candidates are then removed. Zero vectors are added to set the candidate list to a constant length. The encoder can select the best predictor from the candidate list and transmit the corresponding index indicating the chosen candidate. Similarly, with merge index signaling, the index of the best motion vector candidate is encoded using truncated unary code. The maximum value to be encoded in this case is 2 as shown in method 1600.

In motion vector prediction, spatial motion vector candidates and temporal motion vector candidates are considered. For spatial motion vector candidate derivation, two motion vector candidates are eventually derived based on motion vectors of each PU located in five different positions as depicted in FIG. 10. For temporal motion vector candidate derivation, one motion vector candidate is selected from two candidates derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

Spatial motion vector candidates are now discussed. In the derivation of spatial motion vector candidates, a maximum of two candidates are considered among five potential candidates as derived from PUs located in positions as depicted in FIG. 10. The positions are the same as those of motion merge. The order of derivation for the left side of the current PU is $A_0$, $A_1$, scaled $A_0$, and scaled $A_1$. The order of derivation for the above side of the current PU is $B_0$, $B_1$, $B_2$, scaled $B_0$, scaled $B_1$, and scaled $B_2$. Therefore, for each side there are four cases that can be used as motion vector candidate. This includes two cases not required to use spatial scaling, and two cases where spatial scaling is used. The four different cases are summarized as follows. No spatial scaling cases include (1) same reference picture list, and same reference picture index (same POC); and (2) different reference picture list, but same reference picture (same POC). Spatial scaling includes (3) same reference picture list, but different reference picture (different POC); and (4) different reference picture list, and different reference picture (different POC).

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 17:
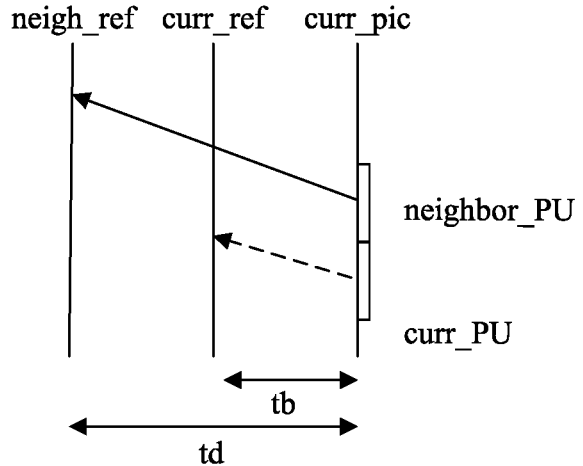
FIG. 17 is a schematic diagram illustrating an example of motion vector scaling for a spatial motion vector candidate.

FIG. 17 is a schematic diagram 1700 illustrating an example of motion vector scaling for a spatial motion vector candidate. In a spatial scaling process, the motion vector of the neighboring PU is scaled in a similar manner as temporal scaling as depicted in diagram 1700. The main difference is that the reference picture list and index of current PU is given as input. The actual scaling process is the same as that of temporal scaling.

Temporal motion vector candidates are now discussed. Apart for the reference picture index derivation, all processes for the derivation of temporal merge candidates are the same as for the derivation of spatial motion vector candidates as shown in FIG. 14. The reference picture index is signaled to the decoder.

Inter prediction methods beyond HEVC are now discussed. This includes sub-CU based motion vector prediction. In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. An ATMVP method allows each CU to fetch multiple sets of motion information from multiple blocks smaller than the current CU in the collocated reference picture. In a spatial-temporal motion vector prediction (STMVP) method motion vectors of the sub-CUs are derived recursively by using the temporal motion vector predictor and a spatial neighboring motion vector. To preserve a more accurate motion field for sub-CU motion prediction, the motion compression for the reference frames is currently disabled.

Figure 18:
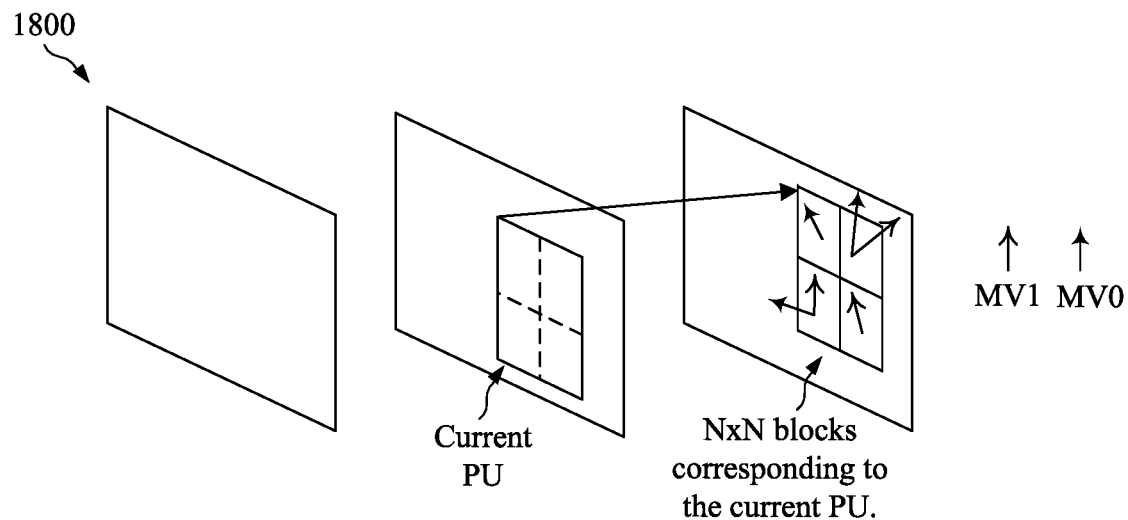
FIG. 18 is a schematic diagram illustrating an example of alternative temporal motion vector prediction (ATMVP) motion prediction for a coding unit (CU).

FIG. 18 is a schematic diagram 1800 illustrating an example of ATMVP motion prediction for a CU. In the ATMVP method, the motion vectors temporal motion vector prediction (TMVP) is modified by fetching multiple sets of motion information from blocks smaller than the current CU. This includes motion vectors and reference indices. As shown in diagram 1800, the sub-CUs are square N×N blocks (N is set to 4 by default). ATMVP predicts the motion vectors of the sub-CUs within a CU in two steps. The first step is to identify the corresponding block in a reference picture with a temporal vector. The reference picture is called the motion source picture. The second step is to split the current CU into sub-CUs and obtain the motion vectors as well as the reference indices of each sub-CU from the block corresponding to each sub-CU as shown in diagram 1800.

In the first step, a reference picture and the corresponding block is determined by the motion information of the spatial neighboring blocks of the current CU. To avoid the repetitive scanning process of neighboring blocks, the first merge candidate in the merge candidate list of the current CU is used. The first available motion vector as well as the associated reference index are set to be the temporal vector and the index to the motion source picture. In this way, the corresponding block may be more accurately identified in ATMVP when compared with TMVP. The corresponding block (sometimes called the collocated block) is in a bottom-right or center position relative to the current CU.

In the second step, a corresponding block of the sub-CU is identified by the temporal vector in the motion source picture by adding the coordinate of the current CU to the temporal vector. For each sub-CU, the motion information of a corresponding block (the smallest motion grid that covers the center sample) is used to derive the motion information for the sub-CU. After the motion information of a corresponding N×N block is identified, the motion information is converted to the motion vectors and reference indices of the current sub-CU in the same way as TMVP. Motion scaling and other procedures also apply. For example, the decoder checks whether the low-delay condition is fulfilled. This occurs when the POCs of all reference pictures of the current picture are smaller than the POC of the current picture. The decoder may also use motion vector MVx to predict motion vector MVy for each sub-CU. MVx is the motion vector corresponding to reference picture list X and MVy is the motion vector for picture Y, with X being equal to 0 or 1 and Y being equal to 1−X.

Figure 19:
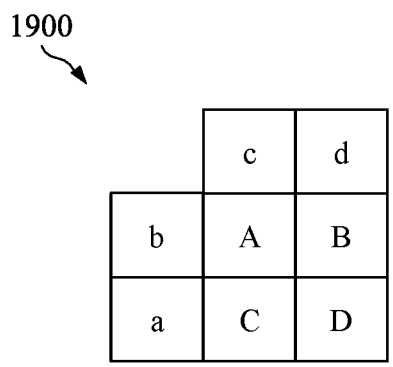
FIG. 19 is a schematic diagram illustrating an example of spatial-temporal motion vector prediction for sub-CUs.

FIG. 19 is a schematic diagram 1900 illustrating an example of spatial-temporal motion vector prediction for sub-CUs. In spatial-temporal motion vector prediction, the motion vectors of the sub-CUs are derived recursively following raster scan order as shown in diagram 1900. As an example, an 8×8 CU may contain four 4×4 sub-CUs denoted as A, B, C, and D. The neighboring 4×4 blocks in the current frame are labelled as a, b, c, and d. The motion derivation for sub-CU A starts by identifying A's two spatial neighbors. The first neighbor is the N×N block above sub-CU A, which includes block c. When block c is not available or is intra coded, the other N×N blocks above sub-CU A are checked from left to right starting at block c. The second neighbor is a block to the left of the sub-CU A, which includes block b. When block b is not available or is intra coded, other blocks to the left of sub-CU A are checked from top to bottom starting at block b. The motion information obtained from the neighboring blocks for each list is scaled to the first reference frame for a given list. Next, the TMVP of sub-block A is derived. The motion information of the collocated block at location D is fetched and scaled accordingly. Finally, after retrieving and scaling the motion information, all available motion vectors (up to three) are averaged separately for each reference list. The averaged motion vector is assigned as the motion vector of the current sub-CU.

Sub-CU motion prediction mode signaling is now discussed. The sub-CU modes are enabled as additional merge candidates and there is no additional syntax element used to signal the modes. Two additional merge candidates are added to the merge candidates list of each CU to represent the ATMVP mode and the STMVP mode. Up to seven merge candidates are used when the sequence parameter set indicates that ATMVP and STMVP are enabled. The encoding logic of the additional merge candidates is the same as for the merge candidates described above. Accordingly, for each CU in a P or B slice, two more RD checks is employed for the two additional merge candidates. In the JEM, all bins of the merge index are context coded by CABAC. In HEVC, only the first bin is context coded and the remaining bins are context bypass coded.

Adaptive motion vector difference resolution is now discussed. In HEVC, motion vector differences (MVDs) between the motion vector and predicted motion vector of a PU are signaled in units of quarter luma samples when use_integer_mv_flag is equal to 0 in the slice header. In the JEM, a locally adaptive motion vector resolution (LAMVR) is employed. In the JEM, MVD can be coded in units of quarter luma samples, integer luma samples, and/or four luma samples. The MVD resolution is controlled at the CU level, and MVD resolution flags are conditionally signaled for each CU that has at least one non-zero MVD component. For a CU that has at least one non-zero MVD component, a first flag is signaled to indicate whether quarter luma sample MV precision is used in the CU. When the first flag indicates that quarter luma sample MV precision is not used (e.g., first flag is equal to one), another flag is signaled to indicate whether integer luma sample MV precision or four luma sample MV precision is used. When the first MVD resolution flag of a CU is zero, or not coded for a CU (e.g., all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level rate distortion (RD) checks are used to determine which MVD resolution should be used for a CU. The CU-level RD check is performed three times for each MVD resolution. To accelerate encoder speed, the following encoding schemes are applied in the JEM. During the RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times. A RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Higher motion vector storage accuracy is now discussed. In HEVC, motion vector accuracy is one-quarter pel (one-quarter luma sample and one-eighth chroma sample for 4:2:0 video). In the JEM, the accuracy for the internal motion vector storage and the merge candidate increases to $1/16$ pel. The higher motion vector accuracy ($1/16$ pel) is used in motion compensation inter prediction for the CU coded with skip/merge mode. For the CU coded with normal AMVP mode, either the integer-pel or quarter-pel motion is used. SHVC upsampling interpolation filters, which have same filter length and normalization factor as HEVC motion compensation interpolation filters, are used as motion compensation interpolation filters for the additional fractional pel positions. The chroma component motion vector accuracy is $1/32$ sample in the JEM. The additional interpolation filters of $1/32$ pel fractional positions are derived by using the average of the filters of the two neighboring $1/16$ pel fractional positions.

Figure 20:
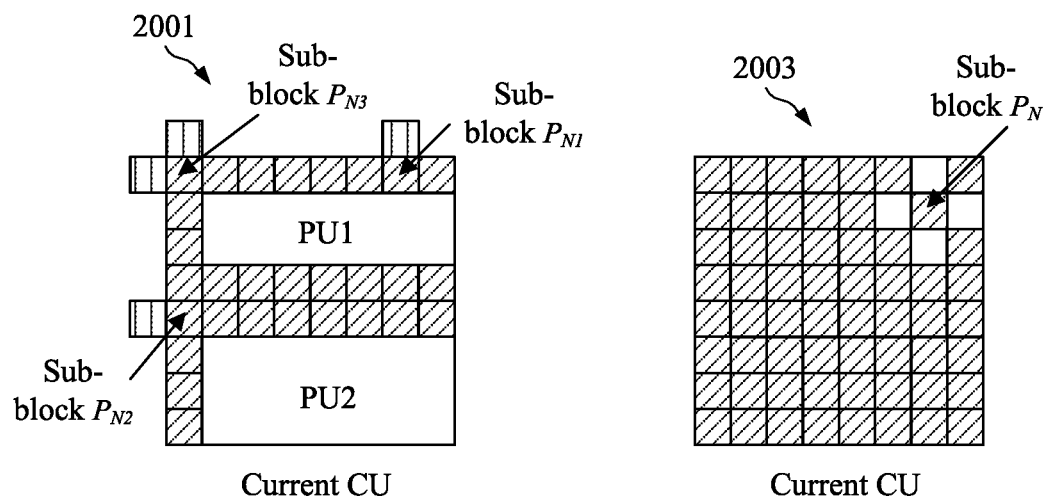
FIG. 20 is a schematic diagram illustrating an example of application of overlapped block motion compensation (OBMC) to sub-blocks.

FIG. 20 is a schematic diagram illustrating an example of application of OMBC to sub-blocks. CU 2001 illustrates application of OMBC for subblocks at CU/PU boundaries. CU 2003 illustrates application of OBMC to sub-PUs in ATMVP mode. In the JEM, OBMC can be switched on and off using syntax at the CU level. The diagonal hashing in CU 2001 show sub-blocks when OBMC applies. Accordingly, when OBMC is used in the JEM, the OBMC is performed for all motion compensation (MC) block boundaries except the right and bottom boundaries of a CU. OBMC is applied for both the luma and chroma components. In the JEM, a MC block corresponds to a coding block. When a CU is coded with sub-CU mode, which includes sub-CU merge, affine, and FRUC mode, each sub-block of the CU is a MC block. To process CU boundaries in a uniform fashion, OBMC is performed at sub-block level for all MC block boundaries, where sub-block size is set equal to 4×4 as shown in CU 2001.

When OBMC applies to the current sub-block, motion vectors of up to four connected neighboring sub-blocks are used in addition to the current motion vectors to derive the prediction block for the current sub-block. The four connected neighboring sub-blocks are used when available and when not identical to the current motion vector. The four connected neighboring sub-blocks are illustrated in CU 2001 by vertical hashing. These multiple prediction blocks based on multiple motion vectors are combined to generate the final prediction signal of the current sub-block.

A prediction block based on motion vectors of a neighboring sub-block is denoted as $P_N$, with N indicating an index for the neighboring above, below, left, and/or right sub-block. In the example shown, the motion vector of the above neighboring sub-block is used in OBMC of $P_{N1}$, the motion vector of the left neighboring sub-block is used in OBMC of $P_{N2}$, and the motion vector of the above neighboring sub-block and the left neighboring sub-block are used in OBMC of $P_{N3}$.

A prediction block based on motion vectors of the current sub-block is denoted as $P_C$. When $P_N$ is based on the motion information of a neighboring sub-block that contains the same motion information as the current sub-block, the OBMC is not performed from $P_N$. Otherwise, every sample of $P_N$ is added to the same sample in $P_C$. For example, four rows/columns of $P_N$ are added to $P_C$. The weighting factors $\{1/4, 1/8, 1/16, 1/32\}$ are used for $P_N$ and the weighting factors $\{3/4, 7/8, 15/16, 31/32\}$ are used for $P_C$. The exception are small MC blocks where height or width of the coding block is equal to 4 or a CU is coded with sub-CU mode. In such case, only two rows/columns of $P_N$ are added to $P_C$. In this case weighting factors {¼, ⅛} are used for $P_N$ and weighting factors {¾, ⅞} are used for $P_C$. For $P_N$ generated based on motion vectors of vertically (horizontally) neighboring sub-block, samples in the same row (column) of $P_N$ are added to $P_C$ with a same weighting factor. As shown in CU 2003, sub-block $P_N$ is adjacent to four neighboring sub-blocks, which are illustrated without hashing. The motion vectors of four neighboring sub-blocks are used in OBMC for sub-block $P_N$.

In the JEM, a CU level flag is signaled to indicate whether OBMC is applied or not for the current CU when the current CU with size less than or equal to 256 luma samples. For the CUs with a size larger than 256 luma samples or not coded with AMVP mode, OBMC is applied by default. At the encoder, when OBMC is applied for a CU, the impact of OBMC is considered during the motion estimation stage. The prediction signal formed by OBMC using motion information of the top neighboring block and the left neighboring block is used to compensate the top and left boundaries of the original signal of the current CU. The normal motion estimation process is then applied.

Figure 21:
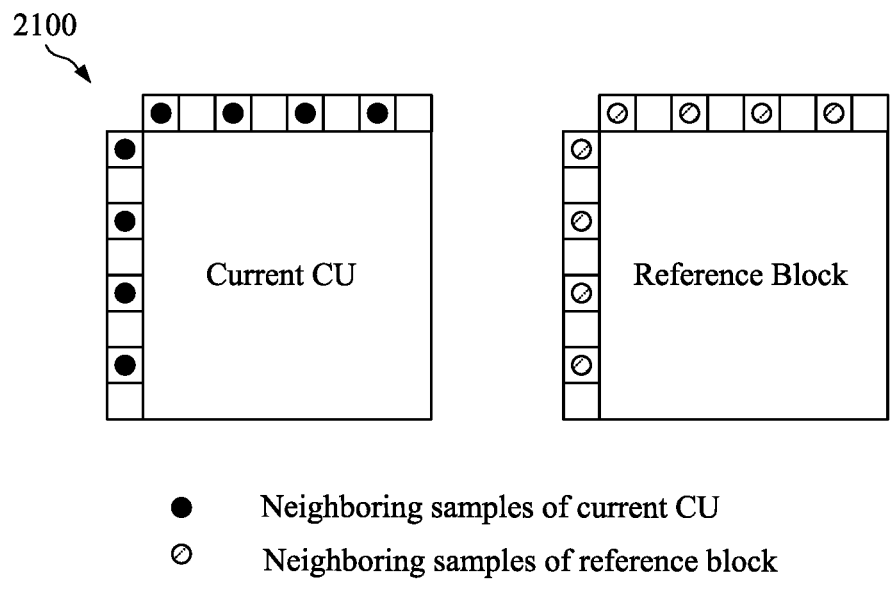
FIG. 21 is a schematic diagram illustrating an example of neighboring samples used for deriving illumination compensation parameters.

FIG. 21 is a schematic diagram 2100 illustrating an example of neighboring samples used for deriving illumination compensation parameters. Local illumination compensation (LIC) is performed based on a linear model for illumination changes using a scaling factor a and an offset b. LIC is enabled or disabled adaptively for each inter-mode coded CU. When LIC applies for a CU, a least square error method is employed to derive the parameters a and b by using the neighboring samples of the current CU and their corresponding reference samples. As shown in diagram 2100, the subsampled (2:1 subsampling) neighboring samples of the CU and the corresponding samples (identified by motion information of the current CU or sub-CU) in the reference picture are used. The illumination compensation (IC) parameters are derived and applied for each prediction direction separately.

When a CU is coded with merge mode, the LIC flag is copied from neighboring blocks, in a manner similar to motion information copy in merge mode. Otherwise, an LIC flag is signaled for the CU to indicate whether LIC applies or not. When LIC is enabled for a picture, an additional CU level RD check is used to determine whether LIC is applied or not for a CU. When LIC is enabled for a CU, a mean-removed sum of absolute difference (MR-SAD) and a mean-removed sum of absolute Hadamard-transformed difference (MR-SATD) are used instead of SAD and sum of absolute transformed difference (SATD) for an integer pel motion search and fractional pel motion search, respectively. To reduce the encoding complexity, the following encoding scheme is applied in the JEM. LIC is disabled for the entire picture when there is no clear illumination change between a current picture and corresponding reference pictures. To identify this situation, histograms of a current picture and every reference picture of the current picture are calculated at the encoder. If the histogram difference between the current picture and every reference picture of the current picture is smaller than a specified threshold, LIC is disabled for the current picture. Otherwise, LIC is enabled for the current picture.

Figure 22:
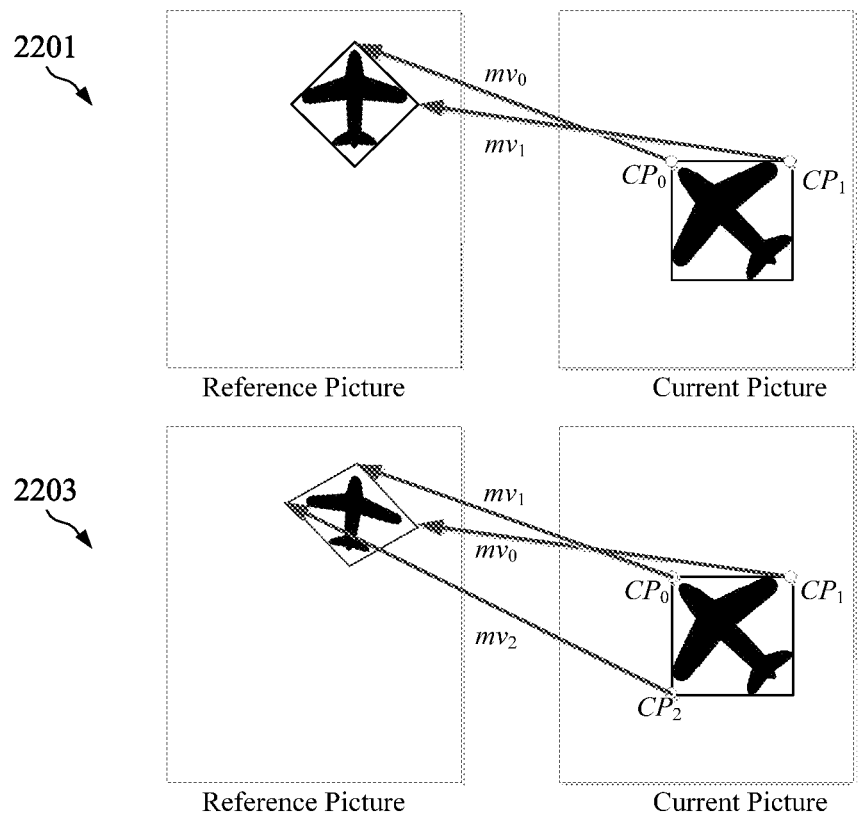
FIG. 22 is a schematic diagram illustrating an example of affine models for affine motion compensation prediction.

FIG. 22 is a schematic diagram illustrating an example of affine models for affine motion compensation prediction. Model 2201 is a four parameter affine model and model 2203 is a six parameter affine model. In HEVC, only the translation motion model is applied for motion compensation prediction (MCP). In the real video, many kinds of motion occur, such as zoom in/out, rotation, perspective motions, and the other irregular motions. In VVC, a simplified affine transform motion compensation prediction is applied. As shown FIG. 22, the affine motion field of the block is described by two control point motion vectors for model 2201 (the 4-parameter affine model) or three control point motion vectors for model 2203 (the 6-parameter affine model).

The motion vector field (MVF) of a block is described by the following equation with the 4-parameter affine model and the 6-parameter affine model respectively:

$$\begin{cases} mv^h(x, y) = ax - by + c = \dfrac{(mv_1^h - mv_0^h)}{w}x - \dfrac{(mv_1^v - mv_0^v)}{w}y + mv_0^h \\ mv^v(x, y) = bx + ay + d = \dfrac{(mv_1^v - mv_0^v)}{w}x + \dfrac{(mv_1^h - mv_0^h)}{w}y + mv_0^v \end{cases} \quad (1)$$

$$\begin{cases} mv^h(x, y) = ax + cy + e = \dfrac{(mv_1^h - mv_0^h)}{w}x + \dfrac{(mv_2^h - mv_0^h)}{h}y + mv_0^h \\ mv^v(x, y) = bx + dy + f = \dfrac{(mv_1^v - mv_0^v)}{w}x + \dfrac{(mv_2^v - mv_0^v)}{h}y + mv_0^v \end{cases} \quad (2)$$

where ($mv_0^h$, $mv_0^v$) is the motion vector of the top-left corner control point, ($mv_1^h$, $mv_1^v$) is the motion vector of the top-right corner control point, ($mv_2^h$, $mv_2^v$) is the motion vector of the bottom-left corner control point, and (x, y) represents the coordinate of a representative point relative to the top-left sample within a current block. The control point (CP) motion vectors may be signaled (like in the affine AMVP mode) or derived on-the-fly (like in the affine merge mode). w and h are the width and height of the current block. In practice, the division is implemented by right-shift with a rounding operation. In VVC test model (VTM), the representative point is defined to be the center position of a sub-block. For example, when the coordinate of the left-top corner of a sub-block relative to the top-left sample within a current block is (xs, ys), the coordinate of the representative point is defined to be (xs+2, ys+2).

In a division-free design, (1) and (2) are implemented as $$\begin{cases} iDMvHorX = (mv_1^h - mv_0^h) \ll (S - \log_2(w)) \\ iDMvHorY = (mv_1^v - mv_0^v) \ll (S - \log_2(w)) \end{cases} \quad (3)$$

For the 4-parameter affine model shown in (1):

$$\begin{cases} iDMvVerX = -iDMvHorY \\ iDMvVerY = iDMvHorX \end{cases} \quad (4)$$

For the 6-parameter affine model shown in (2):

$$\begin{cases} iDMvVerX = (mv_2^h - mv_0^h) \ll (S - \log_2(h)) \\ iDMvVerY = (mv_2^v - mv_0^v) \ll (S - \log_2(h)) \end{cases} \quad (5)$$

Finally, $$\begin{cases} mv^h(x, y) = \text{Normalize}(iDMvHorX \cdot x + iDMvVerX \cdot y + (mv_0^h \ll S), S) \\ mv^v(x, y) = \text{Normalize}(iDMvHorY \cdot x + iDMvVerY \cdot y + (mv_0^v \ll S), S) \end{cases} \quad (6)$$

$$\text{Normalize}(Z, S) = \begin{cases} (Z + \text{Off}) \gg S & \text{if } Z \geq 0 \\ -((-Z + \text{Off}) \gg S) & \text{Otherwise} \end{cases} \text{Off} = 1 \ll (S-1) \quad (7)$$

$$\text{Off} = 1 \ll (S-1)$$

where S represents the calculation precision. In VVC, S=7. In VVC, the MV used in MC for a sub-block with the top-left sample at (xs, ys) is calculated by (6) with x=xs+2 and y=ys+2.

Figure 23:
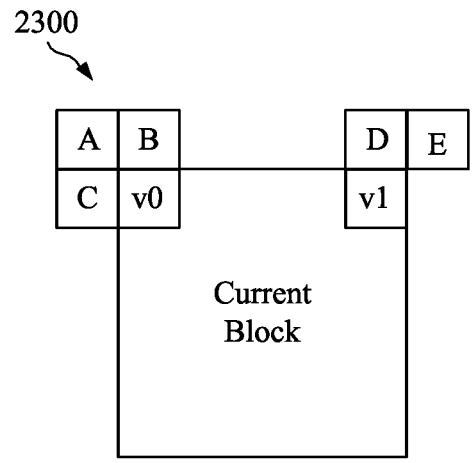
FIG. 23 is a schematic diagram illustrating an example of motion vector prediction for affine inter prediction.

FIG. 23 is a schematic diagram 2300 illustrating an example of motion vector prediction for affine inter prediction. To derive a motion vector of each 4×4 sub-block, the motion vector of the center sample of each sub-block, as shown in diagram 2300, is calculated according to Eq. (1) or (2) and rounded to 1/16 fraction accuracy. Then the motion compensation interpolation filters are applied to generate the prediction of each sub-block with derived motion vector. The block is divided into multiple sub-blocks and motion information for each block is derived based on the derived CP MVs of current block.

Figure 24:
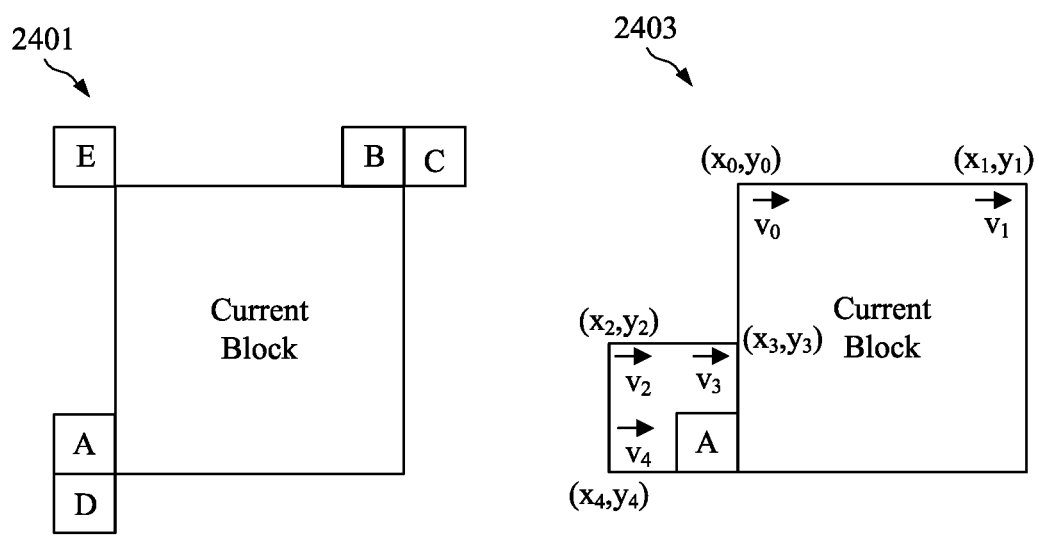
FIG. 24 is a schematic diagram illustrating an example of candidates for affine inter prediction.

FIG. 24 is a schematic diagram 2400 illustrating an example of candidates for affine inter prediction. When a CU is applied in affine merge (AF_MERGE) mode, the first block is coded with affine mode from valid neighbor reconstructed blocks. The selection order for the candidate block is from left, above, above right, left bottom, and above left as shown in block 2401. If the neighbor left bottom block A is coded in affine mode as shown in block 2403, the motion vectors $v_2$, $v_3$, and $v_4$ of the top left corner, above right corner, and left bottom corner of the CU which contains the block A are derived. The motion vector $v_0$ of the top left corner on the current CU is calculated according to $v_2$, $v_3$, and $v_4$. The motion vector $v_1$ of the above right of the current CU is calculated.

After the control point MV (CPMV) of the current CU $v_0$ and $v_1$ are derived, according to the simplified affine motion model Equation 1, the MVF of the current CU is generated. In order to identify whether the current CU is coded with AF_MERGE mode, an affine flag is signaled in the bitstream when there is at least one neighbor block coded in affine mode.

Pattern matched motion vector derivation (PMMVD) mode is a special merge mode based on Frame-Rate Up Conversion (FRUC) techniques. With this mode, motion information of a block is derived at decoder side and not signaled by the encoder. A FRUC flag is signaled for a CU when a merge flag for the CU is true. When the FRUC flag is false, a merge index is signaled and the regular merge mode is used. When the FRUC flag is true, an additional FRUC mode flag is signaled to indicate which method (bilateral matching or template matching) is to be used to derive motion information for the block.

At encoder side, the decision on whether using FRUC merge mode for a CU is based on RD cost selection in a similar manner as normal merge candidate. The two matching modes (bilateral matching and template matching) are both checked for a CU by using RD cost selection. The one leading to the minimal cost is further compared to other CU modes. If a FRUC matching mode is the most efficient one, a FRUC flag is set to true for the CU and the related matching mode is used.

A motion derivation process in FRUC merge mode has two steps. A CU-level motion search is first performed, and then followed by a sub-CU level motion refinement. At the CU level, an initial motion vector is derived for the whole CU based on bilateral matching or template matching. A list of MV candidates is generated, and the candidate which leads to the minimum matching cost is selected as the starting point for further CU level refinement. Then a local search based on bilateral matching or template matching around the starting point is performed. The MV that results in the minimum matching cost is taken as the MV for the whole CU. Subsequently, the motion information is further refined at the sub-CU level with the derived CU motion vectors as the starting points.

For example, the following derivation process is performed for a width (W) times height (H) CU motion information derivation. At the first stage, the MV for the whole W×H CU is derived. At the second stage, the CU is further split into M×M sub-CUs. The value of M is calculated. D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \tag{7}$$

Figure 25:
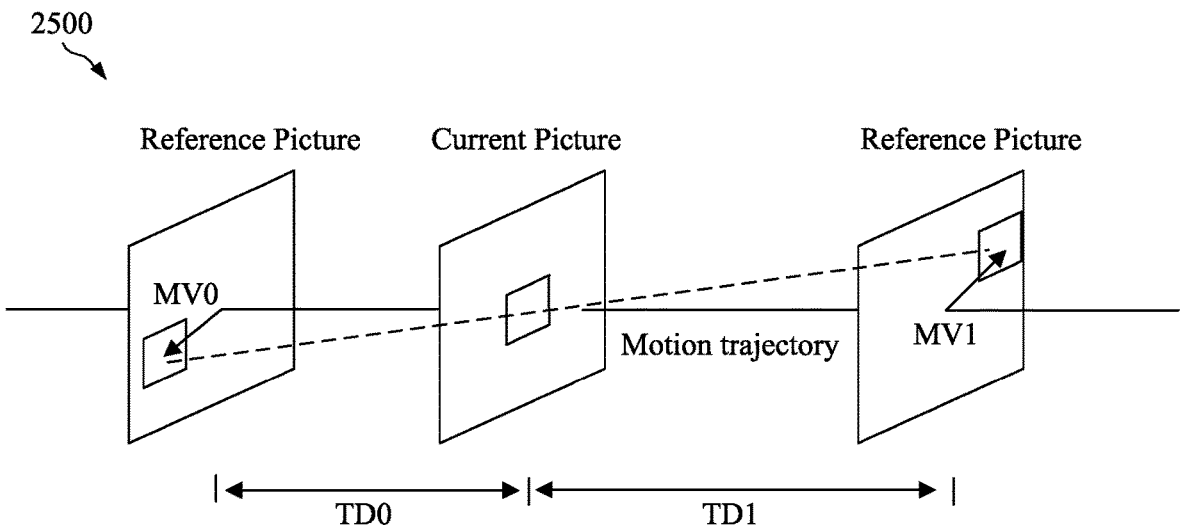
FIG. 25 is a schematic diagram illustrating an example of bilateral matching used in bidirectional inter prediction.

FIG. 25 is a schematic diagram 2500 illustrating an example of bilateral matching used in bidirectional inter prediction. As shown in diagram 2500, bilateral matching is used to derive motion information of the current CU in the current picture by finding the closest match between two blocks along a motion trajectory traversing the current CU when passing between two different reference pictures. Under the assumption of continuous motion trajectory, the motion vectors MV0 and MV1 pointing to the two reference blocks have a length that is proportional to the temporal distances, denoted as TD0 and TD1, between the current picture and the two reference pictures. When the current picture is temporally between the two reference pictures and the temporal distance from the current picture to the two reference pictures is equal, the bilateral matching becomes mirror based bi-directional MV.

Figure 26:
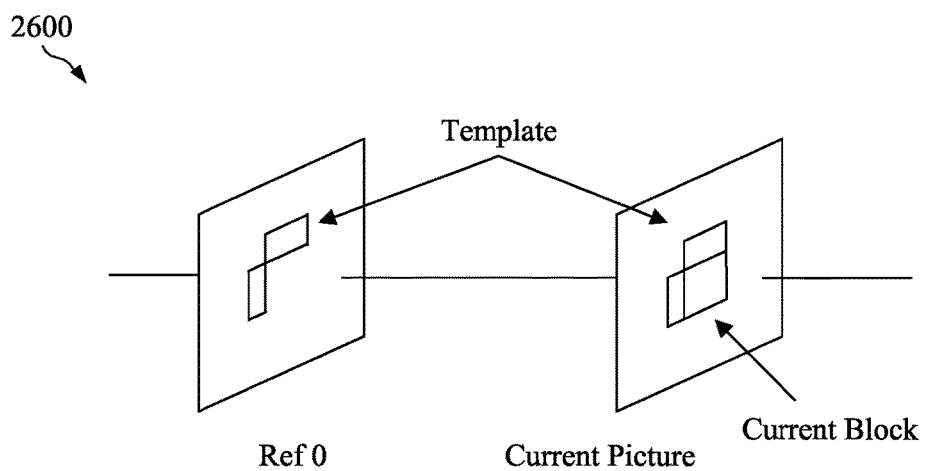
FIG. 26 is a schematic diagram illustrating an example of template matching used in inter prediction.

FIG. 26 is a schematic diagram 2600 illustrating an example of template matching used in inter prediction, in this case unidirectional inter prediction. As shown in diagram 2600, template matching is used to derive motion information of the current CU by finding the closest match between a template (top and/or left neighboring blocks of the current CU) in the current picture and a block (same size to the template) in a reference picture. The template matching is applied to AMVP mode and FRUC merge mode. In the JEM and in HEVC, AMVP has two candidates. A candidate can be derived with template matching. When the candidate derived by template matching is different to the first existing AMVP candidate, the candidate derived by template matching is inserted at the very beginning of the AMVP candidate list. Then the list size is set to two (e.g., to remove the second existing AMVP candidate). When applied to AMVP mode, only CU level search is applied.

A CU level MV candidate set is now discussed. The MV candidate set at the CU level comprises: original AMVP candidates when the current CU is in AMVP mode; all merge candidates; several MVs in the interpolated MV field; and top and left neighboring motion vectors. When using bilateral matching, each valid MV of a merge candidate is used as an input to generate a MV pair with the assumption of bilateral matching. For example, one valid MV of a merge candidate is (MVa, refa) at reference list A. Then the reference picture refb of a paired bilateral MV is found in the other reference list B so that refa and refb are temporally at different sides of the current picture. When such a refb is not available in reference list B, refb is determined as a reference picture which is different from refa and has a temporal distance from the current picture equal to the minimal temporal distance in list B. After refb is determined, MVb is derived by scaling MVa based on the temporal distance between the current picture and refa, refb. Four MVs from the interpolated MV field are also added to the CU level candidate list. More specifically, the interpolated MVs at the position (0, 0), (W/2, 0), (0, H/2) and (W/2, H/2) of the current CU are added. When FRUC is applied in AMVP mode, the original AMVP candidates are also added to CU level MV candidate set. At the CU level, up to 15 MVs for AMVP CUs and up to 13 MVs for merge CUs are added to the candidate list.

A Sub-CU level MV candidate set is now discussed. The MV candidate set at sub-CU level comprises: an MV determined from a CU-level search; top, left, top-left, and top-right neighboring MVs; scaled versions of collocated MVs from reference pictures; up to 4 ATMVP candidates, and up to 4 STMVP candidates. The scaled MVs from reference pictures are derived as follows. All the reference pictures in both lists are traversed. The MVs at a collocated position of the sub-CU in a reference picture are scaled to the reference of the starting CU-level MV. ATMVP and STMVP candidates are limited to the first four candidates derived by ATMVP and STMVP. At the sub-CU level, up to 17 MVs are added to the candidate list.

Figure 27:
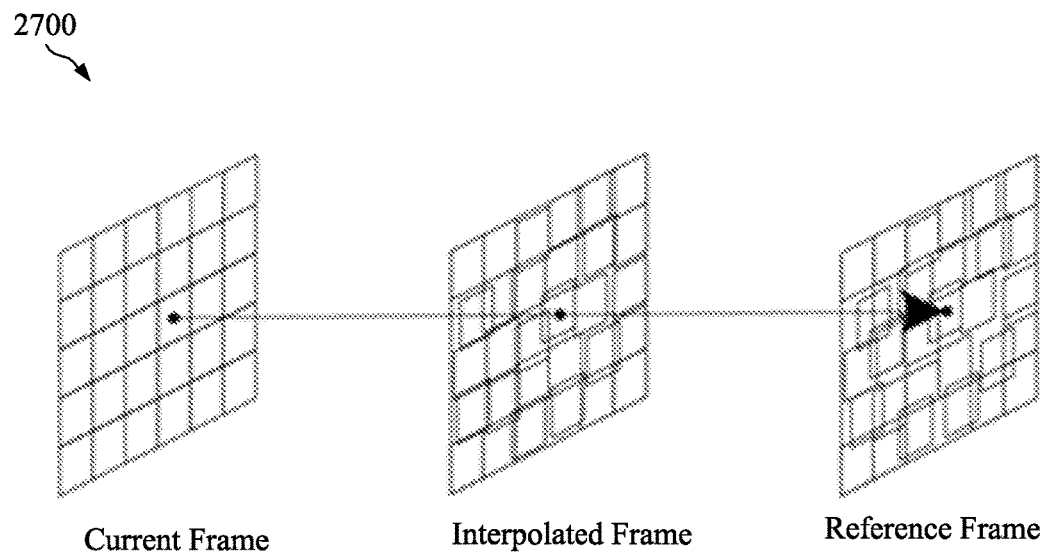
FIG. 27 is a schematic diagram illustrating an example of unilateral motion estimation in Frame-Rate Up Conversion (FRUC).

FIG. 27 is a schematic diagram 2700 illustrating an example of unilateral motion estimation (ME) in FRUC. Generation of an interpolated MV field is now discussed. Before coding a picture, an interpolated motion field is generated for the whole picture based on unilateral ME as shown in diagram 2700. Then the motion field may be used later as CU level or sub-CU level MV candidates.

The motion field of each reference picture in both reference lists is traversed at a 4×4 block level. For each 4×4 block in a reference picture, when the motion associated with the reference block passes through a 4×4 current block in the current picture (as shown in diagram 2700) and when the reference block has not been assigned any interpolated motion, the motion of the reference block is scaled to the current picture according to the temporal distance TD0 and TD1 (the same way as that of MV scaling of TMVP). The scaled motion is assigned to the current block in the current frame. If no scaled MV is assigned to a 4×4 block, the block's motion is marked as unavailable in the interpolated motion field.

Interpolation and matching cost are now discussed. Motion compensated interpolation is employed when a motion vector points to a fractional sample position. To reduce complexity, bi-linear interpolation is used instead of regular 8-tap HEVC interpolation for both bilateral matching and template matching. The calculation of matching cost is a bit different at different steps. When selecting the candidate from the candidate set at the CU level, the matching cost is the sum of absolute difference (SAD) of bilateral matching or template matching. After the starting MV is determined, the matching cost C of bilateral matching at the sub-CU level search is calculated as follows:

$$C=SAD+w\cdot(|MV_x-MV_x^s|+|MV_y-MV_y^s|) \quad (8)$$

where w is a weighting factor which is empirically set to 4, MV and $MV^s$ indicate the current MV and the starting MV, respectively. SAD is used as the matching cost of template matching at sub-CU level search. In FRUC mode, the MV is derived by using luma samples only. The derived motion is used for both luma and chroma for MC inter prediction. After the MV is decided, final motion compensation is performed using an 8-tap interpolation filter for luma and a 4-tap interpolation filter for chroma.

MV refinement is now discussed. MV refinement is a pattern based MV search with the criterion of bilateral matching cost or template matching cost. An unrestricted center-biased diamond search (UCBDS) search pattern and an adaptive cross search pattern for MV refinement at the CU level and sub-CU level are supported in the JEM. For both CU and sub-CU level MV refinement, the MV is directly searched at quarter luma sample MV accuracy. This is followed by one-eighth luma sample MV refinement. The search range of MV refinement for the CU and sub-CU step are set equal to 8 luma samples.

The selection of prediction direction in template matching FRUC merge mode is now discussed. In the bilateral matching merge mode, bi-prediction is always applied. This is because the motion information of a CU is derived based on the closest match between two blocks along the motion trajectory of the current CU in two different reference pictures. There is no such limitation for the template matching merge mode. In the template matching merge mode, the encoder can choose among unidirectional inter prediction from list0, uni directional inter prediction from list1, and bidirectional inter prediction for a CU. The selection is based on a template matching cost as follows:

If costBi<=factor*min (cost0, cost1)
  bi-prediction is used;
Otherwise, if cost0<=cost1
  uni-prediction from list0 is used;
Otherwise,
  uni-prediction from list1 is used;

where cost0 is the SAD of list0 template matching, cost1 is the SAD of list1 template matching, and costBi is the SAD of bi-prediction template matching. The value of factor is equal to 1.25, which biases the selection process is toward bi-prediction. The inter prediction direction selection is only applied to the CU-level template matching process.

Generalized Bi-prediction Improvement (GBi) is employed in VTM version three (VTM-3.0) and in benchmark set version 2.1 (BMS2.1). GBi may apply unequal weights to predictors from L0 and L1 in bi-prediction mode. In inter prediction mode, multiple weight pairs including the equal weight pair (½, ½) are evaluated based on rate-distortion optimization (RDO). The GBi index of the selected weight pair is signaled to the decoder. In merge mode, the GBi index is inherited from a neighboring CU. In BMS2.1 GBi, the predictor generation in bi-prediction mode is shown in Equation (9).

$$PGBi=(w0*PL0+w1*PL1+RoundingOffsetGBi)>> \text{shiftNum}GBi, \quad (9)$$

where PGBi is the final predictor of GBi. w0 and w1 are the selected GBi weight pair and applied to the predictors of lists L0 and L1, respectively. RoundingOffsetGBi and shiftNumGBi are used to normalize the final predictor in GBi. The supported w1 weight set is {−¼, ⅜, ½, ⅝, 5/4}, in which the five weights correspond to one equal weight pair and four unequal weight pairs. The blending gain is the sum of w1 and w0, and is fixed to 1.0. Therefore, the corresponding w0 weight set is {5/4, ⅝, ½, ⅜, −¼}. The weight pair selection is at CU-level.

For non-low delay pictures, the weight set size is reduced from five to three, where the w1 weight set is {⅜, ½, ⅝} and the w0 weight set is {⅝, ½, ⅜}. The weight set size reduction for non-low delay pictures is applied to the BMS2.1 GBi and all the GBi tests in this disclosure.

An example GBi encoder bug fix is now described. To reduce the GBi encoding time, the encoder may store unidirectional inter prediction (uni-prediction) motion vectors estimated from a GBi weight equal to ⅘. The encoder can then reuse the motion vectors for a uni-prediction search of other GBi weights. This fast encoding method can be applied to both translation motion model and affine motion model. In VTM version 2 (VTM-2.0), a 6-parameter affine model and a 4-parameter affine model are employed. A BMS2.1 encoder may not differentiate the 4-parameter affine model and the 6-parameter affine model when the encoder stores the uni-prediction affine MVs and when GBi weight is equal to ⁴/₈. Consequently, 4-parameter affine MVs may be overwritten by 6-parameter affine MVs after the encoding with GBi weight ⁴/₈. The stored 6-parameter affine MVs may be used for 4-parameter affine ME for other GBi weights, or the stored 4-parameter affine MVs may be used for 6-parameter affine ME. The GBi encoder bug fix is to separate the 4-parameter and the 6-parameter affine MVs storage. The encoder stores those affine MVs based on affine model type when GBi weight is equal to ⁴/₈. The encoder then reuses the corresponding affine MVs based on the affine model type for other GBi weights.

GBi encoder speed-up mechanisms are now described. Five example encoder speed-up methods are proposed to reduce the encoding time when GBi is enabled. A first method includes conditionally skipping affine motion estimation for some GBi weights. In BMS2.1, an affine ME including a 4-parameter and a 6-parameter affine ME is performed for all GBi weights. In an example an affine ME can be conditionally skipped for unequal GBi weights (e.g., weights unequal to ⁴/₈). For example, an affine ME can be performed for other GBi weights if and only if the affine mode is selected as the current best mode and the mode is not affine merge mode after evaluating the GBi weight of ⁴/₈. When the current picture is non-low-delay picture, the bi-prediction ME for the translation model is skipped for unequal GBi weights when affine ME is performed. When the affine mode is not selected as the current best mode or when the affine merge is selected as the current best mode, affine ME is skipped for all other GBi weights.

A second method includes reducing the number of weights for RD cost checking for low-delay pictures in the encoding for 1-pel and 4-pel MVD precision. For low-delay pictures, there are five weights for RD cost checking for all MVD precisions including ¼-pel, 1-pel and 4-pel. The encoder checks the RD cost for ¼-pel MVD precision first. A portion of GBi weights can be skipped for RD cost checking for 1-pel and 4-pel MVD precisions. Unequal weights can be ordered according to their RD cost in ¼-pel MVD precision. Only the first two weights with the smallest RD costs, together with GBi weight ⁴/₈, are evaluated during the encoding in 1-pel and 4-pel MVD precisions. Therefore, three weights at most are evaluated for 1-pel and 4-pel MVD precisions for low delay pictures.

A third method includes conditionally skipping a bi-prediction search when the L0 and L1 reference pictures are the same. For some pictures in random access (RA), the same picture may occur in both reference picture lists (L0 and L1). For example, for random access coding configuration in common test conditions (CTC), the reference picture structure for the first group of pictures (GOP) is listed as follows.

POC: 16, TL:0, [L0: 0] [L1: 0]
POC: 8, TL:1, [L0: 0 16] [L1: 16 0]
POC: 4, TL:2, [L0: 0 8] [L1: 8 16]
POC: 2, TL:3, [L0: 0 4] [L1: 4 8]
POC: 1, TL:4, [L0: 0 2] [L1: 2 4]
POC: 3, TL:4, [L0: 2 0] [L1: 4 8]
POC: 6, TL:3, [L0: 4 0] [L1: 8 16]
POC: 5, TL:4, [L0: 4 0] [L1: 6 8]
POC: 7, TL:4, [L0: 6 4] [L1: 8 16]
POC: 12, TL:2, [L0: 8 0] [L1: 16 8]
POC: 10, TL:3, [L0: 8 0] [L1: 12 16]
POC: 9, TL:4, [L0: 8 0] [L1: 10 12]
POC: 11, TL:4, [L0: 10 8] [L1: 12 16]
POC: 14, TL:3, [L0: 12 8] [L1: 12 16]
POC: 13, TL:4, [L0: 12 8] [L1: 14 16]
POC: 15, TL:4, [L0: 14 12] [L1: 16 14]

In this example, pictures 16, 8, 4, 2, 1, 12, 14, and 15 have the same reference picture(s) in both lists. For bi-prediction for these pictures, the L0 and L1 reference pictures may be the same. Accordingly, the encoder may skip bi-prediction ME for unequal GBi weights when two reference pictures in bi-prediction are the same, when the temporal layer is greater than 1, and when the MVD precision is ¼-pel. For affine bi-prediction ME, this fast skipping method is only applied to 4-parameter affine ME.

A fourth method includes skipping RD cost checking for unequal GBi weights based on temporal layer and the POC distance between the reference picture and the current picture. The RD cost evaluations for those unequal GBi weights can be skipped when the temporal layer is equal to 4 (e.g., the highest temporal layer in RA) or when the POC distance between reference picture (either L0 or L1), the current picture is equal to 1, and coding QP is greater than 32.

A fifth method includes changing the floating-point calculation to a fixed-point calculation for unequal GBi weight during ME. For a bi-prediction search, the encoder may fix the MV of one list and refine the MV in another list. The target is modified before ME to reduce the computation complexity. For example, if the MV of L1 is fixed and the encoder is to refine the MV of L0, the target for L0 MV refinement can be modified with equation 10. O is original signal and $P_1$ is the prediction signal of L1. w is GBi weight for L1.

$$T=((O<<3)-w*P_1)*(1/(8-w)) \quad (10)$$

The term (1/(8−w)) is stored in floating point precision, which increases computation complexity. The fifth method changes Equation 10 to a fixed-point value as in Equation 11.

$$T=(O*a_1-P_1*a_2+\text{round})>>N \quad (11)$$

In Equation 11, a1 and a2 are scaling factors and they are calculated as:

$$\gamma=(1<<N)/(8-w);\ a_1=\gamma<<3;\ a_2=\gamma*w;\ \text{round}=1<<(N-1)$$

CU size constraints for GBi are now discussed. In this example, GBi is disabled for small CUs. In inter prediction mode, if bi-prediction is used and the CU area is smaller than 128 luma samples, GBi is disabled without any signaling.

Figure 28:
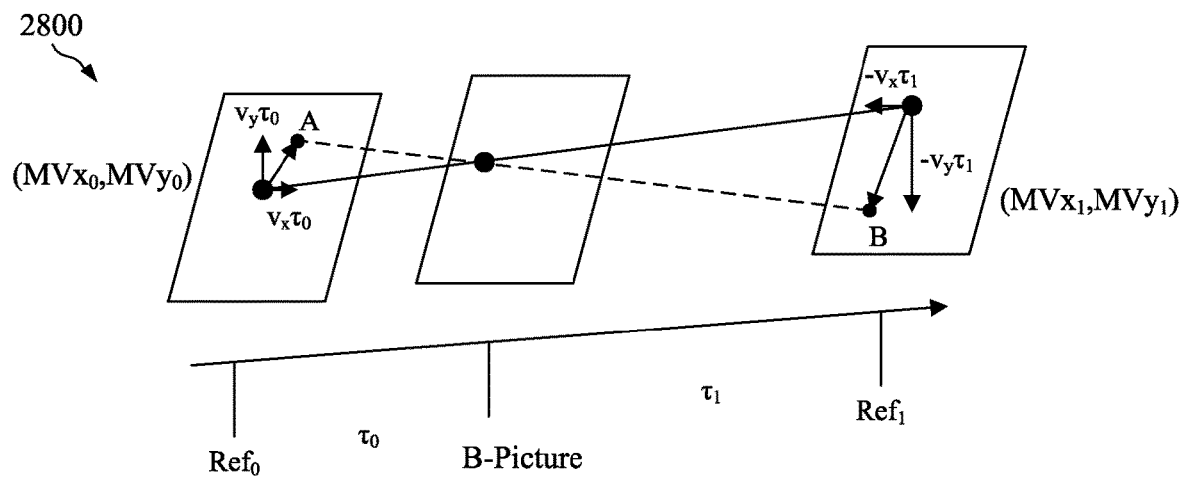
FIG. 28 is a schematic diagram illustrating an example of bidirectional optical flow trajectory.

FIG. 28 is a schematic diagram 2800 illustrating an example of bidirectional optical flow trajectory. Bi-directional optical flow (BIO) may also be referred to as BDOF. In BIO, motion compensation is first performed to generate the first predictions of the current block in each prediction direction. The first predictions are used to derive the spatial gradient, the temporal gradient, and the optical flow of each subblock/pixel within the block. These items are then used to generate the second prediction, which acts as the final prediction of the subblock/pixel. The details are described as follows. BIO is sample-wise motion refinement, which is performed in addition to block-wise motion compensation for bidirectional inter prediction (bi-prediction). The sample-level motion refinement may not use signaling.

$I^{(k)}$ may be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by $$\partial I^{(k)}/\partial t + v_x \partial I^{(k)}/\partial x + v_y \partial I^{(k)}/\partial y = 0. \quad (12)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = \tfrac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (13)$$

Here, $\tau_0$ and $\tau_1$ denote the distances to the reference frames as shown in diagram 2800. Distances $\tau_0$ and $\tau_1$ are calculated based on the POC for Ref0 and Ref1: τ0=POC(current)−POC(Ref0), τ1=POC(Ref1)−POC(current). When both predictions come from the same time direction (either both from previous pictures or both from subsequent pictures) then the signs are different ($\tau_0 \cdot \tau_1 < 0$). In this case, BIO is applied only when the prediction is not from the same time moment (e.g., $\tau_0 \neq \tau_1$), when both referenced regions have non-zero motion ($MVx_0, MVy_0, MVx_1, MVy_1 \neq 0$), and when the block motion vectors are proportional to the time distance ($MVx_0/MVx_1 = MVy_0/MVy_1 = -\tau_0/\tau_1$).

The motion vector field $(v_x, v_y)$ is determined by minimizing the difference $\Delta$ between values in points A and B (intersection of motion trajectory and reference frame planes on diagram 2800). The model uses only the first linear term of a local Taylor expansion for $\Delta$:

$$\Delta = (I^{(0)} - I^{(1)} + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad (14)$$

All values in Equation (14) depend on the sample location (i', j'), which was omitted from the notation so far. Assuming the motion is consistent in the local surrounding area, $\Delta$ is minimized inside the (2M+1)×(2M+1) square window $\Omega$ centered on the currently predicted point (i, j), where M is equal to 2:

$$(v_x, v_y) = \underset{v_x, v_y}{\text{argmin}} \sum_{[i',j'] \in \Omega} \Delta^2[i', j'] \quad (15)$$

For this optimization problem, the JEM may use a simplified approach making first a minimization in the vertical direction and then in the horizontal direction. This results in $$v_x = (s_1 + r) > m ? \text{clip3}\left(-thBIO, thBIO, -\frac{s_3}{(s_1 + r)}\right) : 0 \quad (16)$$

$$v_y = (s_5 + r) > m ? \text{clip3}\left(-thBIO, thBIO, -\frac{s_6 - v_x s_2/2}{(s_5 + r)}\right) : 0 \quad (17)$$

where, $$s_1 = \Sigma_{[i',j'] \in \Omega}(\tau_1 \partial I^{(1)}/\partial x + \tau_0 \partial I^{(0)}/\partial x)^2;\ s_3 = \Sigma_{[i',j'] \in \Omega}(I^{(1)} - I^{(0)})(\tau_1 \partial I^{(1)}/\partial x + \tau_0 \partial I^{(0)}/\partial x);\ s_2 = \Sigma_{[i',j'] \in \Omega}(\tau_1 \partial I^{(1)}/\partial x + \tau_0 \partial I^{(0)}/\partial x)(\tau_1 \partial I^{(1)}/\partial y + \tau_0 \partial I^{(0)}/\partial y);\ s_5 = \Sigma_{[i',j'] \in \Omega}(\tau_1 \partial I^{(1)}/\partial y + \tau_0 \partial I^{(0)}/\partial y)^2;\ s_6 = \Sigma_{[i',j'] \in \Omega}(I^{(1)} - I^{(0)})(\tau_1 \partial I^{(1)}/\partial y + \tau_0 \partial I^{(0)}/\partial y) \quad (18)$$

$$s_5 = \Sigma_{[i',j'] \in \Omega}(\tau_1 \partial I^{(1)}/\partial y + \tau_0 \partial I^{(0)}/\partial y)^2;\ s_6 = \Sigma_{[i',j'] \in \Omega}(I^{(1)} - I^{(0)})(\tau_1 \partial I^{(1)}/\partial y + \tau_0 \partial I^{(0)}/\partial y)$$

$$s_5 = \Sigma_{[i',j'] \in \Omega}(\tau_1 \partial I^{(1)}/\partial y + \tau_0 \partial I^{(0)}/\partial y)^2;\ s_6 = \Sigma_{[i',j'] \in \Omega}(I^{(1)} - I^{(0)})(\tau_1 \partial I^{(1)}/\partial y + \tau_0 \partial I^{(0)}/\partial y)$$

In order to avoid division by zero or a very small value, regularization parameters r and m are introduced in Equations (19) and (20).

$$r = 500 \cdot 4^{d-8} \quad (19)$$

$$m = 700 \cdot 4^{d-8} \quad (20)$$

Here d is bit depth of the video samples.

Figure 29:
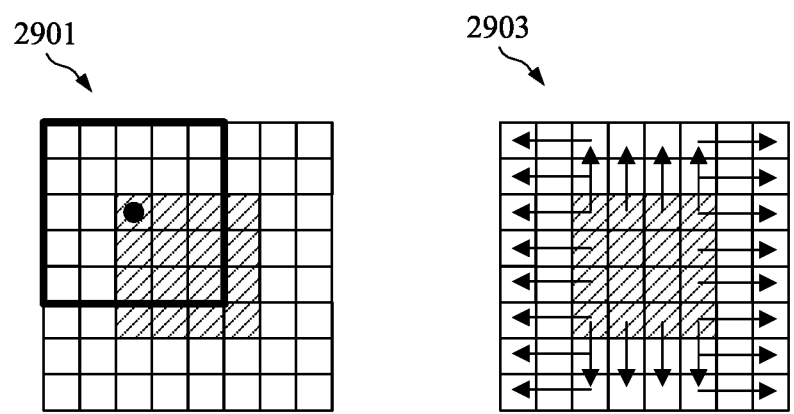
FIG. 29 is a schematic diagram illustrating an example of Bi-directional optical flow (BIO) without a block extension.

FIG. 29 is a schematic diagram illustrating an example of BIO without a block extension. In order to keep the memory access for BIO similar to bi-predictive motion compensation, all prediction and gradients values, $I^{(k)}$, $\partial I^{(k)}/\partial x$, $\partial I^{(k)}/\partial y$, are calculated only for positions inside the current block. In Equation (18), a (2M+1)×(2M+1) square window $\Omega$ centered in a currently predicted point on a boundary of a predicted block should access positions outside of the block as shown in block 2901. In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in block 2903. In block 2903, padding is used in order to avoid extra memory access and calculation.

With BIO, a motion field can be refined for each sample. To reduce the computational complexity, a block-based design of BIO is used in the JEM. The motion refinement is calculated based on 4×4 block. In the block-based BIO, the values of $s_n$ in Equation (18) of all samples in a 4×4 block are aggregated. Then the aggregated values of $s_n$ are used to derived BIO motion vectors offset for the 4×4 block. More specifically, the following formula is used for block-based BIO derivation:

$$s_{1,b_k} = \Sigma_{(x,y) \in b_k} \Sigma_{[i',j'] \in \Omega(x,y)}(\tau_1 \partial I^{(1)}/\partial x + \tau_0 \partial I^{(0)}/\partial x)^2;\ s_{3,b_k} = \Sigma_{(x,y) \in b_k} \Sigma_{[i',j'] \in \Omega}(I^{(1)} - I^{(0)})(\tau_1 \partial I^{(1)}/\partial x + \tau_0 \partial I^{(0)}/\partial x);\ s_{2,b_k} = \Sigma_{(x,y) \in b_k} \Sigma_{[i',j'] \in \Omega}(\tau_1 \partial I^{(1)}/\partial x + \tau_0 \partial I^{(0)}/\partial x)(\tau_1 \partial I^{(1)}/\partial y + \tau_0 \partial I^{(0)}/\partial y);\ s_{5,b_k} = \Sigma_{(x,y) \in b_k} \Sigma_{[i',j'] \in \Omega}(\tau_1 \partial I^{(1)}/\partial y + \tau_0 \partial I^{(0)}/\partial y)^2;\ s_{6,b_k} = \Sigma_{(x,y) \in b_k} \Sigma_{[i',j'] \in \Omega}(I^{(1)} - I^{(0)})(\tau_1 \partial I^{(1)}/\partial y + \tau_0 \partial I^{(0)}/\partial y) \quad (21)$$

$$s_{5,b_k} = \Sigma_{(x,y) \in b_k} \Sigma_{[i',j'] \in \Omega}(\tau_1 \partial I^{(1)}/\partial y + \tau_0 \partial I^{(0)}/\partial y)^2;\ s_{6,b_k} = \Sigma_{(x,y) \in b_k} \Sigma_{[i',j'] \in \Omega}(I^{(1)} - I^{(0)})(\tau_1 \partial I^{(1)}/\partial y + \tau_0 \partial I^{(0)}/\partial y)$$

$$s_{5,b_k} = \Sigma_{(x,y) \in b_k} \Sigma_{[i',j'] \in \Omega}(\tau_1 \partial I^{(1)}/\partial y + \tau_0 \partial I^{(0)}/\partial y)^2;\ s_{6,b_k} = \Sigma_{(x,y) \in b_k} \Sigma_{[i',j'] \in \Omega}(I^{(1)} - I^{(0)})(\tau_1 \partial I^{(1)}/\partial y + \tau_0 \partial I^{(0)}/\partial y)$$

where $b_k$ denotes the set of samples in the k-th 4×4 block of the predicted block. $s_n$ in Equations (16) and (17) are replaced by ((sn,bk)>>4) to derive the associated motion vector offsets.

In some examples, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12 \times 2^{14-d}$; otherwise, the value of the threshold is set to $12 \times 2^{13-d}$.

Gradients for BIO may be calculated at the same time as motion compensation interpolation using operations consistent with HEVC motion compensation process. This may include usage of a two-dimensional (2D) separable finite impulse response (FIR) filter. The input for this 2D separable FIR is the same reference frame sample as for motion compensation process with a fractional position (fracX, fracY) according to the fractional part of the block motion vector. In the case of a horizontal gradient $\partial I/\partial x$, an interpolation BIO filter for predictio signal (BIOfilterS) is applied in a vertical direction corresponding to the fractional position fracY with a de-scaling shift d−8. Then a gradient BIO filter (BIOfilterG) is applied in a horizontal direction corresponding to the fractional position fracX with a de-scaling shift by 18-d. In case of vertical gradient ∂I/∂y a first gradient filter is applied vertically using BIOfilterG corresponding to the fractional position fracY with de-scaling shift d-8. Then a signal displacement is performed using BIOfilterS in a horizontal direction corresponding to the fractional position fracX with de-scaling shift by 18-d. The length of the interpolation filter for gradient calculation BIOfilterG and BIO signal displacement (BIOfilterF) is shorter (6-tap) in order to maintain reasonable complexity. Table 1 shows the filters used for a gradient calculation for different fractional positions of motion vectors for a block in BIO.

TABLE 1

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {1, 4, −57, 57, −4, 1} |

Table 2 shows the interpolation filters used for prediction signal generation in BIG.

TABLE 2

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIG is applied to all bi-predicted blocks when the two predictions are from different reference pictures. BIG is disabled when LIC is enabled for a CU. In the JEM, GBMC is applied for a block after the MC process. To reduce the computational complexity, BIG is not applied during the GBMC process. This means that BIG is only applied in the MC process for a block when using the blocks own MV and is not applied in the MC process when the MV of a neighboring block is used during the GBMC process.

Figure 30:
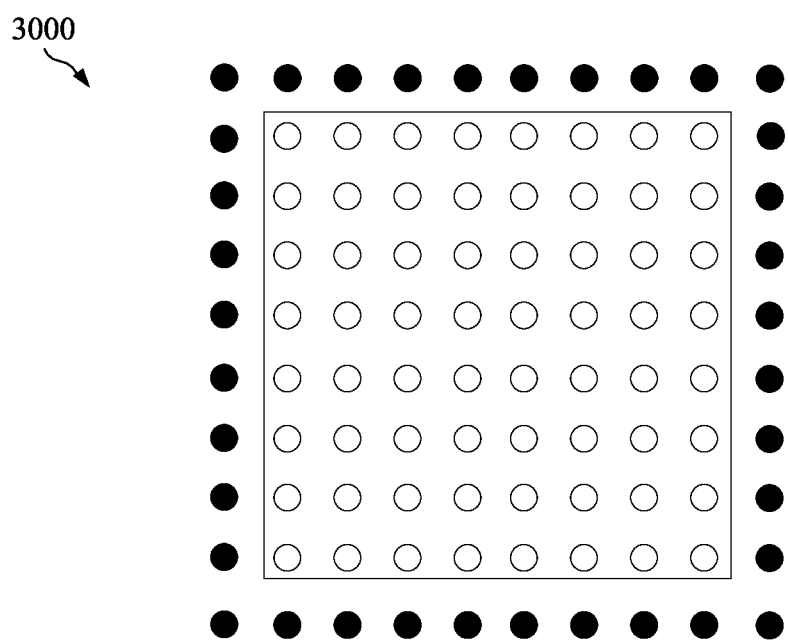
FIG. 30 is a schematic diagram illustrating an example of interpolated samples used in BIO.

FIG. 30 is a schematic diagram 3000 illustrating an example of interpolated samples used in BIG, for example as used in VTM-3.0. In an example, BIG employs a first step to judge whether BIG is applicable. W and H are a width and a height, respectively, of a current block. BIG is not applicable when the current block is affine coded, when the current block is ATMVP coded, when (iPOC−iPOC0)*(iPOC−iPOC1)>=0, when H==4 or (W==4 and H==8), when the current block uses weighted prediction, and when GBi weights are not (1,1). BIO is also not used when total SAD between the two reference blocks (denoted as R0 and R1) is smaller than a threshold.

$$SAD = \Sigma_{(x,y)} |R0(x,y) - R1(x,y)|$$

In an example, BIO employs a second step that includes data preparation. For a W×H block, (W+2)×(H+2) samples are interpolated. The inner W×H samples are interpolated with the 8-tap interpolation filter as in motion compensation. The four side outer lines of samples, illustrated as black circles in diagram 3000, are interpolated with the bi-linear filter. For each position, gradients are calculated on the two reference blocks (denoted as R0 and R1).

$$Gx0(x,y) = (R0(x+1,y) - R0(x-1,y)) >> 4$$

$$Gy0(x,y) = (R0(x, y+1) - R0(x, y-1)) >> 4$$

$$Gx1(x,y) = (R1(x+1,y) - R1(x-1,y)) >> 4$$

$$Gy1(x,y) = (R1(x, y+1) - R1(x, y-1)) >> 4$$

For each position, internal values are calculated as:

$$T1 = (R0(x,y) >> 6) - (R1(x,y) >> 6), T2 = (Gx0(x,y) + Gx1(x, y)) >> 3, T3 = (Gy0(x,y) + Gy1(x,y)) >> 3$$

$$B1(x,y) = T2*T2, B2(x,y) = T2*T3, B3(x,y) = -T1*T2, B5(x,y) = T3*T3, B6(x,y) = -T1*T3$$

In an example, BIO employs a second step that includes calculating a prediction for each block. BIO is skipped for a 4×4 block if SAD between the two 4×4 reference blocks is smaller than a threshold. Vx and Vy are calculated. The final prediction for each position in the 4×4 block is also calculated.

$$b(x,y) = (Vx(Gx0(x,y) - Gx1(x,y)) + Vy(Gy0(x,y) - Gy1(x, y))+1) >> 1$$

$$P(x,y) = (R0(x,y) + R1(x,y) + b(x,y) + \text{offset}) >> \text{shift}$$

b(x,y) is known as a correction item.

BIO in VTM version four (VTM-4.0), rounds the results of calculation in BDOF depending on bit-depth. VTM-4.0 also removed the bi-linear filtering and fetches the nearest integer pixel of the reference block to pad the four side outer lines of samples (black circles in diagram 3000).

Figure 31:
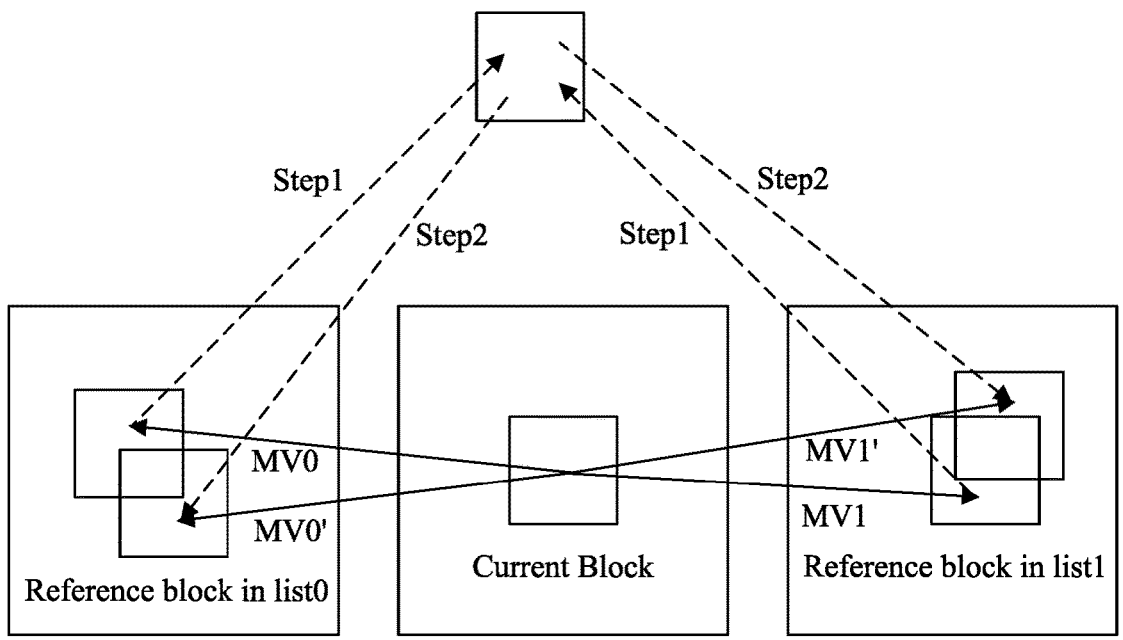
FIG. 31 is a schematic diagram illustrating an example of decoder-side motion vector refinement (DMVR) based on bilateral template matching.

FIG. 31 is a schematic diagram 3100 illustrating an example of decoder-side motion vector refinement (DMVR) based on bilateral template matching. DMVR is a type of Decoder-side Motion Vector Derivation (DMVD). In a bi-prediction operation for the prediction of one block region, two prediction blocks, formed using a MV of list0 and a MV of list1, respectively, are combined to form a single prediction signal. In DMVR, the two motion vectors of the bi-prediction are further refined by a bilateral template matching process. The bilateral template matching is applied in the decoder to perform a distortion-based search between a bilateral template and the reconstruction samples in the reference pictures in order to obtain a refined MV without transmission of additional motion information.

In DMVR, a bilateral template is generated as the weighted combination (e.g., average) of the two prediction blocks, from the initial MV0 of list0 and MV1 of list1, respectively, as shown in diagram 3100. The template matching operation includes calculating cost measures between the generated template and the sample region around the initial prediction block in the reference picture. For each of the two reference pictures, the MV that yields the minimum template cost is considered as the updated MV of that list to replace the original MV. In the JEM, nine MV candidates are searched for each list. The nine MV candidates include the original MV and eight MVs with one luma sample offset from the original MV in the horizontal direction, the vertical direction, or both. The two new MVs, denoted as MV0' and MV1' as shown in diagram 3100, are used for generating the final bi-prediction results. A SAD is used as a cost measure. When calculating the cost of a prediction block generated by one surrounding MV, the rounded MV (to integer pel) is actually used to obtain the prediction block instead of the real MV.

DMVR is applied for the merge mode of bi-prediction with one MV from a preceding reference picture and another from a subsequent reference picture without the transmission of additional syntax elements. In the JEM, DMVR is not applied when a LIC candidate, an affine motion candidate, a FRUC candidate, and/or a sub-CU merge candidate is enabled for a CU.

Template matching based adaptive merge candidate reorder is now discussed. To improve coding efficiency, the order of each merge candidate is adjusted according to the template matching cost after the merge candidate list is constructed. The merge candidates are arranged in the list in accordance with the template matching cost of ascending order. Related operations are performed in the form of a sub-group.

Figure 32:
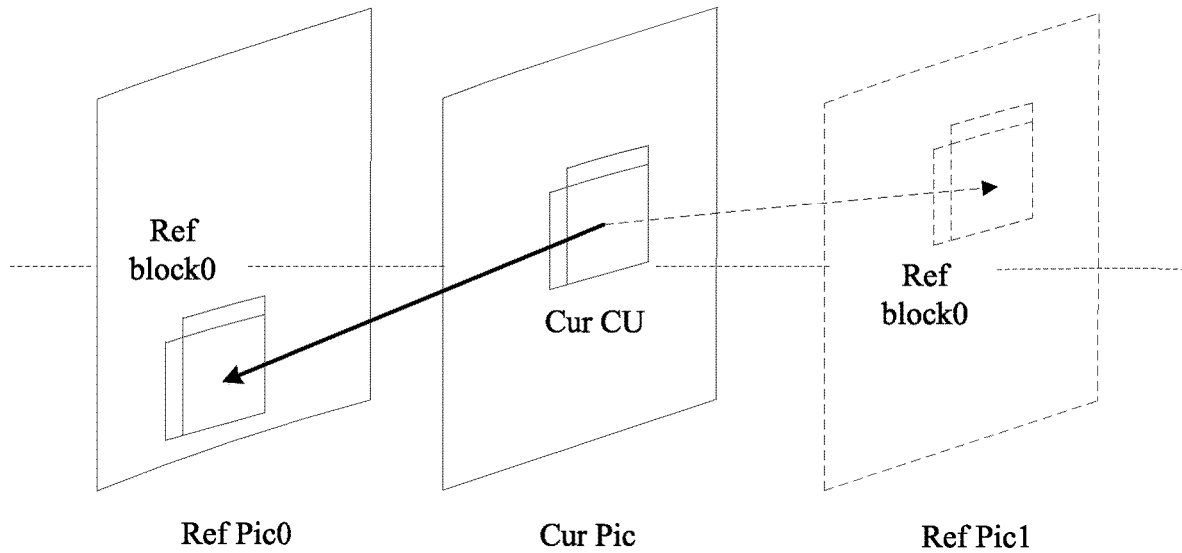
FIG. 32 is a schematic diagram illustrating an example of neighboring samples used for calculating sum of absolute difference (SAD) in template matching.

FIG. 32 is a schematic diagram 3200 illustrating an example of neighboring samples used for calculating SAD in template matching. The template matching cost is measured by the SAD between the neighboring samples of the current CU and their corresponding reference samples. When a merge candidate includes bi-predictive motion information, the corresponding reference samples are the average of the corresponding reference samples in reference list0 and the corresponding reference samples in reference list1, as illustrated in diagram 3200.

Figure 33:
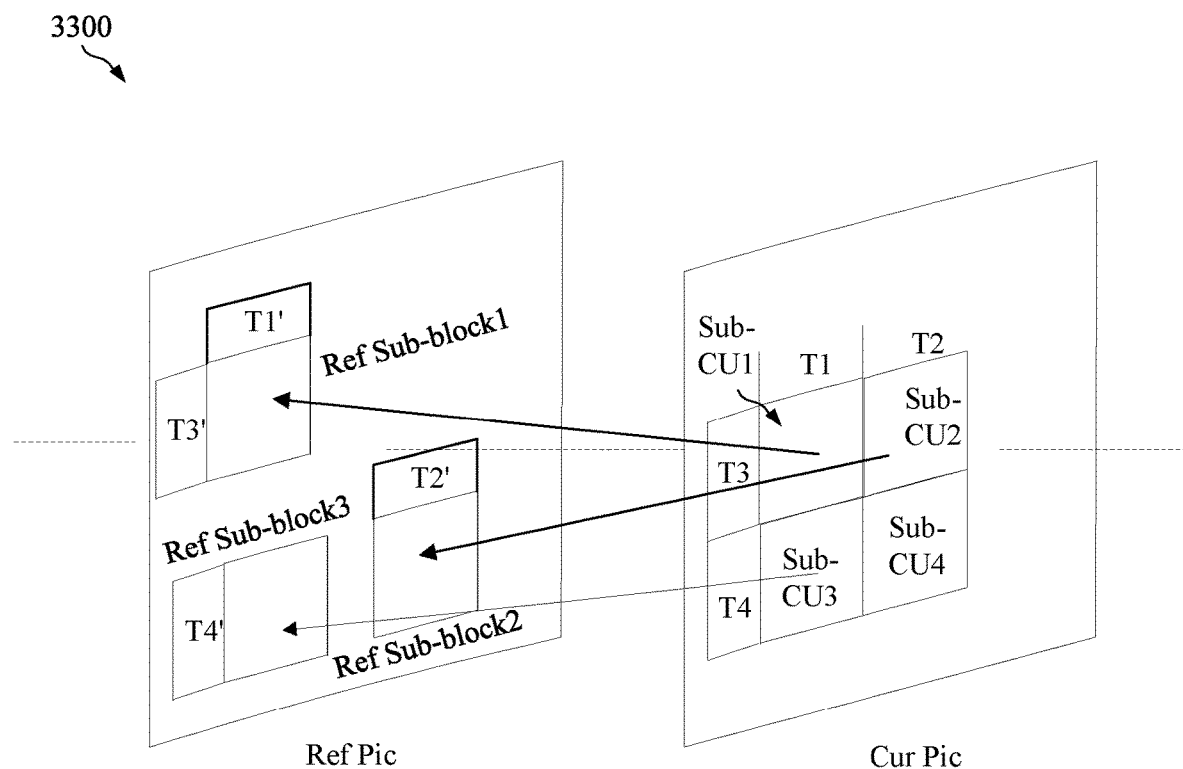
FIG. 33 is a schematic diagram illustrating an example of neighboring samples used for calculating SAD for sub-coding unit (CU) level motion information in template matching.

FIG. 33 is a schematic diagram 3300 illustrating an example of neighboring samples used for calculating SAD for sub-CU level motion information in template matching. If a merge candidate includes sub-CU level motion information, the corresponding reference samples include the neighboring samples of the corresponding reference sub-blocks, as illustrated in diagram 3300.

Figure 34:
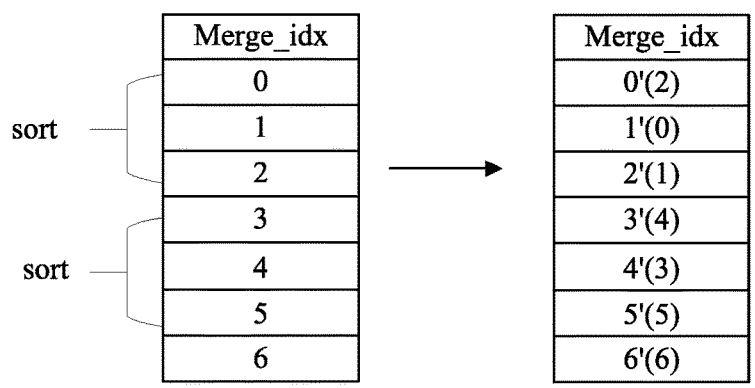
FIG. 34 is a schematic diagram illustrating an example of a sorting process used in updating a merge candidate list.

FIG. 34 is a schematic diagram 3400 illustrating an example of a sorting process used in updating a merge candidate list. The sorting process is operated in the form of sub-group, as illustrated in diagram 3400. The first three merge candidates are sorted together. The following three merge candidates are sorted together. The template size (width of the left template or height of the above template) is 1. The sub-group size is 3.

The following are example technical problems solved by disclosed technical solutions. Dyadic dimensions describe a case where the width and height of a block must be in a form a 2N, wherein N is a positive integer. Inter prediction should be modified to adapt to blocks with non-dyadic dimensions.

Disclosed herein are mechanisms to address one or more of the problems listed above. For example, inter prediction related mechanisms can be applied differently depending on whether a block is dyadic or non-dyadic. For example, various coding tools employed in inter prediction can be disabled for non-dyadic blocks to account for different mathematical relationships related to non-dyadic blocks. When used, such coding tools may also be applied differently based on whether the block is dyadic or non-dyadic. In addition, a block may be divided into sub-blocks to support sub-block based inter prediction. In an example, the sub-block splits can be selected based on whether the block is dyadic or non-dyadic and/or based on the color format associated with the block. In an example, motion refinement may be performed at a decoder based on whether the block is dyadic or non-dyadic. In an example, local illumination compensation (LIC) may be performed on the block based on whether the block is dyadic or non-dyadic. In an example, sub-block transforms are applied to the block, and the sub-block transforms are sized based on whether the block is dyadic or non-dyadic. In an example, affine inter prediction is applied to the block, and the affine model used during affine inter prediction is selected based on which dimension of the block is non-dyadic. In an example, the block employs control point motion vectors (CPMVs) and positions of the CPMVs are selected based on which dimension of the block is non-dyadic.

Figure 35A:
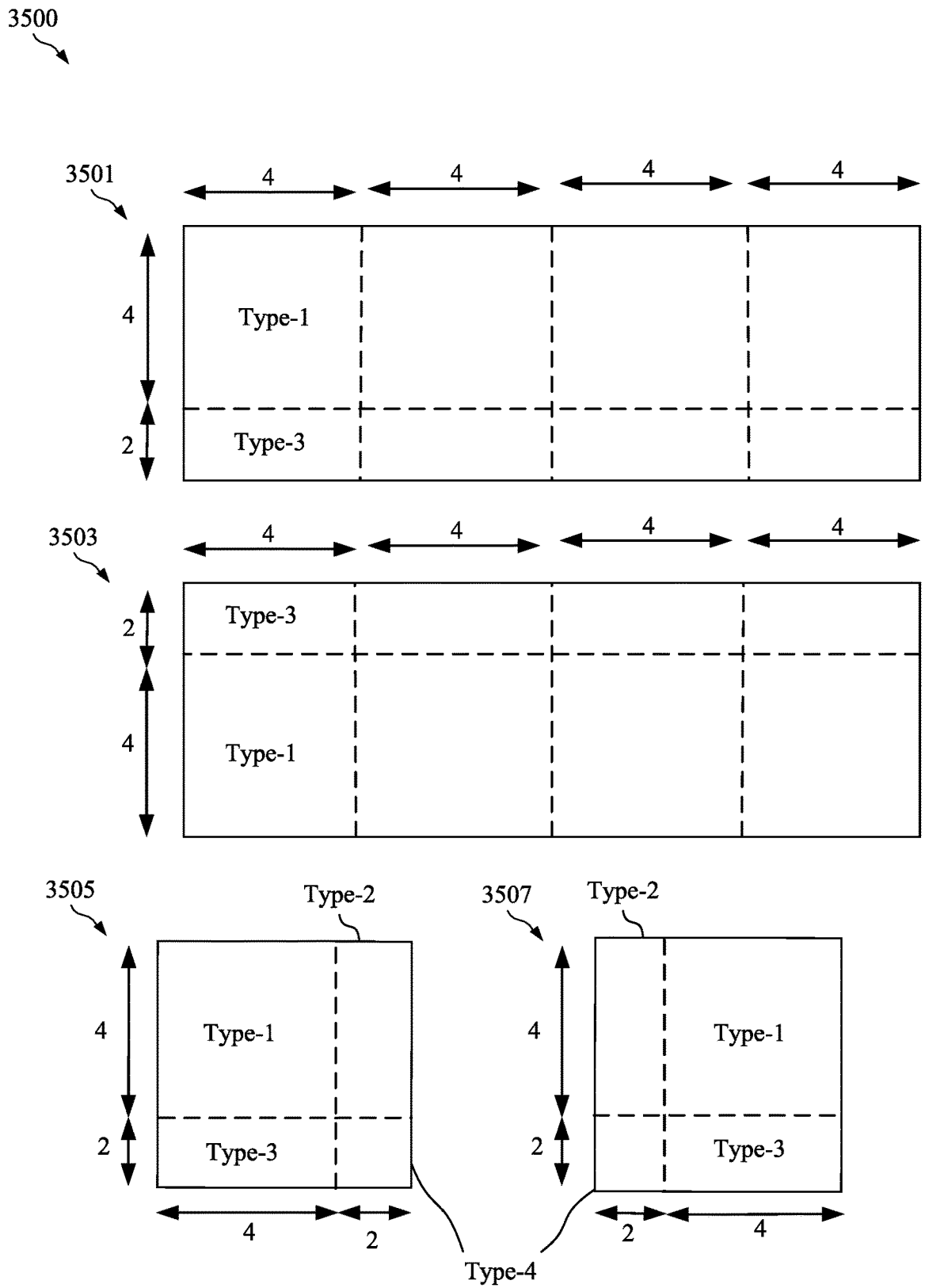
FIGS. 35A-35B are a schematic diagram illustrating example partitions for splitting a non-dyadic block into sub-blocks when performing sub-block based inter prediction.
Figure 35B:
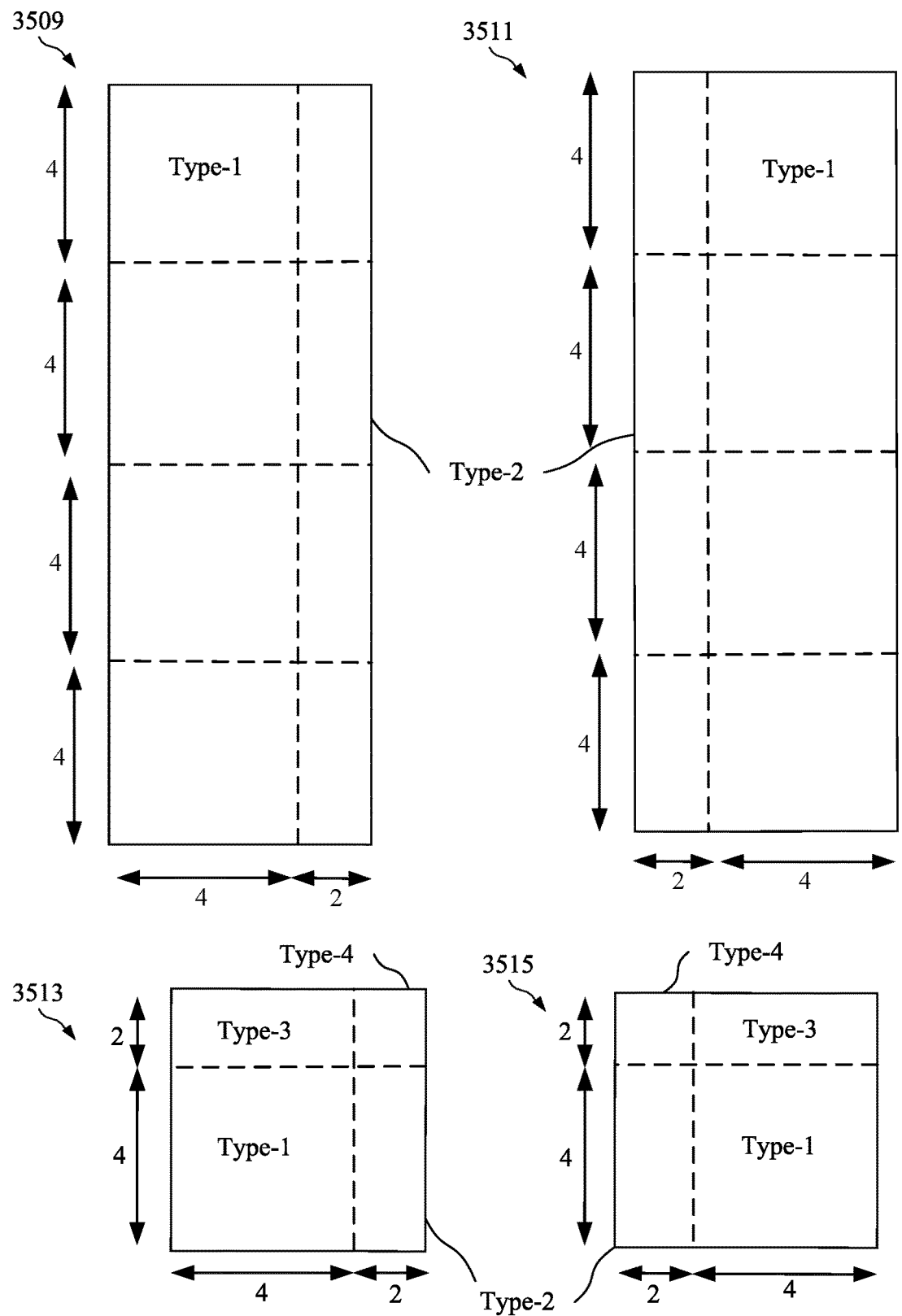

FIGS. 35A-35B are a schematic diagram 3500 illustrating example partitions for splitting a non-dyadic block into sub-blocks when performing sub-block based inter prediction. Sub-block based inter prediction is a mechanism for splitting a block into sub-blocks. Motion vectors can then be determined for the sub-blocks, and inter prediction can be performed at the sub-block level instead of at the block level. Sub-block based inter prediction may include affine prediction, subblock-based temporal motion vector prediction (TMVP), decoder-side motion vector refinement (DMVR), bi-directional optical flow (BDOF), frame-rate up conversion (FRUC), overlapped block motion compensation (OBMC), or combinations thereof. In some systems, all blocks and all sub-blocks are dyadic, and hence such dyadic blocks can be partitioned into dyadic sub-blocks. The present disclosure provides mechanisms to address partitioning when the block is non-dyadic. This occurs when at least one side of the block has a dimension that is not expressible as a power of two. Accordingly, when employing a non-dyadic block, the sub-block partitions used in other systems may not correctly partition the block. The partitions in schematic diagram 3500 are selected to address this deficiency.

All of the block is schematic diagram 3500 are non-dyadic. The blocks are illustrated in solid lines and the sub-blocks are illustrated in dashed lines. The sub-blocks are denoted as type-1, type-2, type-3, and type-4 for clarity of discussion. Specifically, a block has a width (W) and a height (H). The block can be split into blocks with widths of M1 and/or M2 and heights N1 and/or N2. In the examples shown, M1 and N1 are set to four and M2 and N2 are set to two for clarity of discussion, but could be set to other values. A type-1 sub-block has dimensions of M1×N1 (e.g., 4×4). A type-2 sub-block has dimensions of M2×N1 (e.g., 2×4). A type-3 sub-block has dimensions of M1×N2 (e.g., 4×2). A type-4 sub-block has dimensions of M2×N2 (e.g., 2×2).

The partitions of schematic diagram 3500 can be achieved according to the following algorithm. When W is divisible by M1 according to a floor function (e.g., W is divisible by M1 with a remainder) and H is divisible by N1 according to a floor function (e.g., H is divisible by N1 with a remainder), denoted as $$\left\lfloor \frac{W}{M1} \right\rfloor \times \left\lfloor \frac{H}{N1} \right\rfloor,$$

split the block into a type-1 sub-block of dimensions M1×N1. When W modulo M1 does not equal zero (e.g., W is not divisible by M1 with a remainder) and H is divisible by N1 according to a floor function (e.g., H is divisible by N1 with a remainder), denoted as $$W\%M1 \mathrel{!}= 0, \left\lfloor \frac{H}{N1} \right\rfloor,$$

split into a type-2 sub-block of dimensions M2×N1. When W is divisible by M1 according to a floor function (e.g., W is divisible by M1 with a remainder) and H modulo N1 does not equal zero (e.g., H is not divisible by N1 with a remainder), denoted as $$H\%N1 \mathrel{!}= 0, \left\lfloor \frac{W}{M1} \right\rfloor,$$

split into a type-3 sub-block of dimensions M1×N2. When W modulo M1 does not equal zero (e.g., W is not divisible by M1 with a remainder) and H modulo N1 does not equal zero (e.g., H is not divisible by N1 with a remainder), denoted as W%M1 !=0, H%N1 !=0, split into a type-4 sub-block of dimensions M2×N2.

The preceding algorithm results in the partitions of schematic diagram 3500. Specific reference is made to FIG. 35A. In partition 3501, the block has a height and width that are both divisible by N1 and M1, respectively. Hence, the block is split into type-1 sub-blocks. The reminder of the block has a height that is not divisible by N1 and a width that is divisible by M1. Accordingly, the reminder of the block is split into type-3 sub-blocks. In partition 3501, the type-1 sub-blocks are positioned above the type-3 sub-blocks. Partition 3503 is substantially similar to partition 3501, but the type-1 sub-blocks are positioned below the type-3 sub-blocks.

Reference is made to FIG. 35B. In partition 3509, the block has a height and width that are both divisible by N1 and M1, respectively. Hence, the block is split into type-1 sub-blocks. The reminder of the block has a width that is not divisible by M1 and a height that is divisible by N1. Accordingly, the reminder of the block is split into type-2 sub-blocks. In partition 3509, the type-1 sub-blocks are positioned to the left of the type-2 sub-blocks. Partition 3511 is substantially similar to partition 3509, but the type-1 sub-blocks are positioned to the right of the type-2 sub-blocks.

Returning to FIG. 35A, partition 3505 is now discussed. In partition 3505, the block has a height and width that are both divisible by N1 and M1, respectively. Hence, the block is split into a type-1 sub-block, leaving a non-rectangular (e.g., L shaped) remainder. A portion of the reminder of the block has a width that is not divisible by M1 and a height that is divisible by N1 (the upper part of the L shape). Accordingly, the upper portion of the reminder of the block is split into a type-2 sub-block. Another portion of the remainder has a height that is not divisible by N1 and a width that is divisible by M1 (the lower part of the L shape). Accordingly, the lower portion of the reminder of the block is split into a type-3 sub-block. This leaves a remainder in the bottom right corner that has a height that is not divisible by N1 and a width that is not divisible by M1. Accordingly, this portion of the remainder is partitioned into a type-4 sub-block. In partition 3505, the type-1 partition is positioned above the type-3 partition and to the left of the type-2 partition. The type-4 partition is positioned below the type-2 partition and to the right of the type-3 partition. Partition 3507 is substantially similar to partition 3505. However, the type-1 partition is positioned above the type-3 partition and to the right of the type-2 partition. The type-4 partition is positioned below the type-2 partition and to the left of the type-3 partition.

Returning to FIG. 35B, partition 3513 and partition 3515 are now discussed. Partition 3513 is substantially similar to partition 3505. However, the type-1 partition is positioned below the type-3 partition and to the right of the type-2 partition. The type-4 partition is positioned above the type-2 partition and to the right of the type-3 partition. Partition 3515 is substantially similar to partition 3505. However, the type-1 partition is positioned below the type-3 partition and to the right of the type-2 partition. The type-4 partition is positioned above the type-2 partition and to the left of the type-3 partition.

Figure 36:
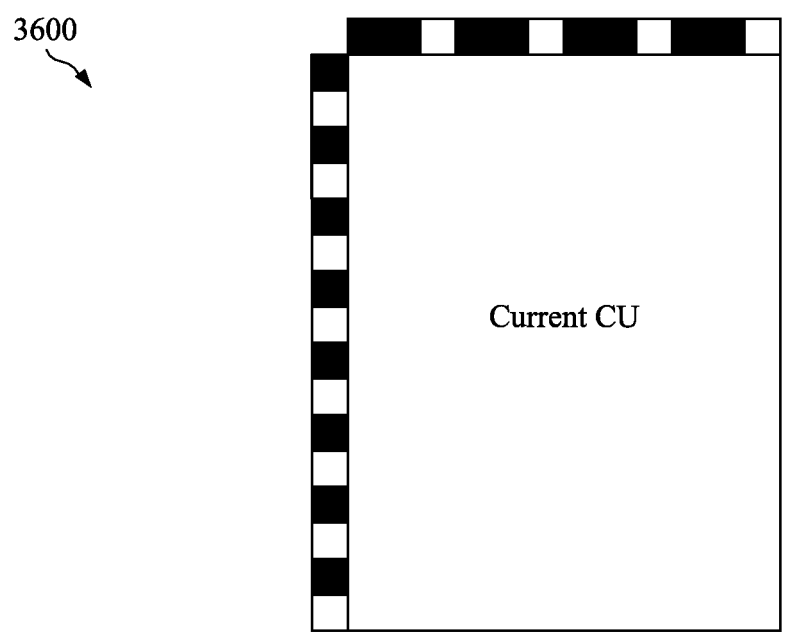
FIG. 36 is a schematic diagram illustrating an example of local illumination compensation (LIC) applied to a non-dyadic block.

FIG. 36 is a schematic diagram 3600 illustrating an example of LIC applied to a non-dyadic block. As noted described above, LIC employs samples outside of a block, or a CU thereof, to derive illumination compensation parameters for use in a linear model that determines illumination changes in the block and/or CU. LIC is discussed in greater detail with respect to FIG. 21. LIC is designed to employ neighboring samples in template positions that are selected for a dyadic block. Accordingly, LIC as used in some systems may not select the proper samples for a non-dyadic block. The present disclosure describes sample positions that allow LIC to function correctly for a non-dyadic block. The current CU in schematic diagram 3600 is non-dyadic (e.g., the width is twelve samples, which is not a power of two). The CU is positioned adjacent to a neighboring row and a neighboring column. In an example, samples to be used for LIC are shown in black squares and samples that are not used for LIC are shown in white squares with a solid border. In the example shown, the selected samples are located at (x−1, y+f2(0)), (x−1, y+f2(1)), . . . , (x−1, y+f2(N−1)) in the left neighboring column and at (x+f1(0), y−1), (x+f1(1), y−1), . . . , (x+f1(N−1), y−1) in the above neighboring row, where x and y are coordinates, f1(K)= ((K*W)>>dimShift), f2(K)=((K*H)>>dimShift), K is an integer value, W is a width of the CU, H is a height of the CU, >> indicates a right bitshift, and dimShift is an integer variable used in the LIC parameter derivation process.

In other examples, the selected samples may be located at other positions. For example, N samples may be selected from the left neighboring column and/or the above neighboring row, where N is an integer such as a numSteps variable used in the LIC parameter derivation process. The selected samples may be the top N samples, the middle N samples, or the bottom N samples from the left neighboring column. The selected samples may be the left N samples, the middle N samples, or the right N samples from the above neighboring row.

Figure 37A:
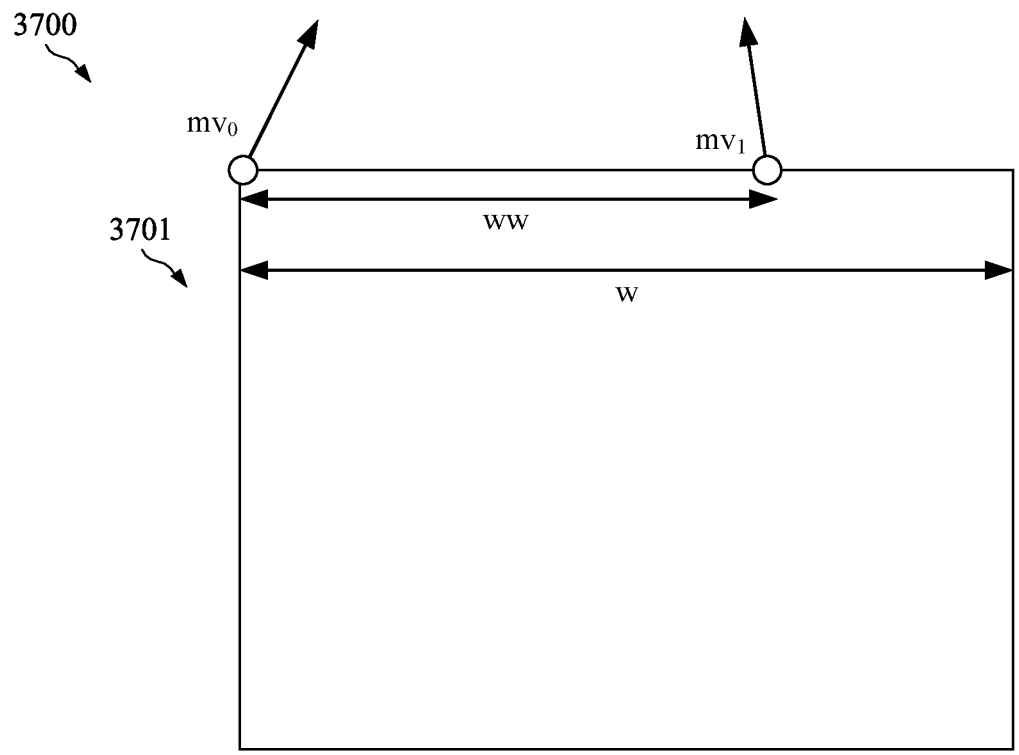
FIGS. 37A-37B are a schematic diagram illustrating an example of determining positions of control point motion vectors (CPMVs) for a non-dyadic block.
Figure 37A:
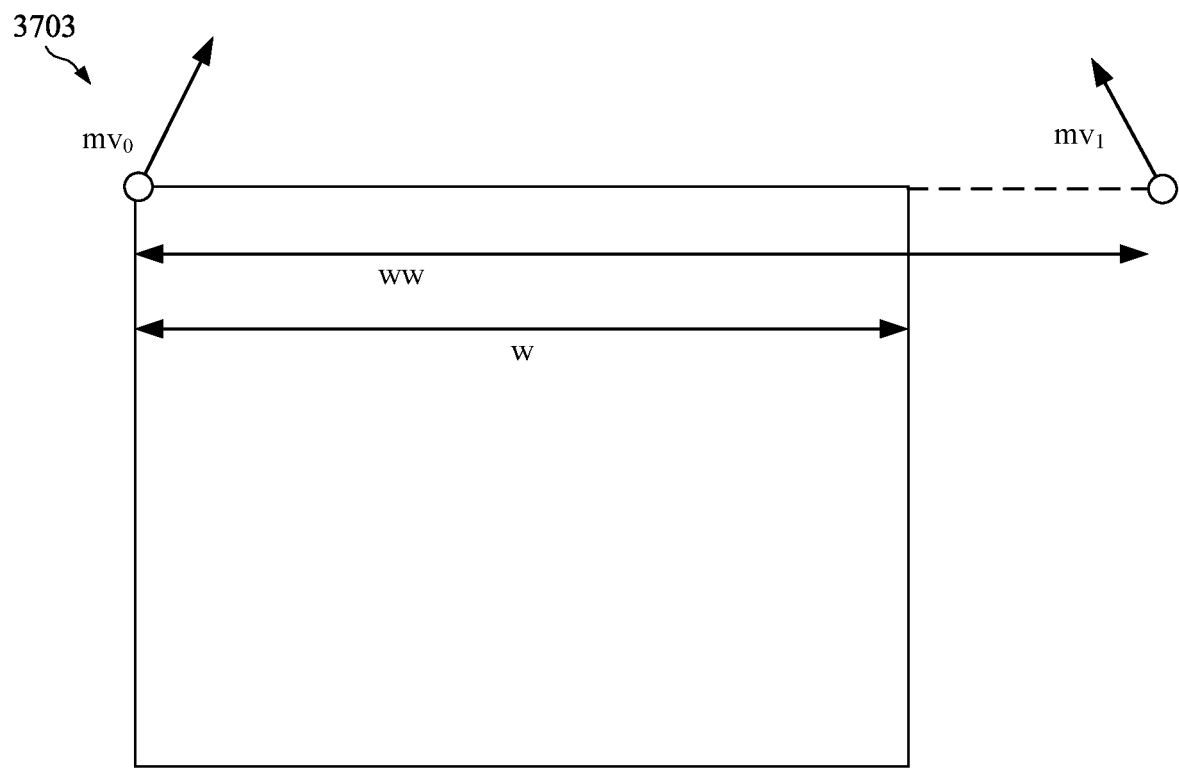
Figure 37B:
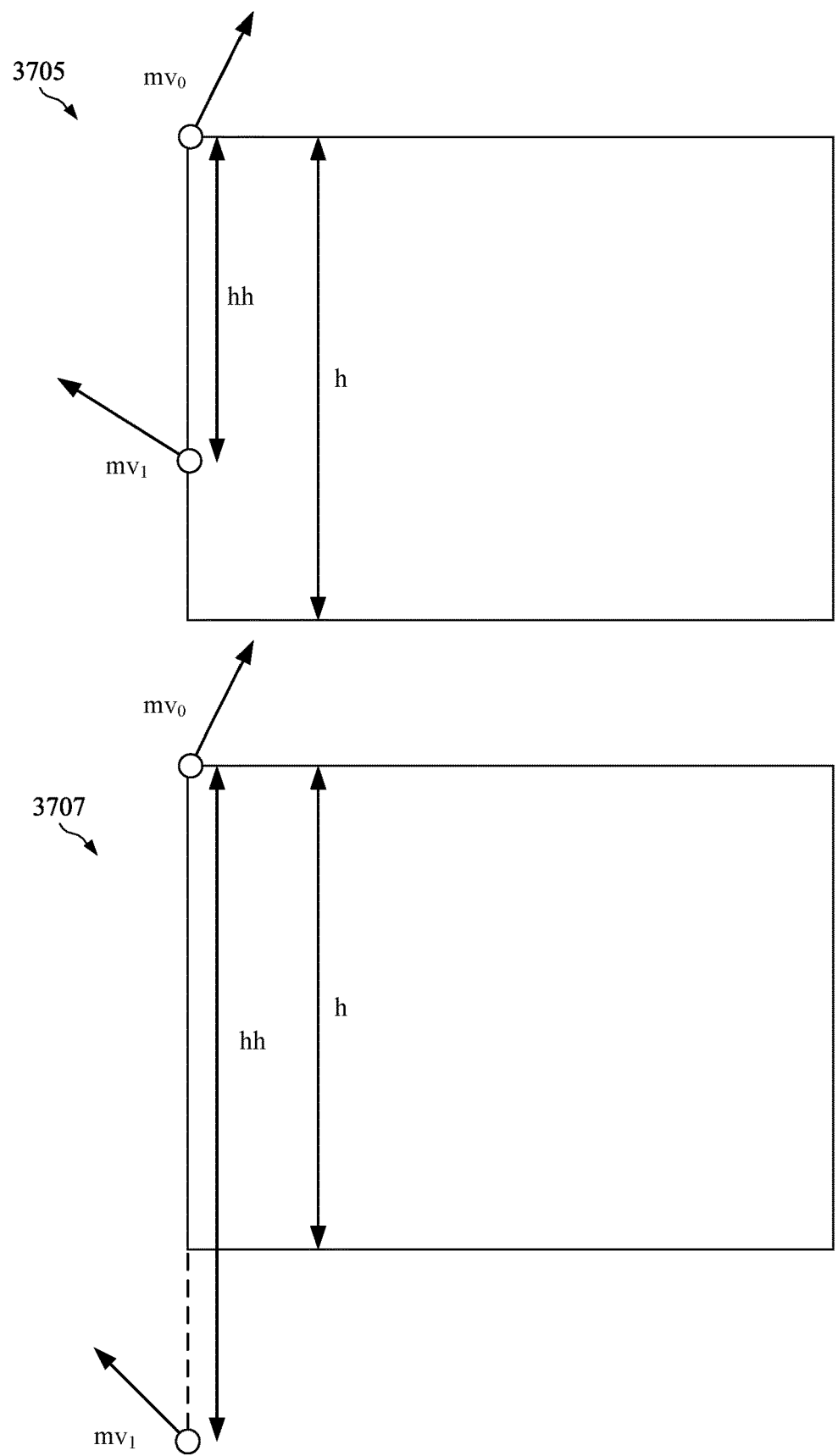

FIGS. 37A-37B are a schematic diagram 3700 illustrating an example of determining positions of control point motion vectors (CPMVs) for a non-dyadic block. CPMVs are determined as part of performing inter prediction according to affine merge mode. In affine merge mode, CPMVs are determined for a block. Then an affine motion model is derived using the CPMVs as input. In an example, the affine motion model may employ any of Equations 1-7 as described above. The CPMVs are positioned at locations on the block and point toward reference samples in other images. Affine merge mode is configured to be employed to predict dyadic blocks. Accordingly, in some systems the affine merge mode does not function correctly when a non-dyadic block is employed. For example, the CPMVs may not be positioned correctly, and hence the affine motion model does not compute the motion vector field correctly. The present disclosure includes mechanisms to correctly position CPMVs to allow affine merge mode to operate with respect to non-dyadic blocks.

The blocks shown in diagram 3700 are non-dyadic. In an example, the block includes a width (w) and a height (h). In an example, a rule may require that the distance between two CPMVs be a dyadic value. FIG. 37A includes block 3701 and block 3703, which both include a w that is non-dyadic. In an example, a first CPMV may be denoted as $mv_0$ and a second CPMV may be denoted as $mv_1$. Block 3701 is an example of a block with CPMVs determined as follows. In block 3701, the $mv_0$ can be set to position (x0, y0) where (x0, y0) is a coordinate of a top left position in the block. Further, the $mv_1$ can be set to position (x0+ww, y0). In block 3701, ww can be a value determined according to ww=1<<$\lfloor \log_2 w \rfloor$, where << is left bit shift and $\lfloor \log_2 w \rfloor$ is a floor function applied to a base two logarithm of w. Block 3703 is substantially similar to block 3701. However, in block 3703 ww can be a value determined according to ww=1<<$\lceil \log_2 w \rceil$, where << is left bit shift and $\lceil \log_2 w \rceil$, is a ceiling function applied to a base two logarithm of w. In some examples, ww can be used instead of w in Equations 1, 2, and/or 3.

Reference is made to FIG. 37B, which includes block 3705 and block 3707, which each include an h that is non-dyadic.

In block 3705, the $mv_0$ can be set to position (x0, y0) where (x0, y0) is a coordinate of a top left position in the block. Further, the $mv_1$ can be set to position (x0, y0+hh). In block 3705, hh can be a value determined according to hh=1<<$\lfloor \log_2 h \rfloor$, where << is left bit shift and $\lfloor \log_2 h \rfloor$ is a floor function applied to a base two logarithm of h. Block 3707 is substantially similar to block 3705. However, in block 3707 hh can be a value determined according to hh=1<<$\lceil \log_2 h \rceil$, where << is left bit shift and $\lceil \log_2 h \rceil$ is a ceiling function applied to a base two logarithm of h. In some examples, hh can be used instead of w in Equations 3 and/or 5. In some examples, hh can be used instead of h in Equations 2 and/or 5. The CPMVs determined above can then be used to derive the MV field according to one or more affine modes, such as affine merge mode, inherited affine merge mode, AMVP, etc.

Accordingly, to address the problems mentioned above, several methods are disclosed to allow inter prediction to operate correctly for non-dyadic blocks. The methods result in achieving better coding performance.

The detailed embodiments below should be considered as examples to explain general concepts. These embodiments should not be interpreted in a narrow way. Furthermore, these embodiments can be combined in any manner. In the following discussion, QT, BT, TT, UQT, and ETT may refer to QT split, BT split, TT split, UQT split and ETT split, respectively. In the following discussion, a block is a dyadic block if both width and height is a dyadic number, which is in a form of a $2^N$ with N being a positive integer. The term block represents a group of samples associated with one-color, two-color, or three-color components, such as a CU, PU, TU, CB, PB, or TB. In the following discussion, a block is a non-dyadic block if at least one of width and height is a non-dyadic number, which cannot be represented in a form of a 2N with N being a positive integer. In the following discussion, split and partitioning have the same meaning.

In an example, the top-left coordinate of the current block can be (x, y). Further, cuWidth and cuHeight can be the width and height of the block. In an example, minDimBit, minDim, minStepBit, numSteps, dimShift are integer variables which are used in the LIC parameter derivation process. In an example, the LIC parameters may be defined as minDimBit=Log 2[min(cuHeight, cuWidth)]; minDim=1<<minDimBit; minStepBit=minDim>8 ? 1:0; numSteps=minDim>>minStepBit; and dimShift=minDimBit−minStepBit.

Example 1

In one example, coding tool X for an inter-coded block may be disabled for a non-dyadic block. The coding tool X may be bi-prediction or weighted bi-prediction. The coding tool X may be affine prediction. The coding tool X may be decoder-side motion vector refinement (DMVR) or decoder-side motion vector derivation (DMVD). The coding tool X may be multi-pass decoder-side motion vector refinement. The coding tool X may be triangular portioning mode (TPM) or geometric partitioning mode (GPM). The coding tool X may be bi-directional optical flow (BDOF). The coding tool X may be prediction refinement with optical flow (PROF). The coding tool X may be sub-block transform (SBT). The coding tool X may be multiple transform selection (MTS). The coding tool X may be low-frequency non-separable transform (LFNST). The coding tool X may be adaptive motion vector resolution (AMVR). The coding tool X may be combined inter-intra prediction (CIIP). The coding tool X may be multi-hypothesis prediction. The coding tool X may be subblock-based TMVP (sbTMVP), also known as ATMVP. The coding tool X may be FRUC. The coding tool X may be bi-prediction with CU-level weights (BCW), also known as GBi. The coding tool X may be OBMC. The coding tool X may be Local illumination compensation (LIC). The coding tool X may be template-matching based motion vector derivation. The coding tool X may be Template Matching based Adaptive Merge Candidate Reorder.

Example 2

In one example, whether to and/or how to indicate the usage of coding tool X for a block may depend on whether the block is a dyadic block or a non-dyadic block. In an example, whether to and/or how to indicate the usage of coding tool X for a dyadic block may depend on the dimension and/or ratio between block width and height of a dyadic block. In an example, whether to and/or how to indicate the usage of coding tool X for a non-dyadic block may depend on the dimension and/or ratio between block width and height of a dyadic block and whether X is allowed for a dyadic block with same or smaller number of samples. In an example, whether to and/or how to indicate the usage of coding tool X for a non-dyadic block may depend on the dimension and/or ratio between block width and height of a dyadic block and whether X is allowed for a dyadic block with same or larger number of samples.

Example 3

In one example, if X is disallowed for dyadic blocks with samples less than or equal to K (e.g., K=64), X may be also disallowed for non-dyadic blocks with samples less than or equal to K. In one example, the syntax element indicating the usage of coding tool X for the block may not be signaled for a non-dyadic block. For example, the syntax element may be inferred to be 0 (indicating that coding tool X is not used).

Example 4

In one example, how to perform a sub-block-based inter prediction method may depend on whether the current block is a non-dyadic block. In one example, the sub-block-based inter prediction method may be one or multiple of the affine prediction, sbTMVP, DMVR, BDOF, FRUC, or OBMC.

Example 5

In one example, how to split a block into sub-blocks may also depend on color component and/or color format. For example, a block with dimensions W×H may be split into M2×N2 subblocks if the block is a non-dyadic block but into M1×N1 subblocks if the block is a dyadic block, wherein M1 !=M2 and/or N1 !=N2. E.g., M1=N1=4, M2=N2=2. In another example, M1=N1=8, M2=N2=4. In one example, M1=N1=K, wherein K is a fixed integer such as 16. In one example, M2 is equal to M1 if W is a dyadic number. In one example, M2 is equal to W if W is a non-dyadic number. In one example, N2 is equal to N1 if H is a dyadic number. In one example, N2 is equal to H if H is a non-dyadic number.

Example 6

In one example, a chroma block may be split into M2×N2 subblocks if the block is a non-dyadic block, but into M1×N1 subblocks if the block is a dyadic block. For example, M1 !=M2 and/or N1 !=N2 if the block is a non-dyadic block and the color format is 4:2:0. In an example, M1=N1=4, M2=N2=2. In one example, a chroma block may be split into M2×N2 subblocks if the block is a non-dyadic block, but into M1×N1 subblocks if the block is a dyadic block. For example, M1 !=M2 and N1==N2 if the block is a non-dyadic block and the color format is 4:2:2. In an example, M1=N1=N2=4, M2=2.

For example, a chroma block may be split into 2×2 subblocks if the chroma block height or width is not in a form of 4×N wherein N is an integer. In one example, this method is applied only if the color format is 4:2:0. For example, a chroma block may be split into 4×2 subblocks if the chroma block height is not in a form of 4×N wherein N is an integer. In one example, this method is applied only if the color format is 4:2:0. In one example, this method is applied only if the color format is 4:2:2. For example, a chroma block may be split into 2×4 subblocks if the chroma block width is not in a form of 4×N wherein N is an integer. In one example, this method is applied only if the color format is 4:2:0. In one example, this method is applied only if the color format is 4:2:2.

For example, a block may be split into sub-blocks with different dimensions. Schematic diagram 3500 shows some examples. In one example, a block with dimensions W×H is split into $$\left\lfloor \frac{W}{M1} \right\rfloor \times \left\lfloor \frac{H}{N1} \right\rfloor$$

subblocks with dimensions M1×N1 (Type-1 subblock). In one example, a block with dimensions W×H is split into $$\left\lfloor \frac{H}{N1} \right\rfloor$$

subblocks with dimensions M2×N1 when W%M1 !=0 (Type-2 subblock). In one example, a block with dimensions W×H is split into $$\left\lfloor \frac{W}{M1} \right\rfloor$$

subblocks with dimensions M1×N2 when H%N1 !=0 (Type-3 subblock). In one example, a block with dimensions W×H is split into 1 subblock with dimensions M2×N2 when W%M1 !=0 and H%N1 !=0 (Type-4 subblock). For example, M1=N1=4 and M2=N2=2.

In one example, the Type-1 subblocks are on the left of Type-2 and/or Type-4 subblocks. Partition 3509 shows an example. In an example, the Type-1 subblocks are on the right of Type-2 and/or Type-4 subblocks. Partition 3511 shows an example. In one example, the Type-1 subblocks are above Type-3 and/or Type-4 subblocks. Partition 3501 shows an example. In one example, the Type-1 subblocks are below Type-3 and/or Type-4 subblocks. Partition 3503 shows an example. In one example, Type-2 subblocks and/or Type-4 subblocks are on the left of Type-1 subblocks. Partition 3507 shows an example. In one example, Type-2 subblocks and/or Type-4 subblocks are on the right of Type-1 subblocks. Partition 3505 shows an example. In some examples, Type-3 subblocks and/or Type-4 subblocks are above Type-1 subblocks. Partitions 3513 and 3515 show examples. In some examples, Type-3 subblocks and/or Type-4 subblocks are below Type-1 subblocks. Partitions 3505 and 3507 show examples. Type-3 subblocks are on the left of Type-4 subblocks. Partitions 3505 and 3513 shows an example. Type-3 subblocks are on the right of Type-4 subblocks. Partitions 3507 and 3515 shows an example. Type-2 subblocks are above Type-4 subblocks. Partitions 3505 and 3507 show example. Type-2 subblocks are below Type-4 subblocks. Partitions 3513 and 3515 show example. In one example, the sub-block-based inter prediction method may be not applied to a non-dyadic block. In one example, subblock-boundary OBMC may be not applied to the non-dyadic block when CU-boundary OBMC is applied to the non-dyadic block. In one example, subblock-based FRUC may be not applied to the non-dyadic block when FRUC (e.g., CU level FRUC) is applied to the non-dyadic block.

Example 7

In one example, how to split a block into sub-block in BDOF or DMVR or other decoder side motion refinement tools may depend on whether the current block is a non-dyadic block. For example, the current block with dimensions W×H can be split into subblocks with dimensions M×N to allow application of the BDOF process. For example, the approach may allow for a more accurate padding process in BDOF and/or a more accurate block matching process in DMVR.

Example 8

In one example, M=Min(SBSize, W) and N=Min(SBSize, H), wherein SBSize is an integer such as 16, when the current block is a dyadic block. In an example, M=Min (SBSize, W) when W is in a form of W=k×SBSize, wherein k is an integer. In an example, N=Min(SBSize, H) when H is in a form of H=k×SBSize, wherein k is an integer. In one example, M=W when W is a non-dyadic number. In an example, M=Min(SBSize2, W) when W is a non-dyadic number, wherein SBSize2<SBSize, W is in a form of W=k×SBSize, and wherein k is an integer. In one example, M=W when W is not in a form of W=k×SBSize, wherein k is an integer. In an example, M=Min(SBSize2, W) when W is not in a form of W=k1×SBSize, wherein SBSize2<SBSize, W is in a form of W=k2×SBSize, and wherein k1 and k2 are integers. In one example, N=H when H is a non-dyadic number. In an example, N=Min(SBSize2, H) when H is a non-dyadic number, wherein SBSize2<SBSize and H is in a form of H=k×SBSize, and wherein k is an integer. In one example, N=H when H is not in a form of H=k×SBSize, wherein k is an integer. In an example, N=Min(SBSize2, H) when H is not in a form of H=k1×SBSize, wherein SBSize2<SBSize, H is in a form of H=k2×SBSize, and wherein k1 and k2 are integers.

Example 9

In an example, when LIC is applied for a non-dyadic CU with dimensions W×H, the number of template samples is selected to be a power of 2 so that divisions are carried out with right shifting. This allows the application of LIC to avoid integer divisions.

Example 10

In one example, when a left neighboring column is available, N samples are selected from the left column. N is an integer such as numSteps. In another example, N may depend on W and/or H. In one example, when the above neighboring row is available, N samples are selected from the above row. N is an integer such as numSteps. In another example, N may depend on W and/or H. In one example, the selected samples may be located at following positions (an example is shown in diagram 3600), wherein f1(K)=((K*W)>>dimShift), f2(K)=((K*H)>>dimShift). In on example, N is an integer such as numSteps. In another example, N may depend on W and/or H. In an example, when the left neighboring column is available, the selected samples may be located at: (x−1, y+f2(0)), (x−1, y+f2(1)), . . . , (x−1, y+f2(N−1)). In an example, when the above neighboring row is available, the selected samples may be located at: (x+f1(0), y−1), (x+f1(1), y−1), . . . , (x+f1(N−1), y−1).

Example 11

In an example, the selected samples may be located at following positions. When the left neighboring column is available, the top N samples are selected from the left column. N is an integer such as numSteps. In another example, N may depend on W and/or H. In an example, when the left neighbouring column is available, the middle N samples are selected from the left column N is an integer such as numSteps. In another example, N may depend on W and/or H. In an example, when the left neighboring column is available, the bottom N samples are selected from the left column. N is an integer such as numSteps. In another example, N may depend on W and/or H. In an example, when the above neighboring row is available, the left N samples are selected from the above row. N is an integer such as numSteps. In another example, N may depend on W and/or H. In an example, when the above neighboring row is available, the middle N samples are selected from the above row. N is an integer such as numSteps. In another example, N may depend on W and/or H. In an example, when the above neighboring row is available, the right N samples are selected from the above row. N is an integer such as numSteps. In another example, N may depend on W and/or H.

Example 12

In one example, the performance of sub-block transforms (SBTs) may depend on whether the current block is a non-dyadic block.

Example 13

In one example, the method of splitting the current coding unit into two or more transform units may be dependent on whether the current coding unit is a non-dyadic unit. For example, a rule may prevent a non-dyadic unit from being split into subblock transforms including transform units of T1 (such as T1=¼, T1=¾, T1=½) size of the coding unit. For example, a non-dyadic unit may be split into subblock transform including a transform unit of T2 (such as T2=⅓, T2=⅔) size of the coding unit. For example, a non-dyadic unit may be split into subblock transform including a transform unit of a predefined size of H, such as H=4n, where n may be a constant or a variable. In one example, a mechanism for signaling/deriving the splitting and residual coding of a sub-block transform may be dependent on whether the current coding unit is a non-dyadic unit. For example, one or more syntax elements may be signaled (instead of cu_sbt_quad_flag) to indicate whether the coding unit is split into a subblock transform including a transform unit of ¼, ½, or X (such as X=⅓, and/or ⅙, etc.) size of the current coding unit. In an example, when splitting a non-dyadic dimension into a subblock transform, the splitting is inferred to be performed in a pre-defined way (such as always split into ⅓ and ⅔ size of the current coding unit). In an example, when splitting the coding unit into subblock transform along the non-dyadic direction, syntax element(s) may be signaled to indicate how to split the non-dyadic dimension into N segments (such as ⅓ size followed by a ⅔ size, or ⅔ size followed by a ⅓ size of the non-dyadic dimension). For example, when a non-dyadic coding unit is split into two or more sub-units for transform, residues of the smallest sub-unit may be always coded (e.g., signaled or derived), regardless how the non-dyadic coding unit split.

Example 14

In an example, the method of deriving a motion vector with the affine transform equation in equation (1) or equation (2) may depend on whether w and/or h in equation (1) or equation (2) is a dyadic number or not. In one example, the motion vector is derived with the affine transform equation in equation (1) with the division operations when w is a non-dyadic number. In one example, the motion vector is derived with the affine transform equation in equation (2) with the division operations when w or h is a non-dyadic number. In one example, the motion vector is derived with the affine transform equation in equation (1) and equation (2) with the division operations when w or h is a non-dyadic number. The motion vector may be derived for a sub-block in an affine-coded block. The motion vector may be derived for an inherited affine merge candidate. The motion vector may be derived for an inherited affine inter-coded candidate, such as an AMVP candidate.

Example 15

In one example, the position of a control point MV (CPMV) of a block may depend on whether the block is a dyadic block or not. In an example, the block dimensions are w×h. For example, a rule may require the distance between two positions of CPMVs of a non-dyadic block to be a dyadic number. For example, the positions for two CPMVs mv0 and mv1 are (x0, y0) and (x0+ww, y0) when w is a non-dyadic number. In one example, (x0, y0) is the top-left position of the block. In one example, ww=1<<⌊log$_2$w⌋, as shown in block 3701. In one example, ww=1<<⌈log$_2$w⌉, as shown in block 3703. In one example, ww may be used instead of w in equation (1), equation (2), or equation (3). For example, the positions for two CPMVs mv0 and mv2 are (x0, y0) and (x0, y0+hh) when h is a non-dyadic number. In one example, (x0, y0) is the top-left position of the block. In one example, hh=1<<⌊log$_2$h⌋, as shown in block 3705. In one example, hh=1<<⌈log$_2$h⌉, as shown in block 3707. In one example, hh may be used instead of h in equation (3) or equation (5). The CPMVs may be used to derive the MV for a sub-block in an affine-coded block. The CPMVs may be used to derive an inherited affine merge candidate. The CPMVs may be used to derive an inherited affine inter-coded candidate, such as an AMVP candidate.

Figure 38:
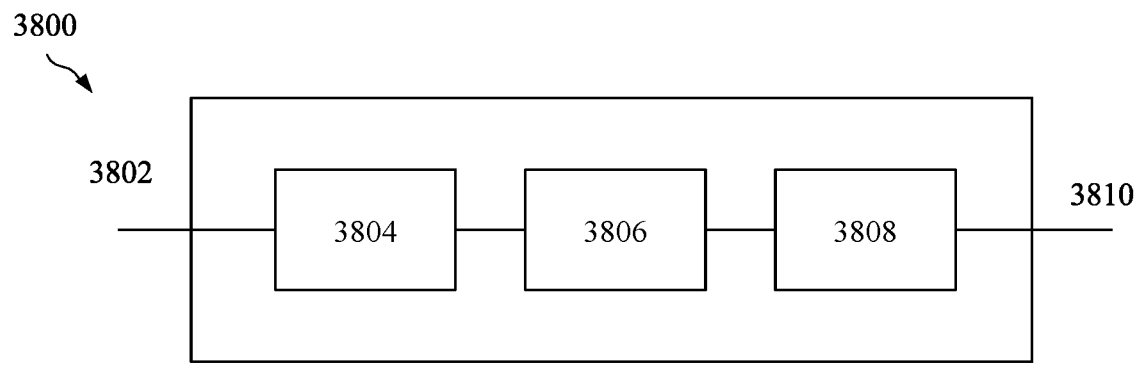
FIG. 38 is a block diagram showing an example video processing system.

FIG. 38 is a block diagram showing an example video processing system 3800 in which various techniques disclosed herein may be implemented. Various implementations may include some or all of the components of the system 3800. The system 3800 may include input 3802 for receiving video content. The video content may be received in a raw or uncompressed format, e.g., 8- or 10-bit multi-component pixel values, or may be in a compressed or encoded format. The input 3802 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3800 may include a coding component 3804 that may implement the various coding or encoding methods described in the present document. The coding component 3804 may reduce the average bitrate of video from the input 3802 to the output of the coding component 3804 to produce a coded representation of the video. The coding techniques are therefore sometimes called video compression or video transcoding techniques. The output of the coding component 3804 may be either stored, or transmitted via a communication connected, as represented by the component 3806. The stored or communicated bitstream (or coded) representation of the video received at the input 3802 may be used by a component 3808 for generating pixel values or displayable video that is sent to a display interface 3810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 39:
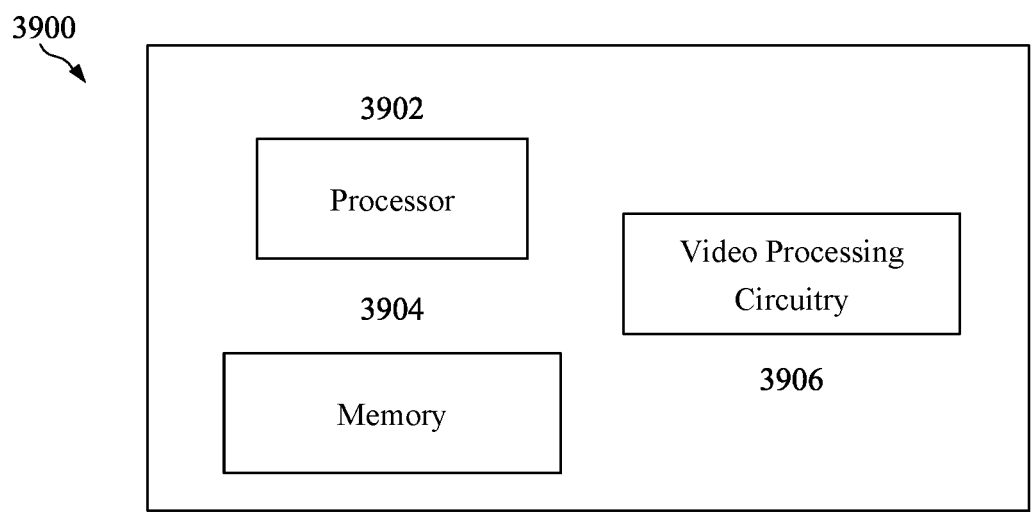
FIG. 39 is a block diagram of an example video processing apparatus.

FIG. 39 is a block diagram of an example video processing apparatus 3900. The apparatus 3900 may be used to implement one or more of the methods described herein. The apparatus 3900 may be embodied in a smartphone, tablet, computer, Internet of Things (IoT) receiver, and so on. The apparatus 3900 may include one or more processors 3902, one or more memories 3904 and video processing circuitry 3906. The processor(s) 3902 may be configured to implement one or more methods described in the present document. The memory (memories) 3904 may be used for storing data and code used for implementing the methods and techniques described herein. The video processing circuitry 3906 may be used to implement, in hardware circuitry, some techniques described in the present document. In some embodiments, the video processing circuitry 3906 may be at least partly included in the processor 3902, e.g., a graphics co-processor.

Figure 40:
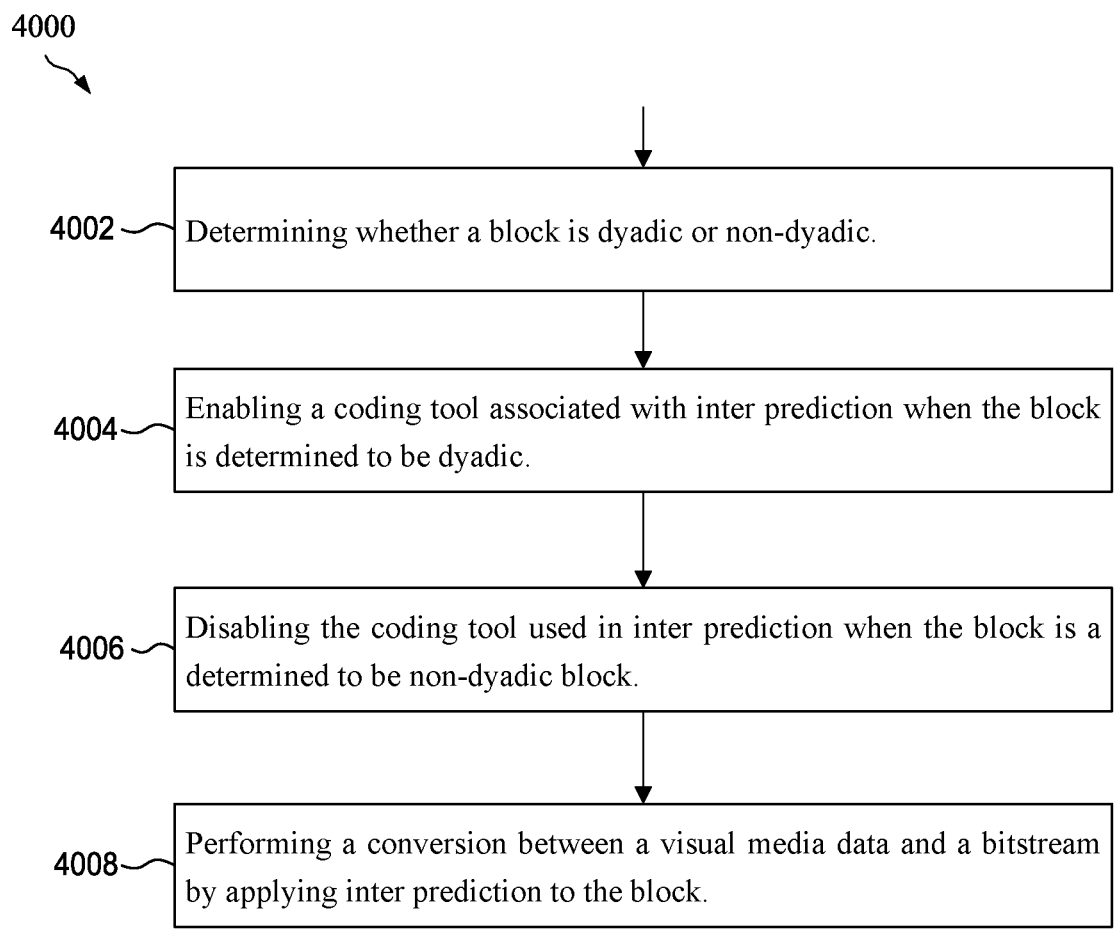
FIG. 40 is a flowchart for an example method of video processing.

FIG. 40 is a flowchart for an example method 4000 of video processing implemented by a video coding apparatus. The method 4000 includes determining whether a block is dyadic or non-dyadic at step 4002. At step 4004, the method enables a coding tool associated with inter prediction when the block is determined to be dyadic. At step 4006, the method disables the coding tool when the block is determined to be non-dyadic. At step 4008, a conversion is performed between a visual media data and a bitstream by applying inter prediction to the block. In an example, the conversion may include encoding the visual media data into a bitstream at an encoder. In another example, the conversion may include decoding the visual media data from a bitstream at a decoder.

In an example, the disabled coding tool may be bi-directional inter prediction, weighted bidirectional inter prediction, affine prediction, DMVR, DMVD, multi-pass decoder-side motion vector refinement, TPM, GPM, BDOF, PROF, SBT, MTS, LFNST, AMVR, CIIP, multi-hypothesis prediction, subblock-based TMVP, FRUC, bi-prediction with CU-level weights, OBMC, LIC, template-matching based motion vector derivation, template matching based adaptive merge candidate reorder, sub-block based inter prediction, or combinations thereof. In an example, usage of one or more coding tools for the block is indicated in the bitstream based on whether the block is non-dyadic. For example, usage of one or more coding tools for the block is indicated in the bitstream based on a dimension of the block. As another example, the block includes a number of samples. Further, usage of one or more coding tools for the block can be indicated in the bitstream based on whether the one or more coding tools are enabled for a dyadic block with a number of samples less than or equal to the number of samples in the block. As discussed above, block is non-dyadic when a dimension of a side of the block cannot be expressed as a power of two.

In an example, the block may be partitioned to include sub-blocks. Further, performing the conversion may include performing sub-block based inter prediction on the block based on whether the block is non-dyadic. Further, the block may be split into sub-blocks based on whether the block is non-dyadic. In some examples, the block is split into sub-blocks based on whether the block is a chroma block. In an example, the block is split into M2×N2 sub-blocks when the block is non-dyadic, and wherein the block is split into M1×N1 sub-blocks when the block is dyadic, wherein M1, M2, N1, and N2 are integer values, and wherein M1 is not equal to M2 or N1 is not equal to N2. In an example, the block is split into 2×2 sub-blocks when a dimension of the block is not in a form of 4N where N is an integer. In an example, the block is split into 4×2 sub-blocks when a dimension of the block is not in a form of 4N where N is an integer. In an example, the block is split into 2×4 sub-blocks when a dimension of the block is not in a form of 4N where N is an integer. In an example, the block has a width (W) and a height (H), and the block is split into one or more subblocks with dimensions M1×N1 when $$\left\lfloor \frac{W}{M1} \right\rfloor \times \left\lfloor \frac{H}{N1} \right\rfloor,$$

where M1 and N are integers. In an example, the block is split into one or more subblocks with dimensions M2×N1 when W%M1 is not equal to zero and $$\left\lfloor \frac{H}{N1} \right\rfloor,$$

where M2, M1, and N1 are integers and % is a modulo operator. In an example, the block is split into one or more subblocks with dimensions M1×N2 when H%N1 is not equal to zero and $$\left\lfloor \frac{W}{M1} \right\rfloor,$$

where N2, N1, and M1 are integers and % is a modulo operator. In an example, the block is split into one or more subblocks with dimensions M2×N2 when H%N1 is not equal to zero and W%M1 is not equal to zero, where N2, N1, M2, and M1 are integers and % is a modulo operator.

In an example, performing the conversion may include performing decoder side motion refinement on the block based on whether the block is non-dyadic. In an example, a number of templates are a power of two when performing LIC on the block. For example, N samples from a left neighboring column are used for LIC when the left neighboring column is available, and/or N samples from an above neighboring row are used for LIC when the above neighboring row is available. N may be an integer value. In a specific example, samples used for LIC are located at (x−1, y+f2(0)), (x−1, y+f2(1)), . . . , (x−1, y+f2(N−1)) in the left neighboring column and at (x+f1(0), y−1), (x+f1(1), y−1), . . . , (x+f1(N−1), y−1) in the above neighboring row, where x and y are coordinates, f1(K)=((K*W)>>dimShift), f2(K)=((K*H)>>dimShift), K is an integer value, W is a width of the CU, H is a height of the CU, >> indicates a right bitshift, and dimShift is an integer variable used in the LIC parameter derivation process.

In an example, performing the conversion may include applying sub-block transforms to the block. The sub-block transforms may be sized based on whether the block is non-dyadic. In an example, affine inter prediction is applied to the block during the conversion. In an example, a four parameter affine model or a six parameter affine model may be selected based on whether a W of the block is a non-dyadic value or whether a H of the block is a non-dyadic value. In an example, the block is associated with a CPMV during the conversion. A position of the CPMV in the block may be selected based on whether the block is non-dyadic. For example, a rule may require a distance between two CPMVs in the block to be a dyadic value when the block is non-dyadic. For example, the block may have a width denoted as w. A position of a first CPMV ($mv_0$) can be (x0, y0) and a position of a second CPMV ($mv_1$) can be (x0+ww, y0) when w is a non-dyadic number. (x0, y0) is a top-left position of the block, and ww is equal to $1 << \lfloor \log_2 w \rfloor$ where << is a left bitshift operation. In an example, the block may have a height denoted as h. A position of a first CPMV ($mv_0$) may be (x0, y0) and a position of a second CPMV ($mv_1$) may be (x0, y0+hh) when h is a non-dyadic number. (x0, y0) is a top-left position of the block, and hh is equal $1 << \lfloor \log_2 h \rfloor$ where << is a left bitshift operation.

It should be noted that the method 4000 can be implemented in an apparatus for processing video data comprising a processor and a non-transitory memory with instructions thereon, such as video encoder 4200, video decoder 4300, and/or encoder 4400. In such a case, the instructions upon execution by the processor, cause the processor to perform the method 4000. Further, the method 4000 can be performed by a non-transitory computer readable medium comprising a computer program product for use by a video coding device. The computer program product comprises computer executable instructions stored on the non-transitory computer readable medium such that when executed by a processor cause the video coding device to perform the method 4000.

Figure 41:
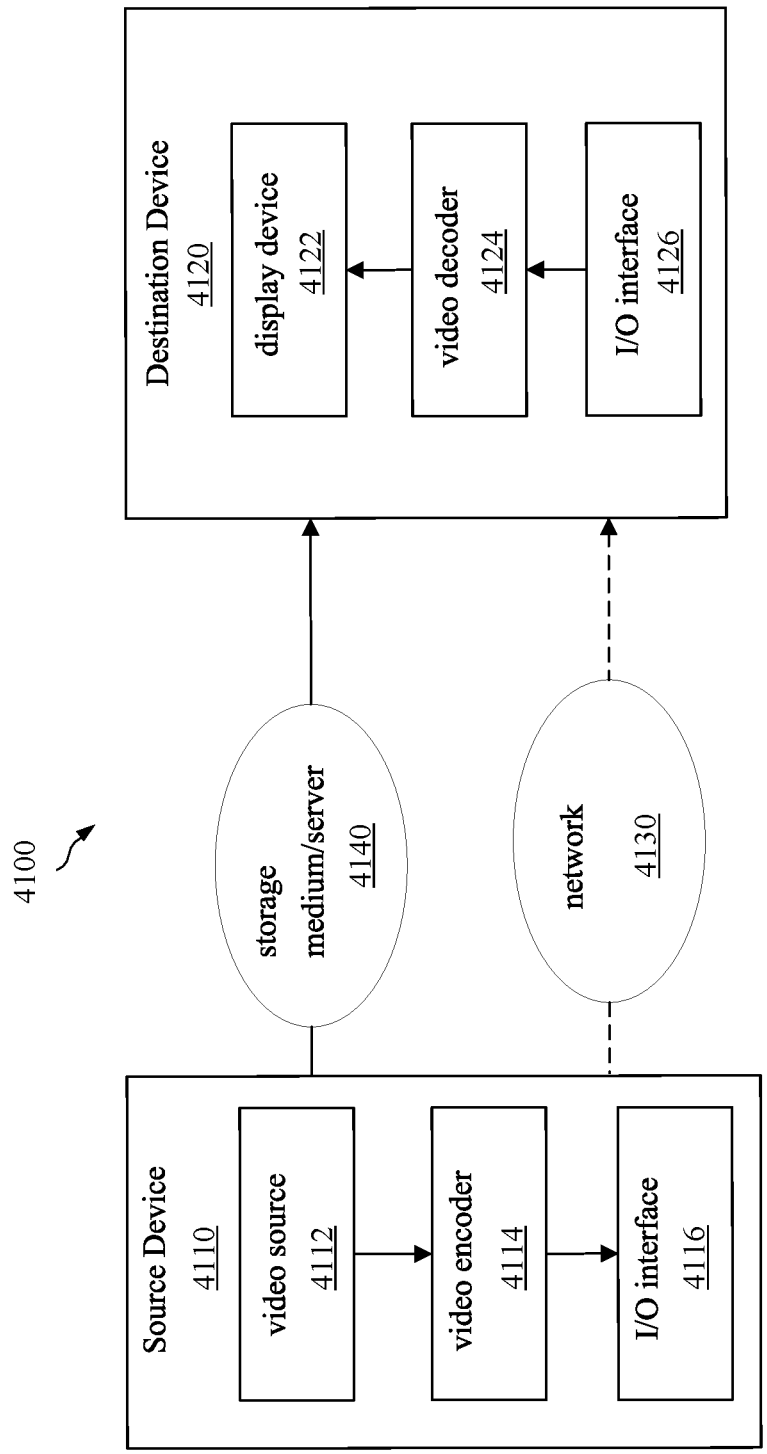
FIG. 41 is a block diagram that illustrates an example video coding system.

FIG. 41 is a block diagram that illustrates an example video coding system 4100 that may utilize the techniques of this disclosure. As shown in FIG. 41, video coding system 4100 may include a source device 4110 and a destination device 4120. Source device 4110 generates encoded video data which may be referred to as a video encoding device. Destination device 4120 may decode the encoded video data generated by source device 4110 which may be referred to as a video decoding device.

Source device 4110 may include a video source 4112, a video encoder 4114, and an input/output (I/O) interface 4116. Video source 4112 may include a source such as a video capture device, an interface to receive video data from a video content provider, and/or a computer graphics system for generating video data, or a combination of such sources. The video data may comprise one or more pictures. Video encoder 4114 encodes the video data from video source 4112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4116 may include a modulator/demodulator (modem) and/or a transmitter. The encoded video data may be transmitted directly to destination device 4120 via I/O interface 4116 through network 4130. The encoded video data may also be stored onto a storage medium/server 4140 for access by destination device 4120.

Destination device 4120 may include an I/O interface 4126, a video decoder 4124, and a display device 4122. I/O interface 4126 may include a receiver and/or a modem. I/O interface 4126 may acquire encoded video data from the source device 4110 or the storage medium/server 4140. Video decoder 4124 may decode the encoded video data. Display device 4122 may display the decoded video data to a user. Display device 4122 may be integrated with the destination device 4120, or may be external to destination device 4120, which can be configured to interface with an external display device.

Video encoder 4114 and video decoder 4124 may operate according to a video compression standard, such as the HEVC standard, VVC standard, and other current and/or further standards.

Figure 42:
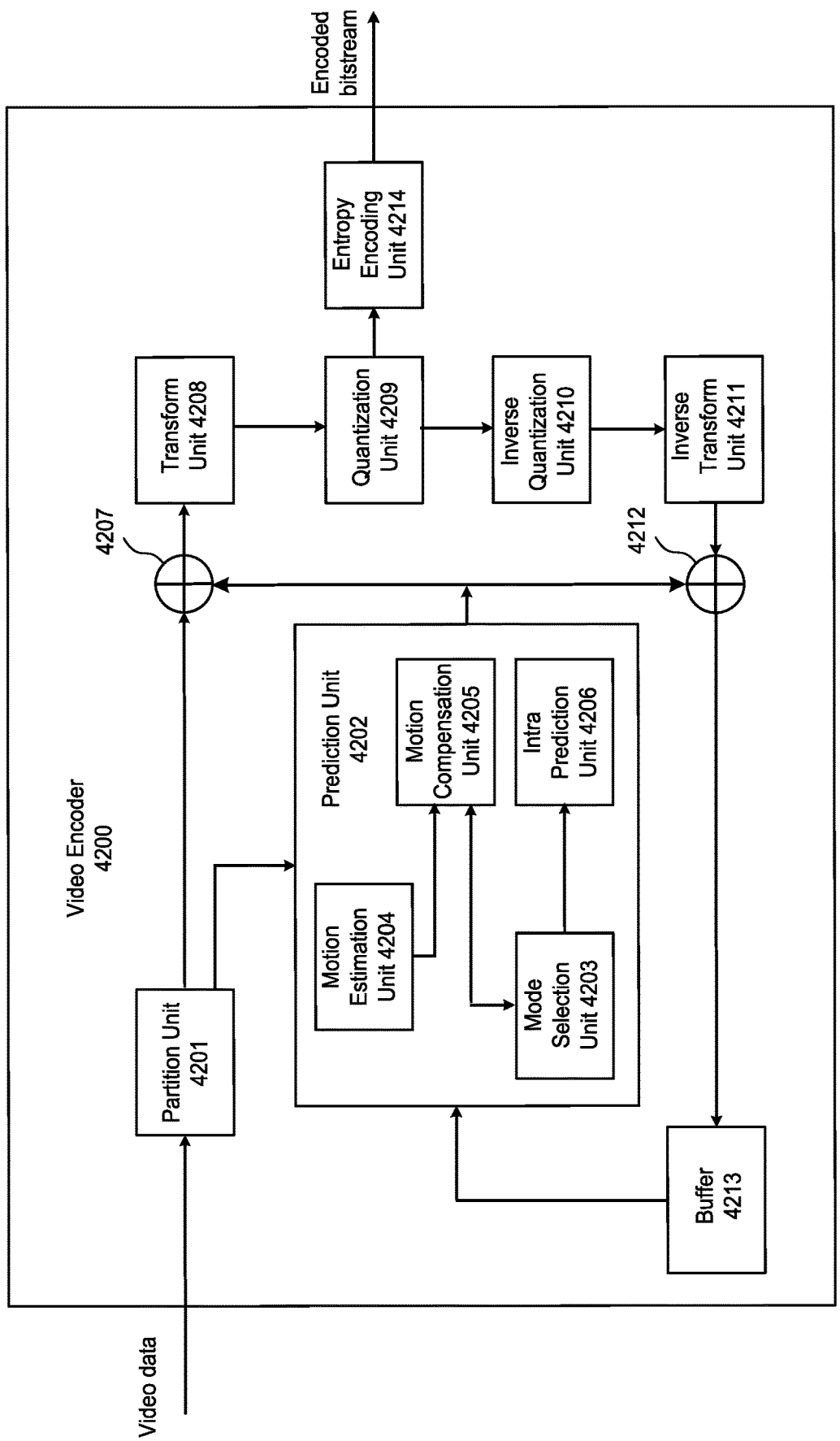
FIG. 42 is a block diagram that illustrates an example encoder.

FIG. 42 is a block diagram illustrating an example of video encoder 4200, which may be video encoder 4114 in the system 4100 illustrated in FIG. 41. Video encoder 4200 may be configured to perform any or all of the techniques of this disclosure. In the example of FIG. 42, video encoder 4200 includes a plurality of functional components. The techniques described in this disclosure may be shared among the various components of video encoder 4200. In some examples, a processor may be configured to perform any or all of the techniques described in this disclosure.

The functional components of video encoder 4200 may include a partition unit 4201; a prediction unit 4202, which may include a mode selection unit 4203, a motion estimation unit 4204, a motion compensation unit 4205, and an intra prediction unit 4206; a residual generation unit 4207; a transform processing unit 4208; a quantization unit 4209; an inverse quantization unit 4210; an inverse transform unit 4211; a reconstruction unit 4212; a buffer 4213; and an entropy encoding unit 4214.

In other examples, video encoder 4200 may include more, fewer, or different functional components. In an example, prediction unit 4202 may include an intra block copy (IBC) unit. The IBC unit may perform prediction in an MC mode in which at least one reference picture is a picture where the current video block is located.

Furthermore, some components, such as motion estimation unit 4204 and motion compensation unit 4205 may be highly integrated, but are represented in the example of FIG. 42 separately for purposes of explanation.

Partition unit 4201 may partition a picture into one or more video blocks. Video encoder 4200 and video decoder 4300 may support various video block sizes.

Mode selection unit 4203 may select one of the coding modes, intra or inter, e.g., based on error results, and provide the resulting intra or inter coded block to a residual generation unit 4207 to generate residual block data and to a reconstruction unit 4212 to reconstruct the encoded block for use as a reference picture. In some examples, mode selection unit 4203 may select a combination of intra and inter prediction (CIIP) mode in which the prediction is based on an inter prediction signal and an intra prediction signal. Mode selection unit 4203 may also select a resolution for a motion vector (e.g., a sub-pixel or integer pixel precision) for the block in the case of inter prediction.

To perform inter prediction on a current video block, motion estimation unit 4204 may generate motion information for the current video block by comparing one or more reference frames from buffer 4213 to the current video block. Motion compensation unit 4205 may determine a predicted video block for the current video block based on the motion information and decoded samples of pictures from buffer 4213 other than the picture associated with the current video block.

Motion estimation unit 4204 and motion compensation unit 4205 may perform different operations for a current video block, for example, depending on whether the current video block is in an I slice, a P slice, or a B slice.

In some examples, motion estimation unit 4204 may perform uni-directional prediction for the current video block, and motion estimation unit 4204 may search reference pictures of list 0 or list 1 for a reference video block for the current video block. Motion estimation unit 4204 may then generate a reference index that indicates the reference picture in list 0 or list 1 that contains the reference video block and a motion vector that indicates a spatial displacement between the current video block and the reference video block. Motion estimation unit 4204 may output the reference index, a prediction direction indicator, and the motion vector as the motion information of the current video block. Motion compensation unit 4205 may generate the predicted video block of the current block based on the reference video block indicated by the motion information of the current video block.

In other examples, motion estimation unit 4204 may perform bi-directional prediction for the current video block, motion estimation unit 4204 may search the reference pictures in list 0 for a reference video block for the current video block and may also search the reference pictures in list 1 for another reference video block for the current video block. Motion estimation unit 4204 may then generate reference indexes that indicate the reference pictures in list 0 and list 1 containing the reference video blocks and motion vectors that indicate spatial displacements between the reference video blocks and the current video block. Motion estimation unit 4204 may output the reference indexes and the motion vectors of the current video block as the motion information of the current video block. Motion compensation unit 4205 may generate the predicted video block of the current video block based on the reference video blocks indicated by the motion information of the current video block.

In some examples, motion estimation unit 4204 may output a full set of motion information for decoding processing of a decoder. In some examples, motion estimation unit 4204 may not output a full set of motion information for the current video. Rather, motion estimation unit 4204 may signal the motion information of the current video block with reference to the motion information of another video block. For example, motion estimation unit 4204 may determine that the motion information of the current video block is sufficiently similar to the motion information of a neighboring video block.

In one example, motion estimation unit 4204 may indicate, in a syntax structure associated with the current video block, a value that indicates to the video decoder 4300 that the current video block has the same motion information as another video block.

In another example, motion estimation unit 4204 may identify, in a syntax structure associated with the current video block, another video block and a motion vector difference (MVD). The motion vector difference indicates a difference between the motion vector of the current video block and the motion vector of the indicated video block. The video decoder 4300 may use the motion vector of the indicated video block and the motion vector difference to determine the motion vector of the current video block.

As discussed above, video encoder 4200 may predictively signal the motion vector. Two examples of predictive signaling techniques that may be implemented by video encoder 4200 include advanced motion vector prediction (AMVP) and merge mode signaling.

Intra prediction unit 4206 may perform intra prediction on the current video block. When intra prediction unit 4206 performs intra prediction on the current video block, intra prediction unit 4206 may generate prediction data for the current video block based on decoded samples of other video blocks in the same picture. The prediction data for the current video block may include a predicted video block and various syntax elements.

Residual generation unit 4207 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4207 may not perform the subtracting operation.

Transform processing unit 4208 may generate one or more transform coefficient video blocks for the current video block by applying one or more transforms to a residual video block associated with the current video block.

After transform processing unit 4208 generates a transform coefficient video block associated with the current video block, quantization unit 4209 may quantize the transform coefficient video block associated with the current video block based on one or more quantization parameter (QP) values associated with the current video block.

Inverse quantization unit 4210 and inverse transform unit 4211 may apply inverse quantization and inverse transforms to the transform coefficient video block, respectively, to reconstruct a residual video block from the transform coefficient video block. Reconstruction unit 4212 may add the reconstructed residual video block to corresponding samples from one or more predicted video blocks generated by the prediction unit 4202 to produce a reconstructed video block associated with the current block for storage in the buffer 4213.

After reconstruction unit 4212 reconstructs the video block, the loop filtering operation may be performed to reduce video blocking artifacts in the video block.

Entropy encoding unit 4214 may receive data from other functional components of the video encoder 4200. When entropy encoding unit 4214 receives the data, entropy encoding unit 4214 may perform one or more entropy encoding operations to generate entropy encoded data and output a bitstream that includes the entropy encoded data.

Figure 43:
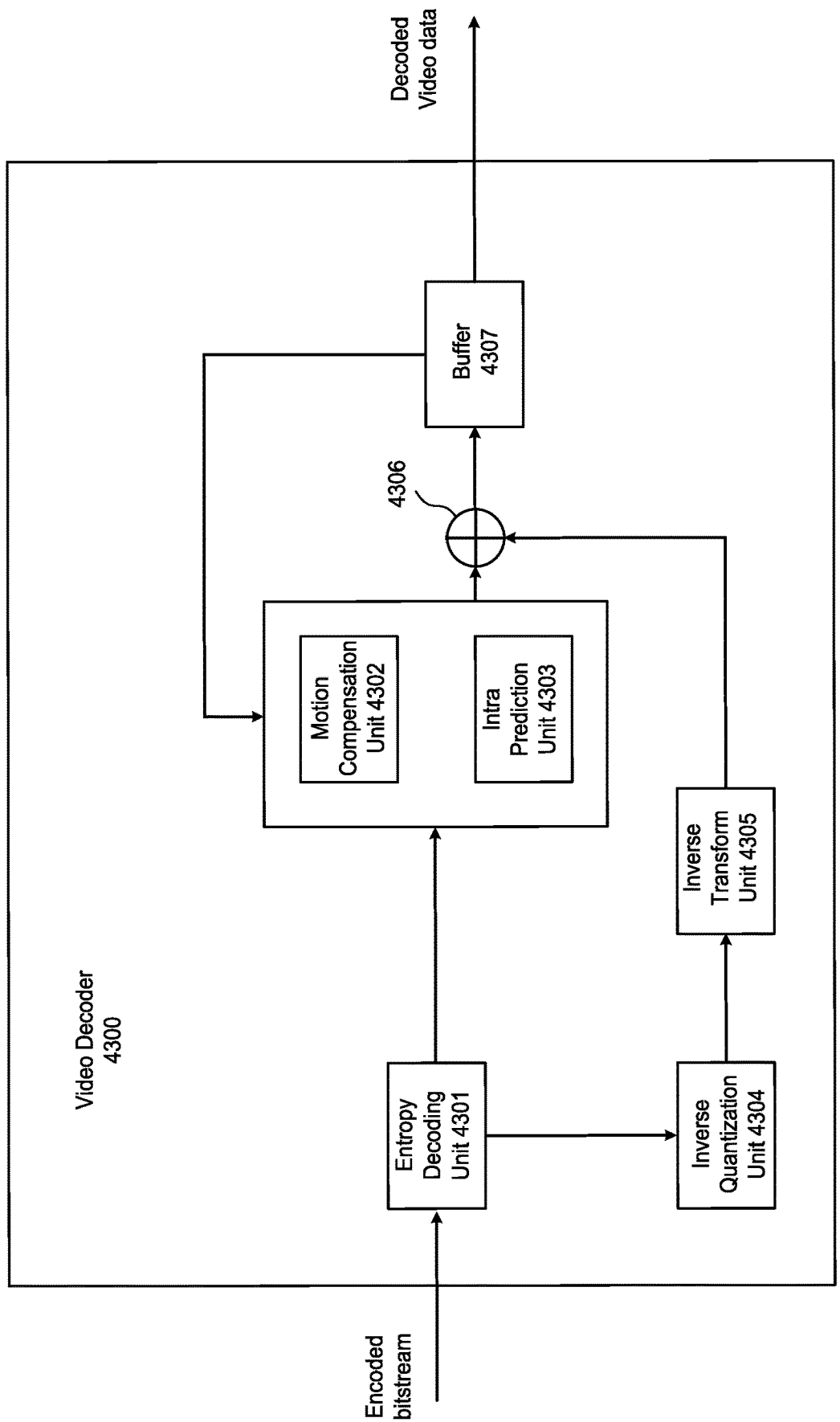
FIG. 43 is a block diagram that illustrates an example decoder.

FIG. 43 is a block diagram illustrating an example of video decoder 4300 which may be video decoder 4124 in the system 4100 illustrated in FIG. 41.

The video decoder 4300 may be configured to perform any or all of the techniques of this disclosure. In the example of FIG. 43, the video decoder 4300 includes a plurality of functional components. The techniques described in this disclosure may be shared among the various components of the video decoder 4300. In some examples, a processor may be configured to perform any or all of the techniques described in this disclosure.

In the example of FIG. 43, video decoder 4300 includes an entropy decoding unit 4301, a motion compensation unit 4302, an intra prediction unit 4303, an inverse quantization unit 4304, an inverse transformation unit 4305, a reconstruction unit 4306, and a buffer 4307. Video decoder 4300 may, in some examples, perform a decoding pass generally reciprocal to the encoding pass described with respect to video encoder 4200 (FIG. 42).

Entropy decoding unit 4301 may retrieve an encoded bitstream. The encoded bitstream may include entropy coded video data (e.g., encoded blocks of video data). Entropy decoding unit 4301 may decode the entropy coded video data, and from the entropy decoded video data, motion compensation unit 4302 may determine motion information including motion vectors, motion vector precision, reference picture list indexes, and other motion information. Motion compensation unit 4302 may, for example, determine such information by performing the AMVP and merge mode.

Motion compensation unit 4302 may produce motion compensated blocks, possibly performing interpolation based on interpolation filters. Identifiers for interpolation filters to be used with sub-pixel precision may be included in the syntax elements.

Motion compensation unit 4302 may use interpolation filters as used by video encoder 4200 during encoding of the video block to calculate interpolated values for sub-integer pixels of a reference block. Motion compensation unit 4302 may determine the interpolation filters used by video encoder 4200 according to received syntax information and use the interpolation filters to produce predictive blocks.

Motion compensation unit 4302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4303 may use intra prediction modes for example received in the bitstream to form a prediction block from spatially adjacent blocks. Inverse quantization unit 4304 inverse quantizes, i.e., de-quantizes, the quantized video block coefficients provided in the bitstream and decoded by entropy decoding unit 4301. Inverse transform unit 4305 applies an inverse transform.

Reconstruction unit 4306 may sum the residual blocks with the corresponding prediction blocks generated by motion compensation unit 4302 or intra prediction unit 4303 to form decoded blocks. If desired, a deblocking filter may also be applied to filter the decoded blocks in order to remove blockiness artifacts. The decoded video blocks are then stored in buffer 4307, which provides reference blocks for subsequent motion compensation/intra prediction and also produces decoded video for presentation on a display device.

Figure 44:
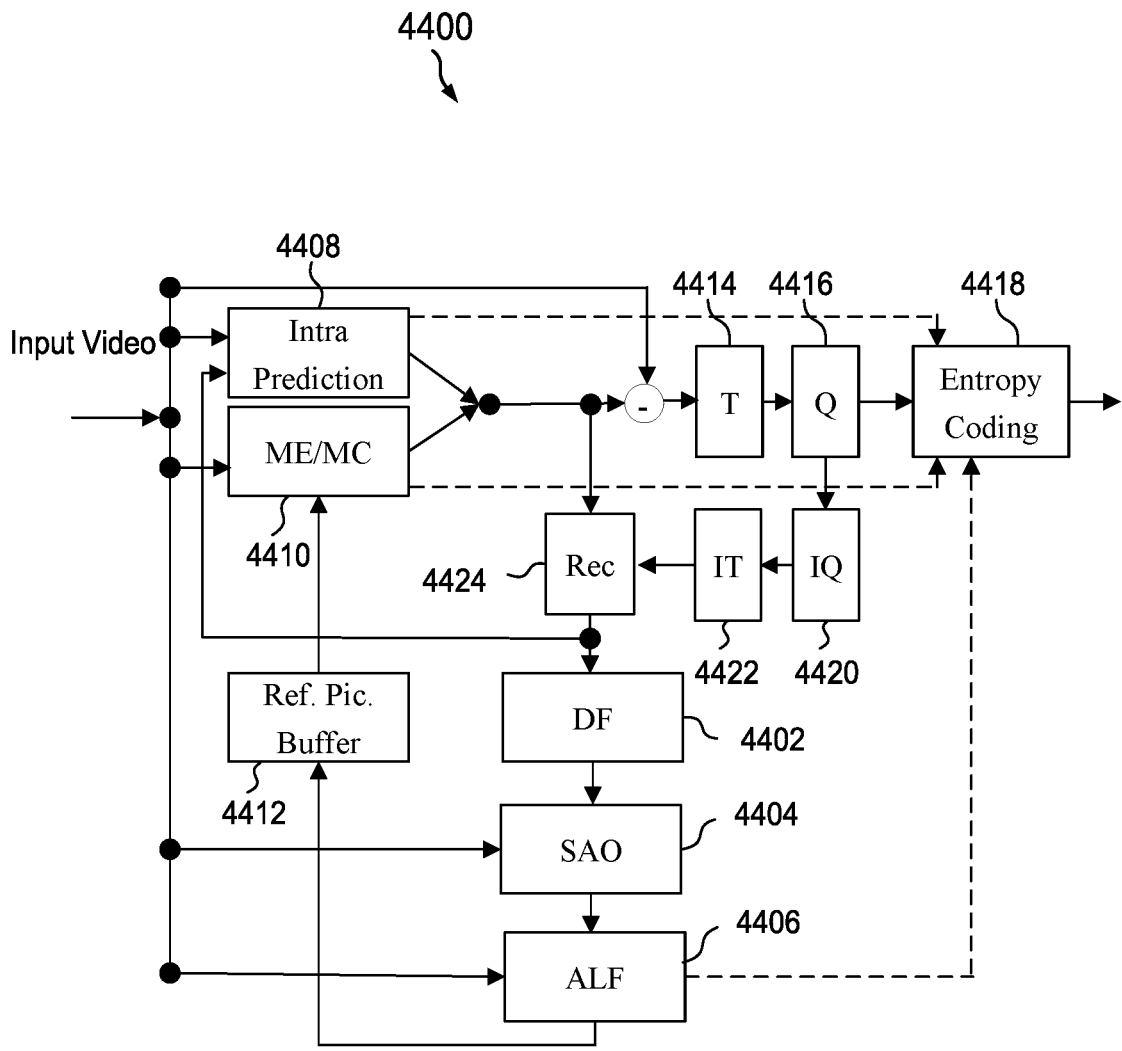
FIG. 44 is a schematic diagram of an example encoder.

FIG. 44 is a schematic diagram of an example encoder 4400. The encoder 4400 is suitable for implementing the techniques of VVC. The encoder 4400 includes three in-loop filters, namely a deblocking filter (DF) 4402, a sample adaptive offset (SAO) 4404, and an adaptive loop filter (ALF) 4406. Unlike the DF 4402, which uses predefined filters, the SAO 4404 and the ALF 4406 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4406 is located at the last processing stage of each picture and can be regarded as a tool trying to catch and fix artifacts created by the previous stages.

The encoder 4400 further includes an intra prediction component 4408 and a motion estimation/compensation (ME/MC) component 4410 configured to receive input video. The intra prediction component 4408 is configured to perform intra prediction, while the ME/MC component 4410 is configured to utilize reference pictures obtained from a reference picture buffer 4412 to perform inter prediction. Residual blocks from inter prediction or intra prediction are fed into a transform (T) component 4414 and a quantization (Q) component 4416 to generate quantized residual transform coefficients, which are fed into an entropy coding component 4418. The entropy coding component 4418 entropy codes the prediction results and the quantized transform coefficients and transmits the same toward a video decoder (not shown). Quantization components output from the quantization component 4416 may be fed into an inverse quantization (IQ) components 4420, an inverse transform component 4422, and a reconstruction (REC) component 4424. The REC component 4424 is able to output images to the DF 4402, the SAO 4404, and the ALF 4406 for filtering prior to those images being stored in the reference picture buffer 4412.

A list1 ng of solutions preferred by some examples is provided next.

The following solutions show examples of techniques discussed herein.

1. A video processing method (e.g., method 4000 depicted in FIG. 40), comprising: determining, for a conversion between a video block of a video and a bitstream of the video, whether a coding tool is disabled for the conversion based on whether the video block is dyadic; and performing the conversion based on the determining.
2. The method of solution 1, wherein the coding tool comprises a bi-prediction coding tool or a weighted bi-prediction coding tool.
3. The method of any of solutions 1-2, wherein the coding tool comprises an affine prediction tool.
4. The method of any of solutions 1-3, wherein the coding tool includes one or more of: decoder-side motion vector refinement (DMVR), encoder-side motion vector derivation (DMVD), multi-pass decoder-side motion vector refinement, triangular portioning mode (TPM), geometric partitioning mode (GPM), bi-directional optical flow (BDOF), prediction refinement with optical flow (PROF), sub-block transform (SBT), multiple transform selection (MTS), low-frequency non-separable transform (LFNST), adaptive motion vector resolution (AMVR), combined inter-intra prediction (CIIP), multi-hypothesis prediction, subblock-based TMVP, FRUC, bi-prediction with CU-level weights (BCW), OBMC, Local illumination compensation (LIC), template-matching based motion vector derivation, or Template Matching based Adaptive Merge Candidate Reorder.
5. The method of any of solutions 1-4, wherein a usage of a coding tool is selectively indicated in the bitstream based on whether the block is dyadic.
6. The method of any of solutions 1-5, wherein the coding tool is selectively indicated in the bitstream in case that the video block is dyadic based on a dimension and/or a ration of width to height of the video block.
7. A video processing method, comprising: determining, for a conversion between a video block of a video and a bitstream of the video, whether or how the video block is partitioned into sub-blocks for sub-block based inter-prediction, based on a rule; and performing the conversion based on the determining; wherein the rule depends on whether the video block is dyadic.
8. The method of solution 7, wherein the sub-block based inter-prediction comprises an affine inter prediction or sub-block temporal motion vector prediction or decoder-side motion vector refinement or bidirectional optical flow or frame rate upconversion or overlapped block motion compensation.
9. The method of any of solutions 7-8, wherein the rule specifies that how the video block is partitioned into sub-blocks further depends on a color component of the video block.
10. The method of any of solutions 7-9, wherein the rule specifies a block with dimensions W×H are split into M2×N2 subblocks if the block is a non-dyadic block, or into M1×N1 subblocks if the block is a dyadic block, wherein M1 !=M2 and/or N1 !=N2. Here != represents "not equal to" operation.
11. The method of solution 10, wherein M1=N1=4, M2=N2=2 or M1=N1=8, M2=N2=4.
12. The method of any of solutions 7-11, wherein the rule specifies that the video block is split into sub-blocks having different sizes in case that the video block is dyadic.
13. The method of any of solutions 7-12, wherein the rule specifies that a sub-block based inter-prediction is disabled for non-dyadic blocks.
14. A video processing method, comprising: determining, for a conversion between a video block of a video and a bitstream of the video, that a number of template samples used for a local illumination coding of the video block is a power of 2 due to the video block being non-dyadic; and performing the conversion based on the determining.
15. The method of solution 14, wherein, in case that a left neighboring column of the video block is available, N samples from the left column are used, wherein N is an integer or in case that an above neighboring row is available, N samples from the above neighboring row are used.
16. The method of solution 15, wherein N depends on a width W or a height H of the video block.
17. A video processing method, comprising: determining, for a conversion between a video block of a video and a bitstream of the video, whether or how the video block is partitioned into sub-blocks or a sub-block transform is used for the conversion, based on a rule; and performing the conversion based on the determining; wherein the rule depends on whether the video block is dyadic.
18. The method of solution 17, wherein the rule specifies that, in case that the video block is non-dyadic, the video block is not split into subblock transform units of T1 of the video block, where T1 is a fraction.
19. The method of solution 17, wherein the rule specifies that, in case that the video block is dyadic, the video block is split into subblock transform units of T2 of the video block, where T2 is a fraction.
20. The method of any of solutions 17-19, wherein T1 is ¼, ½ or ¾ or T2 is ⅓ or ⅔.
21. The method of any of solutions 17-20, wherein the rule further specifies residual coding of an output of the sub-block transform.
22. A video processing method, comprising: performing a conversion between a video comprising a video block and a bitstream of the video according to a rule; wherein the rule specifies that a motion vector is used during the conversion, wherein the motion vector is calculated using a 4-parameter affine model or a 6-parameter affine model based on whether width W or height H of the video block is a dyadic number.
23. The method of solution 22, wherein the rule specifies that the 4-parameter affine model is used in case that W is non-dyadic.
24. The method of solution 22, wherein the rule specifies that the 6-parameter affine model is used in case that W or H is non-dyadic.
25. The method of solution 22, wherein the rule specifies that the motion vector is for a sub-block of the video block responsive to the video block being coded as an affine block.

26. A video processing method, comprising: performing a conversion between a video comprising a video block and a bitstream of the video according to a rule; wherein the video block is coded using affine coding mode; wherein the rule specifies that position of a control point motion vectors (CPMV) of the video block is dependent on whether the video block is dyadic.

27. The method of solution 26, wherein the rule specifies that, in case that the video block is non-dyadic, a distance between CPMVs is dyadic.

28. The method of solution 26, wherein the video block is w×h and wherein positions of two CPMVs mv0 and mv1 are (x0, y0) and (x0+ww, y0) if w is a non-dyadic number, wherein: (1) (x0, y0) is a top-left position of the block, or (2) ww=1<<$\lfloor \log_2 w \rfloor$.

29. The method of solution 26, wherein the video block is w×h and wherein positions of two CPMVs mv0 and mv1 are (x0, y0) and (x0, y0+hh) if w is a non-dyadic number, wherein: (1) (x0, y0) is a top-left position of the block, or (2) hh=1<<$\lfloor \log_2 h \rfloor$.

30. The method of any of solutions 1-29, wherein the conversion includes generating the bitstream from the video.

31. The method of any of solutions 1-29, wherein the conversion includes generating the video from the bitstream.

32. A method of storing a bitstream on a computer-readable medium, comprising generating a bitstream according to a method recited in any one or more of solutions 1-31 and storing the bitstream on the computer-readable medium.

33. A computer-readable medium having a bitstream of a video stored thereon, the bitstream, when processed by a processor of a video decoder, causing the video decoder to generate the video, wherein the bitstream is generated according to a method recited in one or more of solutions 1-31.

34. A video decoding apparatus comprising a processor configured to implement a method recited in one or more of solutions 1 to 31.

35. A video encoding apparatus comprising a processor configured to implement a method recited in one or more of solutions 1 to 31.

36. A computer program product having computer code stored thereon, the code, when executed by a processor, causes the processor to implement a method recited in any of solutions 1 to 31.

37. A computer readable medium on which a bitstream complying to a bitstream format that is generated according to any of solutions 1 to 31.

38. A method, an apparatus, a bitstream generated according to a disclosed method or a system described in the present document.

39. A video processing method (e.g., method 4000 depicted in FIG. 40), comprising: determining, for a conversion between a video comprising a block and a bitstream of the video, whether a coding tool associated with inter prediction is enabled for the block based on whether the block is dyadic or non-dyadic; and performing the conversion based on the determining.

40. The method of solution 39, wherein the coding tool associated with inter prediction is enabled in a case that the block is determined to be dyadic and is disabled in a case that the block is determined to be non-dyadic, and wherein the coding tool comprises one or more selected from a group comprising: bi-directional inter prediction, weighted bidirectional inter prediction, affine prediction, decoder-side motion vector refinement (DMVR), decoder-side motion vector derivation (DMVD), multi-pass decoder-side motion vector refinement, triangular portioning mode (TPM), geometric partitioning mode (GPM), bi-directional optical flow (BDOF), prediction refinement with optical flow (PROF), sub-block transform (SBT), multiple transform selection (MTS), low-frequency non-separable transform (LFNST), adaptive motion vector resolution (AMVR), combined inter-intra prediction (CIIP), multi-hypothesis prediction, subblock-based temporal motion vector prediction (sbTMVP), frame-rate up conversion (FRUC), bi-prediction with CU-level(coding unit-level) weights (BCW), overlapped block motion compensation (OBMC), local illumination compensation (LIC), template-matching based motion vector derivation, template matching based adaptive merge candidate reorder, and sub-block based inter prediction.

41. The method of any of solutions 39-40, wherein whether to indicate usage of the coding tool associated with inter prediction for the block in the bitstream is based on whether the block is dyadic or non-dyadic, and wherein the block is non-dyadic when a dimension of a side of the block is not expressed as a power of two.

42. The method of any of solutions 39-41, wherein the block comprises a number of samples, wherein in a case that the block is dyadic, whether to indicate usage of the coding tool associated with inter prediction for the block in the bitstream is based on a dimension of the block and/or a ratio between a width and a height of the block; wherein in a case that the block is non-dyadic, whether to indicate usage of the coding tool associated with inter prediction for the block in the bitstream is based on a dimension of the block and/or a ratio between a width and a height of the block and whether the coding tool associated with inter prediction is allowed for a dyadic block with a number of samples larger than or less than or equal to the number of samples in the block; and wherein in a case that the block is non-dyadic, a syntax element indicating the usage of the coding tool associated with inter prediction for the block is not signaled and is inferred to be 0.

43. The method of any of solutions 39-42, wherein if the coding tool associated with inter prediction is disallowed for a dyadic block with samples, a number of which is less than or equal to K, the coding tool associated with inter prediction is disallowed for a non-dyadic block with samples, a number of which is less than or equal to K, wherein K is a positive integer.

44. The method of any of solutions 39-43, further comprising performing sub-block based inter prediction on the block based on whether the block is dyadic or non-dyadic, wherein the sub-block based inter prediction comprises one or more selected from a group comprising: affine prediction, subblock-based temporal motion vector prediction (sbTMVP), decoder-side motion vector refinement (DMVR), bi-directional optical flow (BDOF), frame-rate up conversion (FRUC), and overlapped block motion compensation (OBMC).

45. The method of any of solutions 39-44, wherein in a case that the block is non-dyadic, the sub-block based inter prediction is not applied to the block; wherein in a case that the block is non-dyadic, subblock-boundary OBMC is not applied to the block when CU-boundary OBMC is applied to the block; and wherein in a case that the block is non-dyadic, subblock-based FRUC is not applied to the block when CU level FRUC is applied to the block.

46. The method of any of solutions 39-45, further comprising splitting the block into sub-blocks based on whether the block is dyadic or non-dyadic, wherein the block is split into M2×N2 sub-blocks when the block is non-dyadic, and wherein the block is split into M1×N1 sub-blocks when the block is dyadic, wherein M1, M2, N1, and N2 are integer values, and wherein M1 is not equal to M2 and/or N1 is not equal to N2; and wherein the block has a width (W) and a height (H), wherein M1=N1=4, M2=N2=2, or M1=N1=8, M2=N2=4; or wherein M1=N1=K, wherein K is a fixed integer; or wherein M2 is equal to M1 if W is a dyadic number or M2 is equal to W if W is a non-dyadic number; or wherein N2 is equal to N1 if H is a dyadic number or N2 is equal to H if H is a non-dyadic number.

47. The method of any of solutions 39-46, further comprising splitting the block into sub-blocks based on a color component and/or a color format of the block; wherein the block is split into M2×N2 sub-blocks if the block is a chroma block and a non-dyadic block, and wherein the block is split into M1×N1 sub-blocks if the block is a chroma block and a dyadic block, wherein M1, M2, N1, and N2 are integer values, wherein if the block is a non-dyadic block and the color format of the block is 4:2:0, M1 is not equal to M2 and/or N1 is not equal to N2; and wherein if the block is a non-dyadic block and the color format of the block is 4:2:2, M1 is not equal to M2 and N1 is equal to N2.

48. The method of any of solutions 39-47, wherein the block is a chroma block, wherein the block is split into 2×2 sub-blocks when a height or a width of the block is not in a form of 4×N and a color format of the block is 4:2:0, wherein N is an integer; or wherein the block is split into 4×2 sub-blocks when a height of the block is not in a form of 4×N and a color format of the block is 4:2:0 or 4:2:2, wherein N is an integer; or wherein the block is split into 2×4 sub-blocks when a width of the block is not in a form of 4×N and a color format of the block is 4:2:0 or 4:2:2, wherein N is an integer.

49. The method of any of solutions 39-48, wherein the block has a width (W) and a height (H), wherein the block is split into $$\left\lfloor \frac{W}{M1} \right\rfloor \times \left\lfloor \frac{H}{N1} \right\rfloor$$

first type sub-blocks with a dimension of M1×N1; wherein the block is split into $$\left\lfloor \frac{H}{N1} \right\rfloor$$

second type sub-blocks with a dimension of M2×N1 when W%M1 is not equal to zero; wherein the block is split into $$\left\lfloor \frac{W}{M1} \right\rfloor$$

third type sub-blocks with a dimension of M1×N2 when H%N1 is not equal to zero; wherein the block is split into one or more fourth type sub-blocks with a dimensions M2×N2 when W%M1 is not equal to zero and H%N1 is not equal to zero, and wherein N1, N2, M1, and M2 are integers and % is a modulo operator.

50. The method of any of solutions 39-49, wherein the first type sub-blocks are on left or right of the second type sub-blocks and/or the fourth type sub-blocks; wherein the first type sub-blocks are above or below of the third type sub-blocks and/or the fourth type sub-blocks; wherein the third type sub-blocks are on left or right of the fourth type sub-blocks; and wherein the second type sub-blocks are on above or below of the fourth type sub-blocks.

51. The method of any of solutions 39-50, further comprising splitting the block into sub-blocks in decoder-side motion vector refinement (DMVR), bi-directional optical flow (BDOF), or multi-pass decoder-side motion vector refinement based on whether the block is dyadic or non-dyadic; wherein the block with a dimension of W×H is split into sub-blocks with a dimension of M×N to allow application of the BDOF or the DMVR, wherein the application of the BDOF comprises application of a padding process in the BDOF, and the application of the DMVR comprises application of a block matching process in the DMVR; wherein in a case that the block is dyadic, M=Min(SBSize, W), N=Min(SBSize, H), wherein SBSize is an integer; or M=Min(SBSize, W), if W is in a form of W=k×SBSize, wherein k is an integer; or N=Min(SBSize, H), if H is in a form of H=k×SBSize, wherein k is an integer; wherein in a case that the block is non-dyadic, M=W, if W is a non-dyadic number; or M=Min(SBSize2, W), if W is a non-dyadic number, wherein SBSize2<SBSize, and W is in a form of W=k×SBSize, wherein k is an integer; or M=W, if W is not in a form of W=k×SBSize, wherein k is an integer; or M=Min(SBSize2, W), if W is not in a form of W=k1×SBSize, wherein SBSize2<SBSize, and W is in a form of W=k2×SBSize, wherein k1 and k2 are integers; and wherein in a case that the block is non-dyadic, N=H, if H is a non-dyadic number; or N=Min(SBSize2, H), if H is a non-dyadic number, wherein SBSize2<SBSize, and H is in a form of H=k×SBSize, wherein k is an integer; or N=H, if H is not in a form of H=k×SBSize, wherein k is an integer; or N=Min(SBSize2, H), if H is not in a form of H=k1×SBSize, wherein SBSize2<SBSize, and H is in a form of H=k2×SBSize, wherein k1 and k2 are integers.

52. The method of any of solutions 39-51, wherein a number of templates are a power of two when performing local illumination compensation (LIC) on the block; wherein N samples from a left neighboring column are selected for the LIC when the left neighboring column is available, and wherein the N samples selected for the LIC are located at (x−1, y+f2(0)), (x−1, y+f2(1)), . . . , (x−1, y+f2(N−1)) in the left neighboring column, or wherein the N samples selected for the LIC are top N samples of the left neighboring column, or the N samples selected for the LIC are middle N samples of the left neighboring column, or the N samples selected for the LIC are bottom N samples of the left neighboring column; wherein N samples from an above neighboring row are selected for the LIC when the above neighboring row is available, and wherein the N samples selected for the LIC are located at (x+f1(0), y−1), (x+f1(1), y−1), . . . , (x+f1(N−1), y−1) in the above neighboring row, or the N samples selected for the LIC are left N samples of the above neighboring row, or the N samples selected for the LIC are middle N samples of the above neighboring row, the N samples selected for the LIC are right N samples of the above neighboring row; and wherein x and y are coordinates of a sample, f1(K)=((K*W)>>dimShift), f2(K)= ((K*H)>>dimShift), K is an integer value, W is a width of the block, H is a height of the block, N is an integer, >> indicates a right bitshift operation, and dimShift is an integer variable used in a parameter derivation process of the LIC.

53. The method of any of solutions 39-52, further comprising applying sub-block transform to the block based on whether the block is dyadic or non-dyadic, wherein the method further comprises splitting a coding unit comprising the block into two or more transform units based on whether the coding unit is dyadic or non-dyadic; wherein in a case where the coding unit is non-dyadic, sub-block transform including a transform unit of T1 size of the coding unit is not allowed to be applied to split the coding unit, wherein T1 is in a form of G1/G2, G1 is an integer, G2 is in a form of a $2^{F1}$ with F1 being a positive integer; wherein in a case where the coding unit is non-dyadic, sub-block transform including a transform unit of T2 size of the coding unit is allowed to be applied to split the coding unit, wherein T2 is in a form of G3/G4, G3 is an integer, G4 is not in a form of a $2^{F2}$ with F2 being a positive integer; and wherein in a case where the coding unit is non-dyadic, sub-block transform including a transform unit of a predefined size of F3 is allowed to be applied to split the coding unit, wherein F3=4×n, where n is a constant or a variable.

54. The method of any of solutions 39-53, wherein a mechanism for signaling/deriving splitting and residual coding of sub-block transform is dependent on whether a coding unit comprising the block is dyadic or non-dyadic; wherein one or more syntax elements are signalled to indicate whether sub-block transform comprising a transform unit of X1 size of the coding unit is applied to split the coding unit, wherein X1 is ¼, or ½, or, X2, X2 is ⅓ and/or ⅙; wherein in case of applying the sub-block transform to split a non-dyadic dimension of the coding unit, the splitting is inferred to be performed as a pre-defined way; wherein in case of applying the sub-block transform to split the coding unit along a non-dyadic dimension, a syntax element is signalled to indicate how to split the non-dyadic dimension into N segments, N is an integer; and wherein in a case that the coding unit that is determined to be non-dyadic is split into two or more sub-units for transform, residues of a smallest sub-unit in the two or more sub-units is coded regardless how the coding unit is split.

55. The method of any of solutions 39-54, further comprising applying affine prediction to the block, and wherein a four-parameter affine model or a six-parameter affine model is selected to derive a motion vector of the block based on whether a width (w) of the block is a non-dyadic value and/or whether a height (h) of the block is a non-dyadic value; wherein the motion vector is derived based on the four-parameter affine model according to equation (1) when the width of the block is a non-dyadic value;

$$\begin{cases} mv^h(x, y) = ax - by + c = \frac{(mv_1^h - mv_0^h)}{w}x - \frac{(mv_1^v - mv_0^v)}{w}y + mv_0^h \\ mv^v(x, y) = bx + ay + d = \frac{(mv_1^v - mv_0^v)}{w}x + \frac{(mv_1^h - mv_0^h)}{w}y + mv_o^v \end{cases} \quad (1)$$

where ($mv^h_0$, $mv^v_0$) is a motion vector of a top-left corner control point, and ($mv^h_1$, $mv^v_1$) is a motion vector of a top-right corner control point, (x, y) represents a coordinate of a representative point relative to a top-left sample within the block, and where a, b, c and d represent four parameters of the four-parameter affine model; wherein the motion vector is derived based on the six-parameter affine model according to equation (2) when the width or the height of the block is a non-dyadic value;

$$\begin{cases} mv^h(x, y) = ax - cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where ($mv^h_0$, $mv^v_0$) is a motion vector of a top-left corer control point, and ($mv^h_1$, $mv^v_1$) is a motion vector of a top-right corner control point, ($mv^h_2$, $mv^v_2$) is a motion vector of a bottom-left corner control point, (x, y) represents a coordinate of a representative point relative to a top-left sample within the block, where a, b, c, d, e and f represent six parameters of the six-parameter affine model; wherein the motion vector is derived based on the four-parameter affine model and the six-parameter affine model when the width or the height of the block is a non-dyadic value; wherein the motion vector is derived for a sub-block in an affine-coded block; wherein the motion vector is derived for an inherited affine merge candidate; and wherein the motion vector is derived for an inherited affine inter-coded candidate.

56. The method of any of solutions 39-55, wherein the coding tool associated with inter prediction is affine prediction, wherein the block is associated with control point motion vectors (CPMVs), and wherein a position of a CPMV in the block is selected based on whether the block is dyadic or non-dyadic; wherein a rule requires a distance between two CPMVs in the block to be a dyadic value when the block is non-dyadic; wherein the block has a width (w), a position of a first CPMV in the block is (x0, y0) and a position of a second CPMV in the block is (x0+ww, y0) when w is a non-dyadic value, and wherein (x0, y0) is a top-left position in the block, and ww=1<<⌊$\log_2 w$⌋ or ww=1<<⌈$\log_2 w$⌉, wherein ww is used instead of w in equation (1) or equation (2) or equation (3), wherein << is a left bitshift operation;

$$\begin{cases} mv^h(x, y) = ax - by + c = \frac{(mv_1^h - mv_0^h)}{w}x - \frac{(mv_1^v - mv_0^v)}{w}y + mv_0^h \\ mv^v(x, y) = bx + ay + d = \frac{(mv_1^v - mv_0^v)}{w}x + \frac{(mv_1^h - mv_0^h)}{w}y + mv_o^v \end{cases} \quad (1)$$

where ($mv^h_0$, $mv^v_0$) is a motion vector of a top-left corner control point, and ($mv^h_1$, $mv^v_1$) is a motion vector of a top-right corner control point, (x, y) represents a coordinate of a representative point relative to a top-left sample within the block, and where a, b, c and d represent four parameters of a four-parameter affine model;

$$\begin{cases} mv^h(x, y) = ax - cy + e = \dfrac{(mv_1^h - mv_0^h)}{w}x + \dfrac{(mv_2^h - mv_0^h)}{h}y + mv_0^h \\ mv^v(x, y) = bx + dy + f = \dfrac{(mv_1^v - mv_0^v)}{w}x + \dfrac{(mv_1^v - mv_0^v)}{h}y + mv_0^v \end{cases} \quad (2)$$

where $(mv_0^h, mv_0^v)$ is a motion vector of a top-left corner control point, and $(mv_1^h, mv_1^v)$ is a motion vector of a top-right corner control point, $(mv_2^h, mv_2^v)$ is a motion vector of a bottom-left corner control point, (x, y) represents a coordinate of a representative point relative to a top-left sample within the block, where a, b, c, d, e and f represent six parameters of a six-parameter affine model;

$$\begin{cases} iDMvHorX = (mv_1^h - mv_0^h) \ll (S - \log_2(w)) \\ iDMvHorY = (mv_1^v - mv_0^v) \ll (S - \log_2(w)) \end{cases} \quad (3)$$

where $(mv_0^h, mv_0^v)$ is a motion vector of a top-left corner control point, and $(mv_1^h, mv_1^v)$ is a motion vector of a top-right corner control point, S represents a calculation precision, log 2 represents a logarithmic function with a base of 2; wherein the block has a height (h), wherein a position of a first CPMV in the block is (x0, y0) and a position of a second CPMV in the block is (x0, y0+hh) when h is a non-dyadic value, and wherein (x0, y0) is a top-left position in the block, and hh=1<<⌊log₂h⌋ or hh=1<<⌈log₂h⌉, wherein hh is used instead of h in equation (2) or equation (5), wherein << is a left bitshift operation;

$$\begin{cases} iDMvVerX = (mv_2^h - mv_0^h) \ll (S - \log_2(h)) \\ iDMvVerY = (mv_2^v - mv_0^v) \ll (S - \log_2(h)) \end{cases} \quad (5)$$

where $(mv_0^h, m_0^v)$ is a motion vector of a top-left corner control point, and $(mv_2^h, mv_2^v)$ is a motion vector of a bottom-left corner control point, S represents a calculation precision, log 2 represents a logarithmic function with a base of 2; wherein the CPMVs are used to derive a motion vector for a sub-block in an affine-coded block; wherein the CPMVs are used to derive an inherited affine merge candidate; and wherein the CPMVs are used to derive an inherited affine inter-coded candidate.

57. An apparatus for processing video data comprising a processor and a non-transitory memory with instructions thereon, wherein the instructions upon execution by the processor, cause the processor to determine, for a conversion between a video comprising a block and a bitstream of the video, whether a coding tool associated with inter prediction is enabled for the block based on whether the block is dyadic or non-dyadic; and perform the conversion based on the determination.

58. A non-transitory computer-readable recording medium storing a bitstream of a video which is generated by a method performed by a video processing apparatus, wherein the method comprises: determining, for the video comprising a block, whether a coding tool associated with inter prediction is enabled for the block based on whether the block is dyadic or non-dyadic; and generating the bitstream based on the determination.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data, comprising:
   determining, for a conversion between a video comprising a block and a bitstream of the video, whether a coding tool associated with inter prediction is enabled for the block based on whether the block is dyadic or non-dyadic; and
   performing the conversion based on the determining.

2. The method of claim 1, wherein the coding tool associated with inter prediction is enabled in a case that the block is determined to be dyadic and is disabled in a case that the block is determined to be non-dyadic, and
   wherein the coding tool comprises one or more selected from a group comprising: bi-directional inter prediction, weighted bidirectional inter prediction, affine prediction, decoder-side motion vector refinement (DMVR), decoder-side motion vector derivation (DMVD), multi-pass decoder-side motion vector refinement, triangular portioning mode (TPM), geometric partitioning mode (GPM), bi-directional optical flow (BDOF), prediction refinement with optical flow (PROF), sub-block transform (SBT), multiple transform selection (MTS), low-frequency non-separable transform (LFNST), adaptive motion vector resolution (AMVR), combined inter-intra prediction (CIIP), multi-hypothesis prediction, subblock-based temporal motion vector prediction (sbTMVP), frame-rate up conversion (FRUC), bi-prediction with coding unit-level (CU-level) weights (BCW), overlapped block motion compensation (OBMC), local illumination compensation (LIC), template-matching based motion vector derivation, template matching based adaptive merge candidate reorder, and sub-block based inter prediction.

3. The method of claim 1, wherein whether to indicate usage of the coding tool associated with inter prediction for the block in the bitstream is based on whether the block is dyadic or non-dyadic, and
wherein the block is non-dyadic when a dimension of a side of the block is not expressed as a power of two.

4. The method of claim 1, wherein the block comprises a number of samples,
wherein in a case that the block is dyadic, whether to indicate usage of the coding tool associated with inter prediction for the block in the bitstream is based on a dimension of the block and/or a ratio between a width and a height of the block;
wherein in a case that the block is non-dyadic, whether to indicate usage of the coding tool associated with inter prediction for the block in the bitstream is based on a dimension of the block and/or a ratio between a width and a height of the block and whether the coding tool associated with inter prediction is allowed for a dyadic block with a number of samples larger than or less than or equal to the number of samples in the block; and
wherein in a case that the block is non-dyadic, a syntax element indicating the usage of the coding tool associated with inter prediction for the block is not signaled and is inferred to be 0.

5. The method of claim 1, wherein if the coding tool associated with inter prediction is disallowed for a dyadic block with samples, a number of which is less than or equal to K, the coding tool associated with inter prediction is disallowed for a non-dyadic block with samples, a number of which is less than or equal to K, wherein K is a positive integer.

6. The method of claim 1, further comprising performing sub-block based inter prediction on the block based on whether the block is dyadic or non-dyadic,
wherein the sub-block based inter prediction comprises one or more selected from a group comprising: affine prediction, subblock-based temporal motion vector prediction (sbTMVP), decoder-side motion vector refinement (DMVR), bi-directional optical flow (BDOF), frame-rate up conversion (FRUC), and overlapped block motion compensation (OBMC);
wherein in a case that the block is non-dyadic, the sub-block based inter prediction is not applied to the block;
wherein in a case that the block is non-dyadic, subblock-boundary OBMC is not applied to the block when CU-boundary OBMC is applied to the block; and
wherein in a case that the block is non-dyadic, subblock-based FRUC is not applied to the block when CU level FRUC is applied to the block.

7. The method of claim 1, further comprising splitting the block into sub-blocks based on whether the block is dyadic or non-dyadic,
wherein the block is split into M2×N2 sub-blocks when the block is non-dyadic, and wherein the block is split into M1×N1 sub-blocks when the block is dyadic, wherein M1, M2, N1, and N2 are integer values, and wherein M1 is not equal to M2 and/or N1 is not equal to N2; and
wherein the block has a width (W) and a height (H), wherein M1=N1=4, M2=N2=2, or M1=N1=8, M2=N2=4; or
wherein M1=N1=K, wherein K is a fixed integer; or
wherein M2 is equal to M1 if W is a dyadic number or M2 is equal to W if W is a non-dyadic number; or
wherein N2 is equal to N1 if H is a dyadic number or N2 is equal to H if H is a non-dyadic number.

8. The method of claim 1, further comprising splitting the block into sub-blocks based on a color component and/or a color format of the block;
wherein the block is split into M2×N2 sub-blocks if the block is a chroma block and a non-dyadic block, and wherein the block is split into M1×N1 sub-blocks if the block is a chroma block and a dyadic block, wherein M1, M2, N1, and N2 are integer values,
wherein if the block is a non-dyadic block and the color format of the block is 4:2:0, M1 is not equal to M2 and/or N1 is not equal to N2; and
wherein if the block is a non-dyadic block and the color format of the block is 4:2:2, M1 is not equal to M2 and N1 is equal to N2.

9. The method of claim 1, wherein the block is a chroma block,
wherein the block is split into 2×2 sub-blocks when a height or a width of the block is not in a form of 4×N and a color format of the block is 4:2:0, wherein N is an integer; or
wherein the block is split into 4×2 sub-blocks when a height of the block is not in a form of 4×N and a color format of the block is 4:2:0 or 4:2:2, wherein N is an integer; or
wherein the block is split into 2×4 sub-blocks when a width of the block is not in a form of 4×N and a color format of the block is 4:2:0 or 4:2:2, wherein N is an integer.

10. The method of claim 1, wherein the block has a width (W) and a height (H),
wherein the block is split into $$\left\lfloor \frac{W}{M1} \right\rfloor \times \left\lfloor \frac{H}{N1} \right\rfloor$$

first type sub-blocks with a dimension of M1×N1;
wherein the block is split into $$\left\lfloor \frac{H}{N1} \right\rfloor$$

second type sub-blocks with a dimension of M2×N1 when W%M1 is not equal to zero;
wherein the block is split into $$\left\lfloor \frac{W}{M1} \right\rfloor$$

third type sub-blocks with a dimension of M1×N2 when H%N1 is not equal to zero;
wherein the block is split into one or more fourth type sub-blocks with a dimensions M2×N2 when W%M1 is not equal to zero and H%N1 is not equal to zero;
wherein N1, N2, M1, and M2 are integers and % is a modulo operator;
wherein the first type sub-blocks are on left or right of the second type sub-blocks and/or the fourth type sub-blocks;
wherein the first type sub-blocks are above or below of the third type sub-blocks and/or the fourth type sub-blocks;

wherein the third type sub-blocks are on left or right of the fourth type sub-blocks; and wherein the second type sub-blocks are on above or below of the fourth type sub-blocks.

11. The method of claim 1, further comprising splitting the block into sub-blocks in decoder-side motion vector refinement (DMVR), bi-directional optical flow (BDOF), or multi-pass decoder-side motion vector refinement based on whether the block is dyadic or non-dyadic;

wherein the block with a dimension of W×H is split into sub-blocks with a dimension of M×N to allow application of the BDOF or the DMVR, wherein the application of the BDOF comprises application of a padding process in the BDOF, and the application of the DMVR comprises application of a block matching process in the DMVR;

wherein in a case that the block is dyadic, M=Min (SBSize, W), N=Min(SBSize, H), wherein SBSize is an integer; or M=Min(SBSize, W), if W is in a form of W=k×SBSize, wherein k is an integer; or N=Min (SBSize, H), if H is in a form of H=k×SBSize, wherein k is an integer;

wherein in a case that the block is non-dyadic, M=W, if W is a non-dyadic number; or M=Min(SBSize2, W), if W is a non-dyadic number, wherein SBSize2<SBSize, and W is in a form of W=k×SBSize, wherein k is an integer; or M=W, if W is not in a form of W=k×SBSize, wherein k is an integer; or M=Min(SBSize2, W), if W is not in a form of W=k1×SBSize, wherein SBSize2<SBSize, and W is in a form of W=k2× SBSize, wherein k1 and k2 are integers; and wherein in a case that the block is non-dyadic, N=H, if H is a non-dyadic number; or N=Min(SBSize2, H), if H is a non-dyadic number, wherein SBSize2<SBSize, and H is in a form of H=k×SBSize, wherein k is an integer; or N=H, if H is not in a form of H=k×SBSize, wherein k is an integer; or N=Min(SBSize2, H), if H is not in a form of H=k1×SBSize, wherein SBSize2<SBSize, and H is in a form of H=k2×SBSize, wherein k1 and k2 are integers.

12. The method of claim 1, wherein a number of templates are a power of two when performing local illumination compensation (LIC) on the block;

wherein N samples from a left neighboring column are selected for the LIC when the left neighboring column is available, and wherein the N samples selected for the LIC are located at (x−1, y+f2(0)), (x−1, y+f2(1)), . . . , (x−1, y+f2(N−1)) in the left neighboring column, or wherein the N samples selected for the LIC are top N samples of the left neighboring column, or the N samples selected for the LIC are middle N samples of the left neighboring column, or the N samples selected for the LIC are bottom N samples of the left neighboring column;

wherein N samples from an above neighboring row are selected for the LIC when the above neighboring row is available, and wherein the N samples selected for the LIC are located at (x+f1(0), y−1), (x+f1(1), y−1), . . . , (x+f1(N−1), y−1) in the above neighboring row, or the N samples selected for the LIC are left N samples of the above neighboring row, or the N samples selected for the LIC are middle N samples of the above neighboring row, the N samples selected for the LIC are right N samples of the above neighboring row; and wherein x and y are coordinates of a sample, f1(K)= ((K*W)>>dimShift), f2(K)=((K*H)>>dimShift), K is an integer value, W is a width of the block, H is a height of the block, N is an integer, >> indicates a right bitshift operation, and dimShift is an integer variable used in a parameter derivation process of the LIC.

13. The method of claim 1, further comprising applying sub-block transform to the block based on whether the block is dyadic or non-dyadic, wherein the method further comprises splitting a coding unit comprising the block into two or more transform units based on whether the coding unit is dyadic or non-dyadic;

wherein in a case where the coding unit is non-dyadic, sub-block transform including a transform unit of T1 size of the coding unit is not allowed to be applied to split the coding unit, wherein T1 is in a form of G1/G2, G1 is an integer, G2 is in a form of a $2^{F1}$ with F1 being a positive integer;

wherein in a case where the coding unit is non-dyadic, sub-block transform including a transform unit of T2 size of the coding unit is allowed to be applied to split the coding unit, wherein T2 is in a form of G3/G4, G3 is an integer, G4 is not in a form of a $2^{F2}$ with F2 being a positive integer; and wherein in a case where the coding unit is non-dyadic, sub-block transform including a transform unit of a predefined size of F3 is allowed to be applied to split the coding unit, wherein F3=4×n, where n is a constant or a variable.

14. The method of claim 1, wherein a mechanism for signaling/deriving splitting and residual coding of sub-block transform is dependent on whether a coding unit comprising the block is dyadic or non-dyadic;

wherein one or more syntax elements are signalled to indicate whether sub-block transform comprising a transform unit of X1 size of the coding unit is applied to split the coding unit, wherein X1 is ¼, or ½, or, X2, X2 is ⅓ and/or ⅙;

wherein in case of applying the sub-block transform to split a non-dyadic dimension of the coding unit, the splitting is inferred to be performed as a pre-defined way;

wherein in case of applying the sub-block transform to split the coding unit along a non-dyadic dimension, a syntax element is signalled to indicate how to split the non-dyadic dimension into N segments, N is an integer; and wherein in a case that the coding unit that is determined to be non-dyadic is split into two or more sub-units for transform, residues of a smallest sub-unit in the two or more sub-units is coded regardless how the coding unit is split.

15. The method of claim 1, further comprising applying affine prediction to the block, and wherein a four-parameter affine model or a six-parameter affine model is selected to derive a motion vector of the block based on whether a width (w) of the block is a non-dyadic value and/or whether a height (h) of the block is a non-dyadic value;

wherein the motion vector is derived based on the four-parameter affine model according to equation (1) when the width of the block is a non-dyadic value;

$$\begin{cases} mv^h(x, y) = ax - by + c = \frac{(mv_1^h - mv_0^h)}{w}x - \frac{(mv_1^v - mv_0^v)}{w}y + mv_0^h \\ mv^v(x, y) = bx + ay + d = \frac{(mv_1^v - mv_0^v)}{w}x + \frac{(mv_1^h - mv_0^h)}{w}y + mv_o^v \end{cases} \quad (1)$$

where $(mv^h_0, mv^v_0)$ is a motion vector of a top-left corner control point, and $(mv^h_1, mv^v_1)$ is a motion vector of a top-right corner control point, (x, y) represents a coordinate of a representative point relative to a top-left sample within the block, and where a, b, c and d represent four parameters of the four-parameter affine model;

wherein the motion vector is derived based on the six-parameter affine model according to equation (2) when the width or the height of the block is a non-dyadic value;

$$\begin{cases} mv^h(x,y) = ax - cy + e = \frac{(mv^h_1 - mv^h_0)}{w}x + \frac{(mv^h_2 - mv^h_0)}{h}y + mv^h_0 \\ mv^v(x,y) = bx + dy + f = \frac{(mv^v_1 - mv^v_0)}{w}x + \frac{(mv^v_2 - mv^v_0)}{h}y + mv^v_o \end{cases} \quad (2)$$

where $(mv^h_0, mv^v_0)$ is a motion vector of a top-left corner control point, and $(mv^h_1, mv^{vg}_1)$ is a motion vector of a top-right corner control point, $(mv^h_2, mv^v_2)$ is a motion vector of a bottom-left corner control point, (x, y) represents a coordinate of a representative point relative to a top-left sample within the block, where a, b, c, d, e and f represent six parameters of the six-parameter affine model;

wherein the motion vector is derived based on the four-parameter affine model and the six-parameter affine model when the width or the height of the block is a non-dyadic value;

wherein the motion vector is derived for a sub-block in an affine-coded block;

wherein the motion vector is derived for an inherited affine merge candidate; and wherein the motion vector is derived for an inherited affine inter-coded candidate.

16. The method of claim 1, wherein the coding tool associated with inter prediction is affine prediction, wherein the block is associated with control point motion vectors (CPMVs), and wherein a position of a CPMV in the block is selected based on whether the block is dyadic or non-dyadic;

wherein a rule requires a distance between two CPMVs in the block to be a dyadic value when the block is non-dyadic;

wherein the block has a width (w), a position of a first CPMV in the block is (x0, y0) and a position of a second CPMV in the block is (x0+ww, y0) when w is a non-dyadic value, and wherein (x0, y0) is a top-left position in the block, and ww=1<<⌊log₂w⌋ or ww=1<<⌈log₂w⌉, wherein ww is used instead of w in equation (1) or equation (2) or equation (3), wherein << is a left bitshift operation;

$$\begin{cases} mv^h(x,y) = ax - by + c = \frac{(mv^h_1 - mv^h_0)}{w}x - \frac{(mv^v_1 - mv^v_0)}{w}y + mv^h_0 \\ mv^v(x,y) = bx + ay + d = \frac{(mv^v_1 - mv^v_0)}{w}x + \frac{(mv^h_1 - mv^h_0)}{w}y + mv^v_o \end{cases} \quad (1)$$

where $(mv^h_0, mv^v_0)$ is a motion vector of a top-left corner control point, and $(mv^h_1, mv^v_1)$ is a motion vector of a top-right corner control point, (x, y) represents a coordinate of a representative point relative to a top-left sample within the block, and where a, b, c and d represent four parameters of a four-parameter affine model;

$$\begin{cases} mv^h(x,y) = ax - cy + e = \frac{(mv^h_1 - mv^h_0)}{w}x + \frac{(mv^h_2 - mv^h_0)}{h}y + mv^h_0 \\ mv^v(x,y) = bx + dy + f = \frac{(mv^v_1 - mv^v_0)}{w}x + \frac{(mv^v_1 - mv^v_0)}{h}y + mv^v_0 \end{cases} \quad (2)$$

where $(mv^h_0, mv^v_0)$ is a motion vector of a top-left corner control point, and $(mv^h_1, mv^v_1)$ is a motion vector of a top-right corner control point, $(mv^h_2, mv^v_2)$ is a motion vector of a bottom-left corner control point, (x, y) represents a coordinate of a representative point relative to a top-left sample within the block, where a, b, c, d, e and f represent six parameters of a six-parameter affine model;

$$\begin{cases} iDMvHorX = (mv^h_1 - mv^h_0) \ll (S - \log_2(w)) \\ iDMvHorY = (mv^v_1 - mv^v_0) \ll (S - \log_2(w)) \end{cases} \quad (3)$$

where $(mv^h_0, mv^v_0)$ is a motion vector of a top-left corner control point, and $(mv^h_1, mv^v_1)$ is a motion vector of a top-right corner control point, S represents a calculation precision, log 2 represents a logarithmic function with a base of 2;

wherein the block has a height (h), wherein a position of a first CPMV in the block is (x0, y0) and a position of a second CPMV in the block is (x0, y0+hh) when h is a non-dyadic value, and wherein (x0, y0) is a top-left position in the block, and hh=1<<⌊log₂h⌋ or hh=1<<⌈log₂h⌉, wherein hh is used instead of h in equation (2) or equation (5), wherein << is a left bitshift operation;

$$\begin{cases} iDMvVerX = (mv^h_2 - mv^h_0) \ll (S - \log_2(h)) \\ iDMvVerY = (mv^v_2 - mv^v_0) \ll (S - \log_2(h)) \end{cases} \quad (5)$$

where $(mv^h_0, mv^v_0)$ is a motion vector of a top-left corner control point, and $(mv^h_2, mv^v_2)$ is a motion vector of a bottom-left corner control point, S represents a calculation precision, log 2 represents a logarithmic function with a base of 2;

wherein the CPMVs are used to derive a motion vector for a sub-block in an affine-coded block;

wherein the CPMVs are used to derive an inherited affine merge candidate; and wherein the CPMVs are used to derive an inherited affine inter-coded candidate.

17. The method of claim 1, wherein the conversion comprises decoding the video from the bitstream.

18. The method of claim 1, wherein the conversion comprises encoding the video into the bitstream.

19. An apparatus for processing video data comprising a processor and a non-transitory memory with instructions thereon, wherein the instructions upon execution by the processor, cause the processor to:

determine, for a conversion between a video comprising a block and a bitstream of the video, whether a coding tool associated with inter prediction is enabled for the block based on whether the block is dyadic or non-dyadic; and perform the conversion based on the determination.

20. A non-transitory computer-readable recording medium storing a bitstream of a video which is generated by a method performed by a video processing apparatus, wherein the method comprises:
- determining, for the video comprising a block, whether a coding tool associated with inter prediction is enabled for the block based on whether the block is dyadic or non-dyadic; and
- generating the bitstream based on the determining.

* * * * *